US 6,614,592 B2

(12) United States Patent
Funatsu

(10) Patent No.: US 6,614,592 B2
(45) Date of Patent: Sep. 2, 2003

(54) BINOCULAR

(75) Inventor: Gouji Funatsu, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/845,264

(22) Filed: May 1, 2001

(65) Prior Publication Data

US 2001/0040728 A1 Nov. 15, 2001

(30) Foreign Application Priority Data

May 2, 2000 (JP) ........................................ 2000-133414
May 10, 2000 (JP) ........................................ 2000-137075

(51) Int. Cl.[7] .............................................. G02B 23/00
(52) U.S. Cl. ........................ 359/407; 359/408; 359/836
(58) Field of Search ................................ 359/407, 408, 359/412, 417, 418, 422, 431, 480, 836

(56) References Cited

U.S. PATENT DOCUMENTS

| 4,318,584 A | * | 3/1982 | Ando et al. .................. 359/401 |
| 4,626,081 A | * | 12/1986 | Nishizawa .................. 359/407 |
| 4,806,007 A | * | 2/1989 | Bindon ........................ 359/424 |
| 5,896,209 A | | 4/1999 | Funatsu ....................... 359/417 |
| 5,930,035 A | | 7/1999 | Funatsu ....................... 359/417 |
| 6,108,128 A | | 8/2000 | Funatsu ....................... 359/407 |

FOREIGN PATENT DOCUMENTS

| JP | 10104496 | 4/1998 |
| JP | 10104497 | 4/1998 |

* cited by examiner

Primary Examiner—Mark A. Robinson
(74) Attorney, Agent, or Firm—Greenblum & Bernstein, P.L.C.

(57) ABSTRACT

An erecting prism of a binocular includes a first and a second prism, which are held by a holder, and the holder being supported vertically movable and laterally immobile with respect to a thin plate. The thin plate is supported laterally movable and vertically immobile with respect to a right moving body. A shaft reception means is provided, for rotatably supporting a jig, at the right eyepiece cylinder that is attached to the rear wall 303B of the right moving body. The position of erecting prism is adjusted by using a jig to move the holder vertically with respect to the thin plate, and to move the thin plate laterally with respect to the right moving body. The jig may be supported by the shaft reception means and rotated.

33 Claims, 33 Drawing Sheets

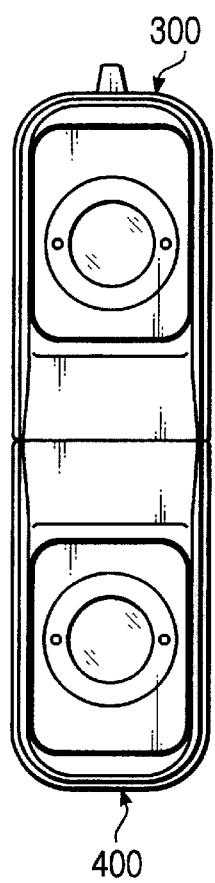
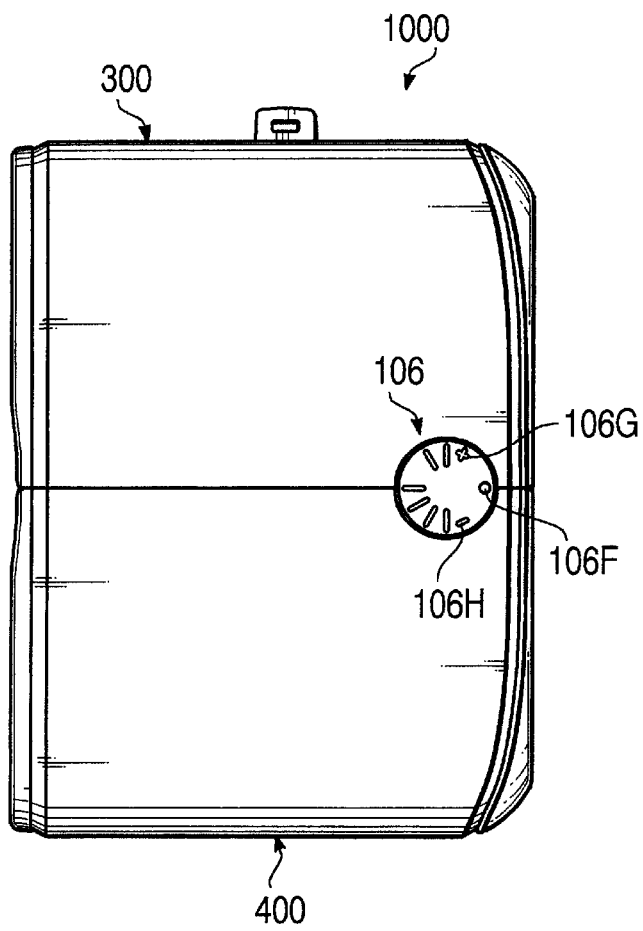
FIG. 2B
FIG. 2A

BINOCULAR

BACKGROUND OF THE INVENTION

The present invention relates to a binocular, and more particularly, to a binocular including telescope optical systems that each include an erecting prism for erecting images.

Conventionally, a binocular includes two telescope systems, left and right. Each telescope system has, respectively, (at least) an objective lens, an erecting prism for erecting an inverse image that is imaged by the objective lens, and an eyepiece lens for observing the erected image.

In each telescope optical system, the erecting prism may be adjustable along the vertical and lateral directions with respect to an optical axis of the telescope optical system, so that the erected image, to be seen through the eyepiece optical lens, is formed inside a field stop, with a predetermined acceptable play. If the telescope optical system is a zoom system, the acceptable play takes into account various magnifying powers of the telescope optical system.

In particular, when a holder for holding the erected prism is installed in an attachment member, the location of the holding member with respect to the attachment member is adjusted so that the location of the erecting prism with respect to the optical axis can be adjusted properly.

In the conventional binocular, however, no particular adjustment structure or mechanism is provided, and such adjustment is made by means of inserted members that are difficult to arrange, such as shims, spacers, etc. That is, no adjustable structure or mechanism that is part of the binocular is provided, so that the adjustment of the erecting prism is both time-consuming and requires a high level of necessary skills. These drawbacks cause low productivity in manufacturing or repair.

Furthermore, in the conventional binocular, the location of the erecting prism with respect to the optical axis should be adjusted at the time of installation of the erecting prism to the attachment member, i.e., in the assembly stage. Therefore, when the location of the erecting prism requires later adjustment (e.g., due to independent reasons after the binocular is assembled, such correction of misalignment, or other repair or optimizing tasks), numerous parts other than the holding member and attachment member must be demounted in order to carry out the adjustment.

Still further, if the location of the erecting prism must be adjusted after the binocular has been assembled, any outer member covering the binocular must be removed so that the holding member and the attachment member can be adjusted as noted above, which also requires extra time and expense.

SUMMARY OF THE INVENTION

It is therefore an object of the invention to provide a binocular in which the erecting prism location can be adjusted easily and precisely, enhancing the efficiency of the adjustment process (including before or after shipment).

According to one aspect of the present invention, a binocular includes a right telescope system and a left telescope optical system. Each of the telescope optical systems includes an objective lens, a roof prism that forms an erected image, and an eyepiece lens for observing the erected image. An optical adjustment structure adjusts a location of the roof prism in a first direction and a second direction. The first direction and the second direction are perpendicular to optical axes of the telescope optical systems and perpendicular to one other.

Optionally, the optical arrangement structure includes a prism holder, an intermediate member, and a holding member. The prism holder is configured to hold the roof prism. The intermediate member is configured to support the prism holder to be movable in the first direction but prevented from movement in the second direction, and the holding member is configured to support the intermediate member to be movable in the second direction but prevented from movement in the first direction.

In such a case, the intermediate member may include a first guiding member and the prism holder may include a first guided member. One of the first guiding member and the first guided member extends in the first direction, the first guided member of the prism holder being guided in the first direction by the first guiding member of the intermediate member.

Alternatively or in addition, the holding member may include a second guiding member and the intermediate member may include a second guided member. One of the second guiding member and the second guided member extends in the second direction, the second guided member of the intermediate member being guided in the second direction by the second guiding member of the holding member.

The intermediate member may include a first plate-like portion formed on a surface opposing the prism holder, the first plate-like portion being plate shaped and having a first substantially circular hole formed therein. In this case, the prism holder includes a first long groove elongated in the second direction and opposing the first substantially circular hole. The first hole and the first long groove may be arranged with respect to each other in relative positions in which the first hole receives a cylindrical body of a first arrangement member, and the first long groove receives an eccentric shaft portion of the first arrangement member that extends from an end of the cylindrical body and is eccentric with respect to an axis of rotation of the cylindrical body.

As to the first long groove, two side edges of the first long groove that oppose each other in an elongation direction of the first long groove may abut an outer circumferential surface of the eccentric shaft portion of the first arrangement member when the prism holder is moved in the first direction with respect to the intermediate member upon rotation of the first arrangement member.

The holding member may alternatively or also include a second plate-like portion formed on a surface opposing the intermediate member, the second plate-like portion being plate shaped and having a second substantially circular hole formed therein. The intermediate member then includes a second long groove elongated in the first direction and opposing the substantially circular second hole. The second hole and the second long groove may be arranged with respect to each other in relative positions in which the second hole receives a cylindrical body of a second arrangement member, and the second long groove receives an eccentric shaft portion of the second arrangement member that extends from an end of the cylindrical body and is eccentric with respect to an axis of rotation of the cylindrical body. Two side edges of the second long groove that oppose each other in an elongation direction of the second long groove may abut an outer circumferential surface of the eccentric shaft portion of the second arrangement member. In this case, the intermediate member is moved in the second direction with respect to the holding member upon rotation of the second arrangement member.

According to another aspect of the present invention, a binocular includes right and left telescope optical systems.

Each of the right and left telescope optical systems includes an objective lens, an erecting prism that forms an erected image, and an eyepiece lens for imaging the erected image. An optical axis is defined by the objective lens, the erecting prism, and the eyepiece lens. A prism holding structure adjusts a location of the erecting prism in a first direction and a second direction. The first direction and the second direction are perpendicular to optical axes of the telescope optical system and perpendicular to one another. A prism location arrangement structure moves the location of the erecting prism within the prism holding structure, and is adapted to receive an arrangement jig and move the location of the erecting prism within the prism holding structure according to a rotational operation of the arrangement jig. Optionally, a shaft reception member may be provided for rotatably supporting the arrangement jig while the arrangement jig is rotated.

Optionally, the prism holding structure may include a prism holder, an intermediate member, and a holding member. The prism holder is configured to hold the erecting prism, the intermediate member is configured to support the prism holder to be movable in the first direction but prevented from movement in the second direction, and the holding member is configured to support the intermediate member to be movable in the second direction but prevented from movement in the first direction.

In addition or alternatively, the intermediate member may include a first guiding member and the prism holder may include a first guided member. One of the first guiding member and the first guided member extends in the first direction, the first guided member of the prism holder being guided in the first direction by the first guiding member of the intermediate member. The holding member includes a second guiding member and the intermediate member includes a second guided member. One of the second guiding member and the second guided member extends in the second direction, the second guided member of the intermediate member being guided in the second direction by the second guiding member of the holding member.

Further, the intermediate member may include a first plate-like portion formed on a surface opposing the prism holder, the first plate-like port ion being plate shaped and having a first substantially circular hole formed therein. In this case, the prism holder includes a first long groove elongated in the second direction and opposing the first substantially circular hole.

The holding member may have a second plate-like portion formed on a surface opposing the intermediate member, the second plate-like portion being plate shaped and having a second substantially circular hole formed therein. The intermediate member may include a second long groove elongated in the first direction and opposing the substantially circular second hole.

As to the first hole and the first long groove, they may be arranged with respect to each other in relative positions in which the first hole receives a cylindrical body of the arrangement jig and the first long groove receives an eccentric shaft portion of the arrangement jig that extends from an end of the cylindrical body and is eccentric with respect to an axis of rotation of the cylindrical body. Two side edges of the first long groove that oppose each other in an elongation direction of the first long groove may abut an outer circumferential surface of the eccentric shaft portion.

As to the second hole and the second long groove, they may be arranged with respect to each other in relative positions in which the second hole receives a cylindrical body of the arrangement jig and the second long groove receives an eccentric shaft portion of the arrangement jig that extends from an end of the cylindrical body and is eccentric with respect to an axis of rotation of the cylindrical body. Two side edges of the second long groove that oppose each other in an elongation direction of the second long groove may abut an outer circumferential surface of the eccentric shaft portion.

The shaft reception member may include a plate-like portion, a jig insertion hole formed in the plate-like portion for receiving the arrangement jig, and an arch portion formed on a portion of a hole edge of the jig insertion hole, the arch portion forming an arched edge expanding outward from a center of the jig insertion hole. The diameter of the arch portion is optionally less than the half of that of the jig insertion hole, the arrangement jig is being received and rotatably supported by the arch portion.

The binocular may further include one or more outer housing members formed to house the binocular. The prism location arrangement structure engages with the arrangement jig at an engaging interface, and the engaging interface of the prism location arrangement structure is covered from an exterior of the binocular by the outer housing member.

In this case, the outer housing member may include an eyepiece, the eyepiece being removably attached to the binocular at the eyepiece lens.

BRIEF DESCRIPTION OF THE ACCOMPANYING DRAWINGS

The present invention is further explained in the description which follows with reference to the drawings, illustrating, by way of non-limiting examples, various embodiments of the invention, with like reference numerals representing similar parts throughout the several views.

FIG. 2A shows a bottom plan view of the binocular of FIG. 1A; and

FIG. 2B shows a rear plan view of FIG. 2A, seen from the direction of an arrow A3, of the binocular with the same configuration as FIG. 1.

DESCRIPTION OF THE EMBODIMENTS

Figures 1A, 1B:
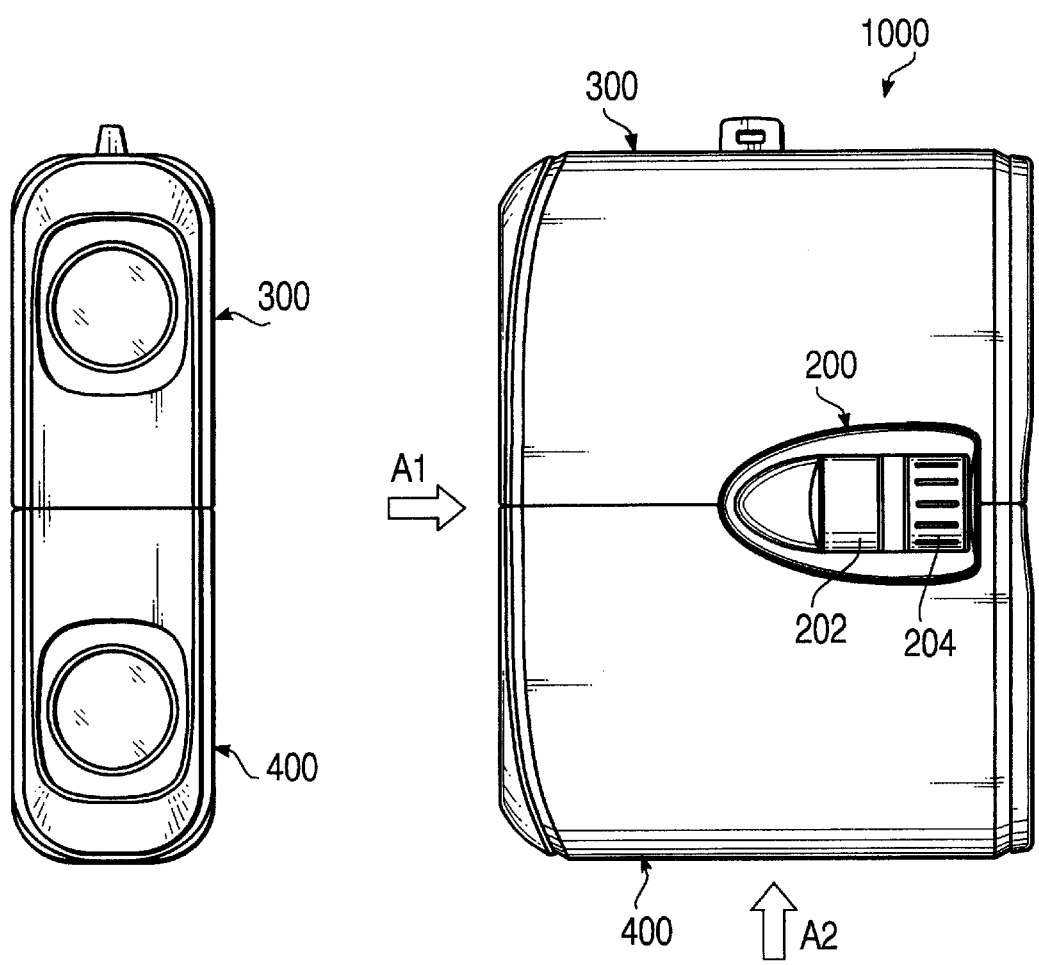
FIG. 1A shows a plan view of a binocular according to an embodiment of the invention, in which right and left lens barrels are in contact with each other, and right and left eyepiece barrels are contained inside a binocular body.
FIG. 1B shows a front view of the binocular of FIG. 1A seen from the direction of an arrow A1.

Hereinafter, referring to the accompanying drawings, embodiments according to the present invention will be described.

In the description, an objective side along an optical axis is called a "front side", and an eyepiece side is called a "rear side". The terms "frontward" and "rearward" means respectively "toward the front side" and "toward the rear side" Right and left directions of the binocular are defined by the orientations mentioned above, that is, the right and left sides of the binocular as used herein correspond to the sides that a user of the binocular would consider his or her right and left sides when operating the binocular. In general, as used herein, the "length" direction is front to back or vice versa (parallel to the direction of the optical axes), the "width" direction is left to right or vice versa (the lateral direction as the binocular is held by an operator), and the "height" direction is top to bottom or vice versa (vertical and horizontal directions as the binocular is held by an operator). That is, these directions herein are generally "absolute", without dependency on whether a part is flat, elongated, etc., in order to identify the length, width, and height.

First, referring to FIGS. 1 and 2, an overview of the binocular will now be described.

A binocular 1000 includes a supporting unit 100 (see FIG. 3), an optical operating unit 200, the right lens barrel 300 and the left lens barrel.

The supporting unit 100 is provided between the right and left lens barrels (300, 400), for supporting the right and left lens barrels (300, 400). The right and left lens barrels (300, 400) have respective telescope optical systems therein.

There are provided, at the supporting unit 100, a diopter decorative ring 106 and an optical operating unit 200. The diopter decorative ring 106 (corresponding to a first eccentric member or a manually operable member in the claims) is provided on the bottom surface of the supporting unit 100, the surface of the diopter decorative ring 106 being exposed, i.e., facing outward. The optical operating unit 200 includes a focus arrangement ring 202 for arranging or adjusting focus of the binocular, and a zooming operation ring 204 for setting and adjusting magnifying-power of both of the right and left telescope optical systems.

The right and left lens barrels (300, 400) are supported by the supporting unit 100 therebetween, and are movable in the width direction of the binocular 1000, or the lateral direction. The right lens barrel 300 and the left lens barrel 400 cooperate to simultaneously move symmetrically with respect to the center line of the supporting unit.

The right and left lens barrels (300, 400) include respectively a right moving unit 303 (shown in FIG. 5) and a left moving unit 403 (shown in FIG. 7), and a right eyepiece cylinder 304 and a left eyepiece cylinder 404. The right moving unit 303 holds a right eyepiece lens unit 309 and a right erecting prism unit 306. The left moving unit 403 holds a left eyepiece lens unit 409 and a left erecting prism unit 406.

If the focus arrangement ring 202 is rotated, the right and left moving unit (303, 304) and the right and left eyepiece cylinder (304, 404) are moved for focus arrangement.

If the zooming operation ring 204 is rotated, some pieces of the relevant optical structure, included both in the right and left lens barrels (300, 400) and as described herein, are moved along the optical axis for varying the magnifying-power.

The focus arrangement ring 202 and the zooming arrangement ring 204 are disposed near to the rear end (i.e. near to the eyepiece cylinder) of the binocular 1000 along the center line. The focus arrangement ring 202 and the zooming arrangement ring 204 are coaxial and adjacent to one another, in this order from the front end, and are each rotatable about an axis parallel to the optical axes. The focus arrangement ring 202 and the zooming arrangement ring 204 are disposed facing outward from the upper surface of the supporting unit 100.

Figure 6:
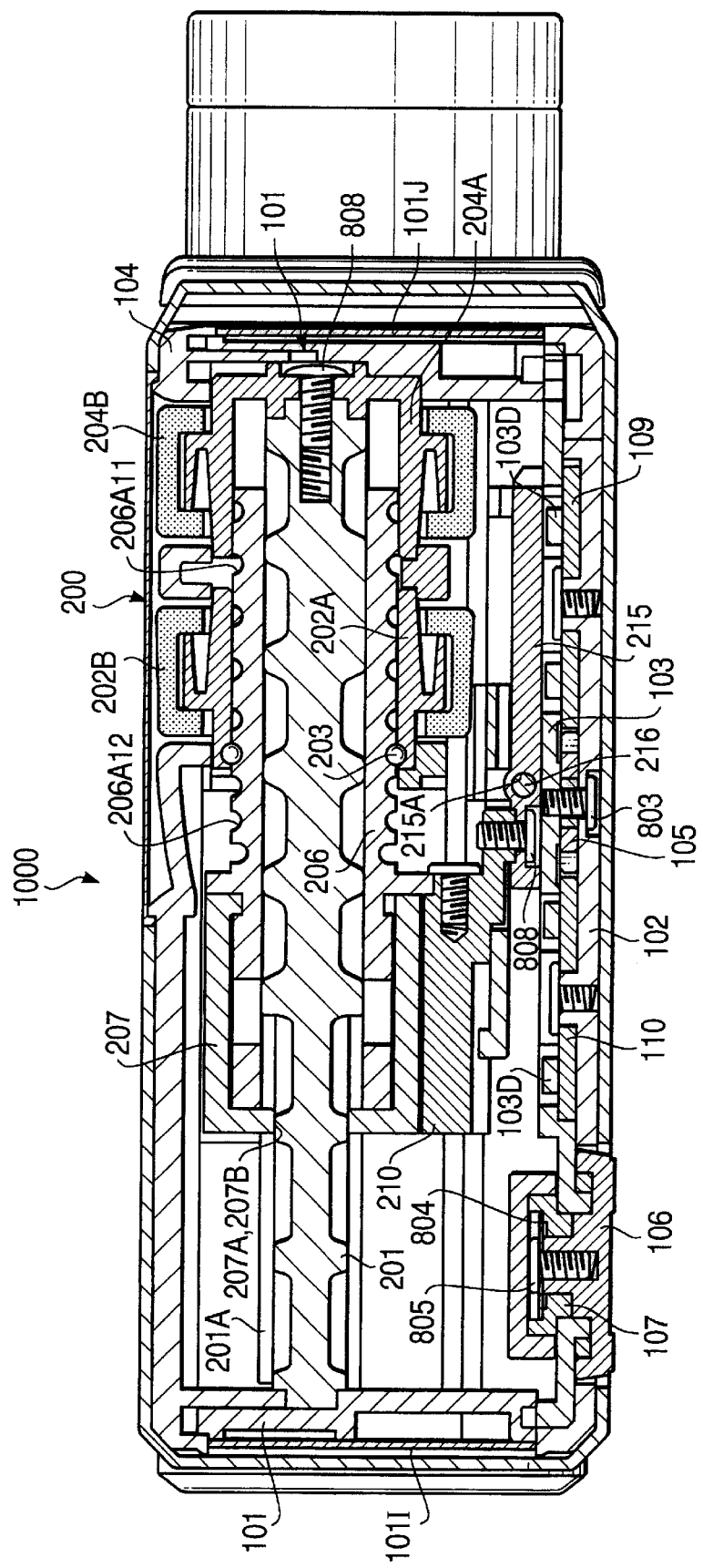
FIG. 6 shows a cross-sectional view of FIG. 5 taken along a line VI—VI.

As shown in FIGS. 2A and 6, the diopter decorative ring 106 is disposed on the bottom front surface of the supporting unit 100 of the binocular 1000. The diopter decorative ring 106 is exposed (i.e., faces outward) from the bottom surface and is located along the center line mentioned above.

Therefore, when an observer or user holds the binocular, the right and left lens barrels are held by the operator's hands so that the diopter decorative ring 202 can be operated by fingers of either hand. Since the focus arrangement ring 202 and the zooming arrangement ring 204 are disposed on the center line, whichever hand can operate the rings more easily or more comfortably may be used by the operator.

As shown in FIG. 2A, indicia including a "zero point" mark 106F, a "plus" mark 106G and a "minus" mark 106H are marked on the surface of the diopter decorative ring 106, which can be seen from the outside of the binocular by the operator. The "zero point" mark 106F, when aligned with a reference mark on the supporting unit 100, indicates no diopter difference (i.e. the zero point), and the "plus"/"minus" marks illustrates the direction of the diopter correction to be made, the "plus" and "minus" marks optionally indicating the end of the adjustment range.

In the following description, the structures of each operational unit of the binocular 1000 are described.

Figure 5:
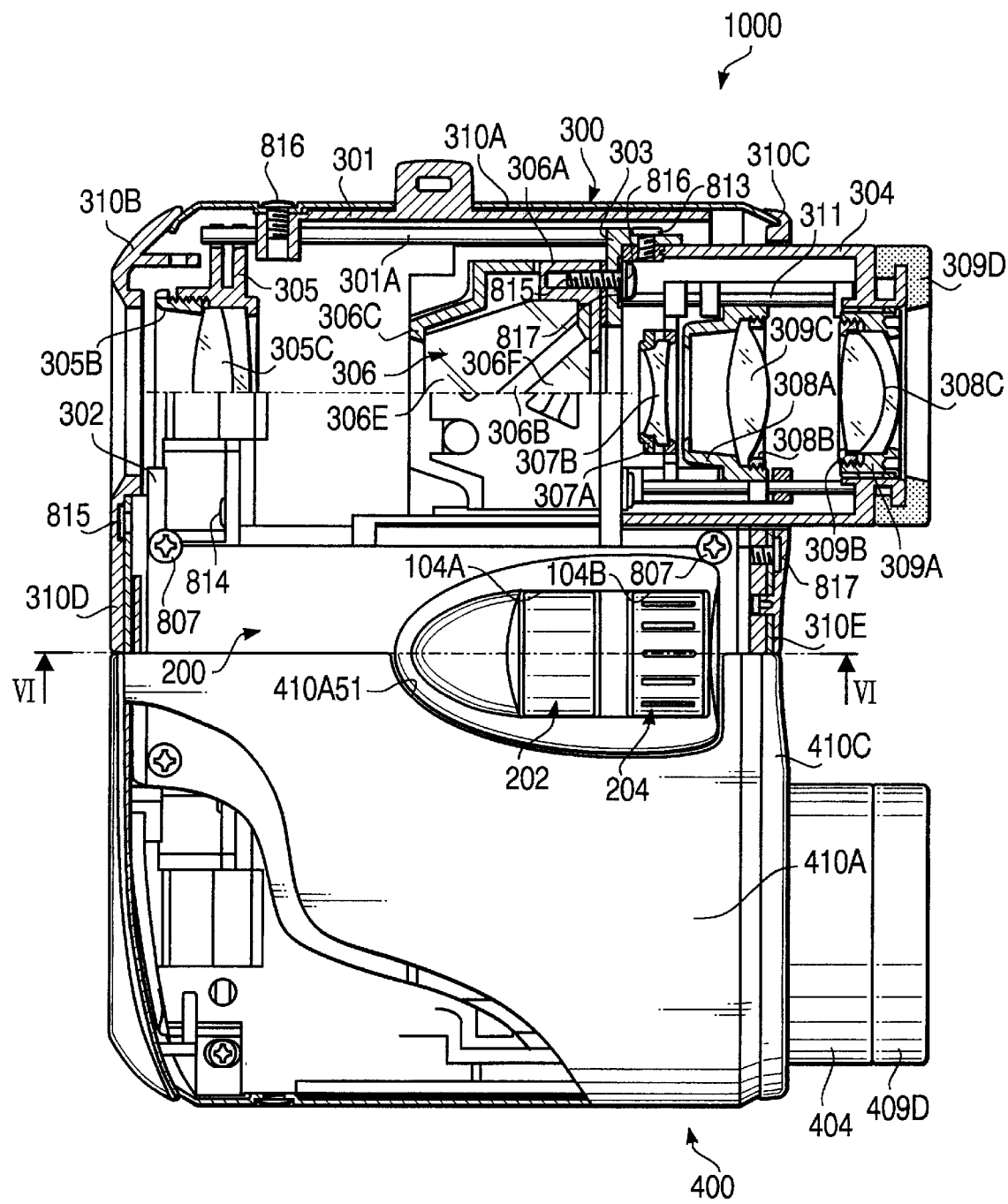
FIG. 5 shows a partially cross-sectioned top plan view of the binocular.
Figure 7:
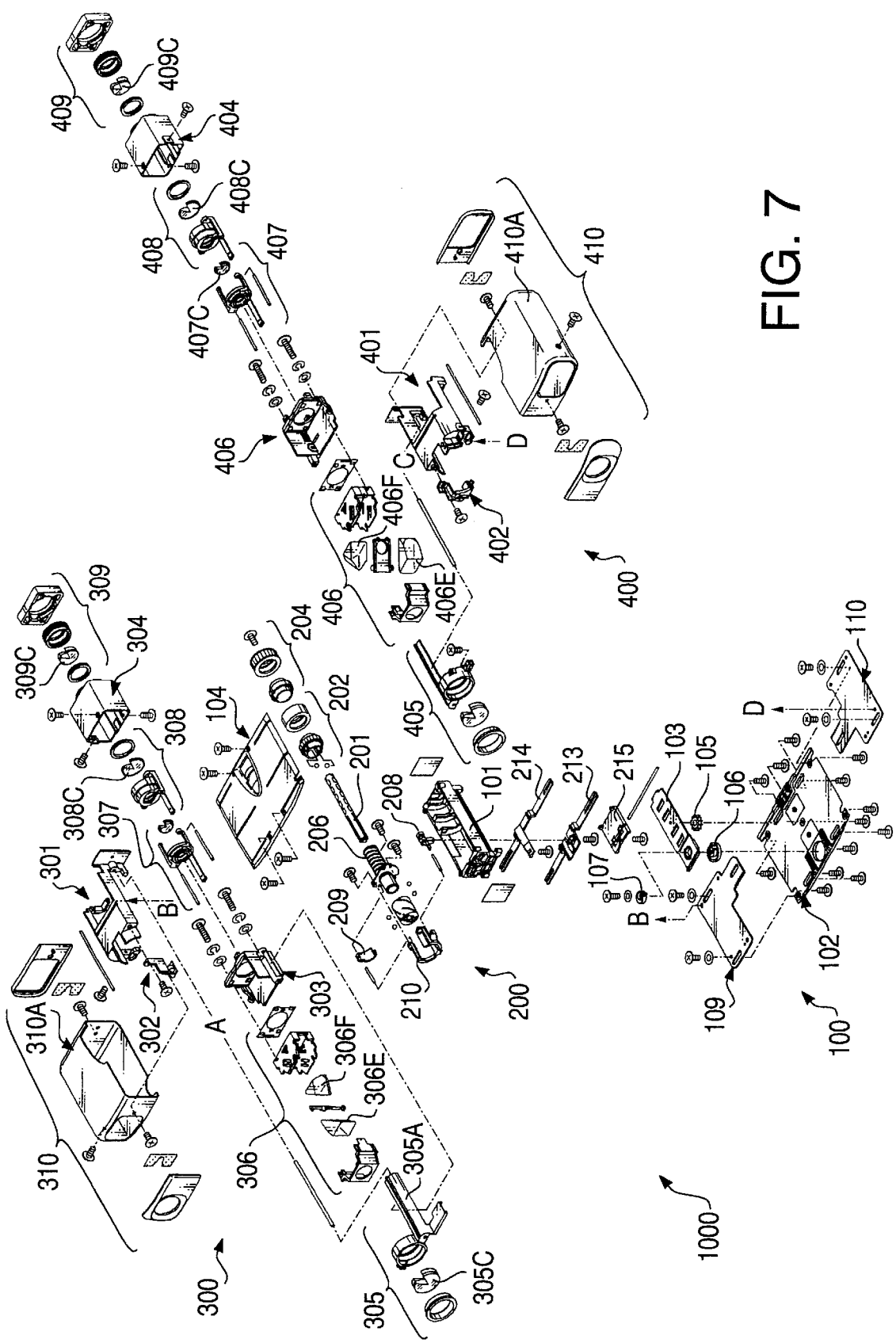
FIG. 7 shows an exploded perspective view, illustrating an overview of the binocular.

FIG. 5 shows a partially cross-sectioned top plan view of the binocular 1000, FIG. 6 shows a cross-sectioned view of FIG. 5 along a line VI—VI of FIG. 5, and FIG. 7 shows an exploded perspective view illustrating an overview of the binocular assembly.

Figure 8:
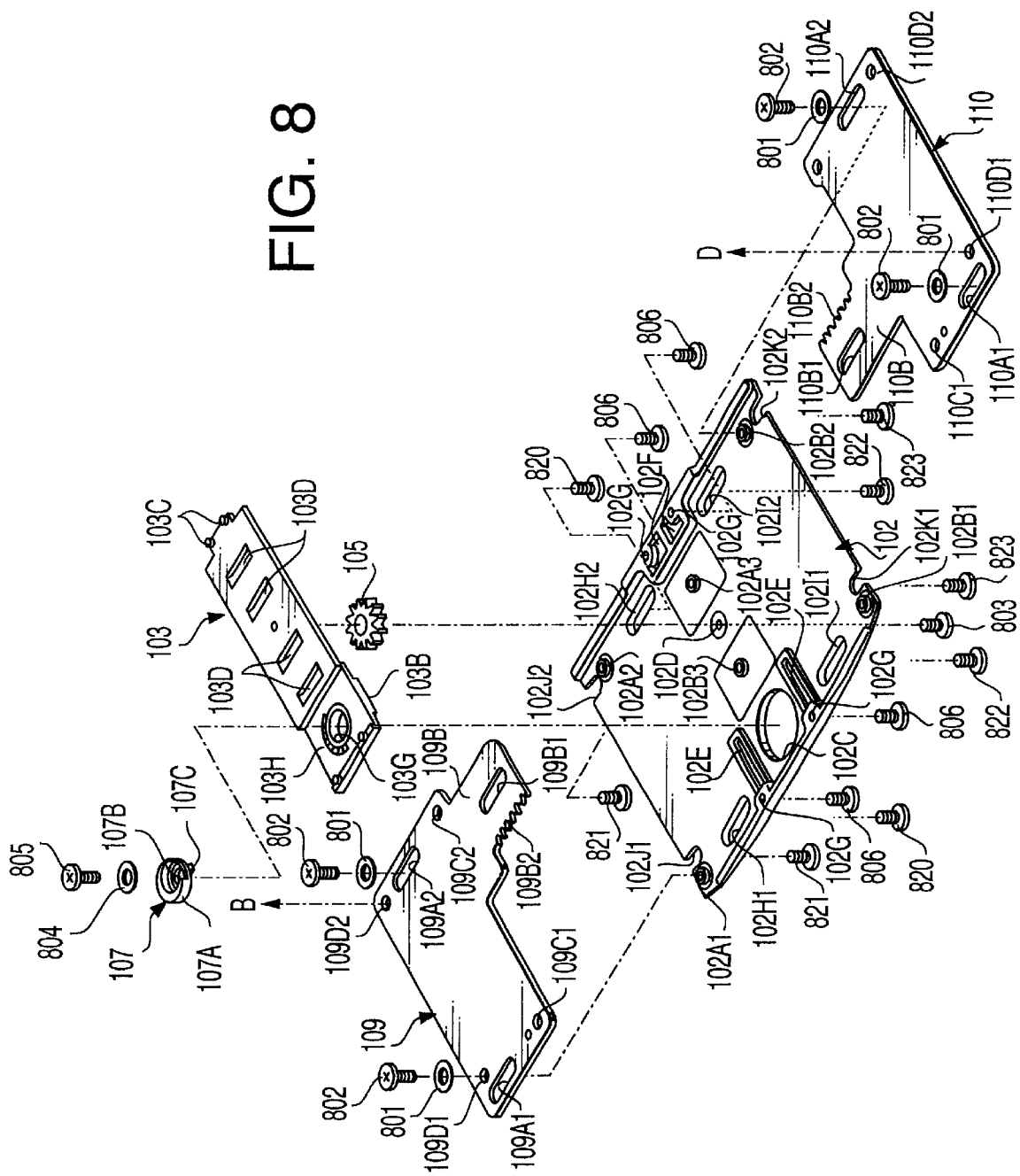
FIG. 8 shows an exploded perspective view, illustrating a portion of a supporting member shown in FIG. 7.
Figure 9:
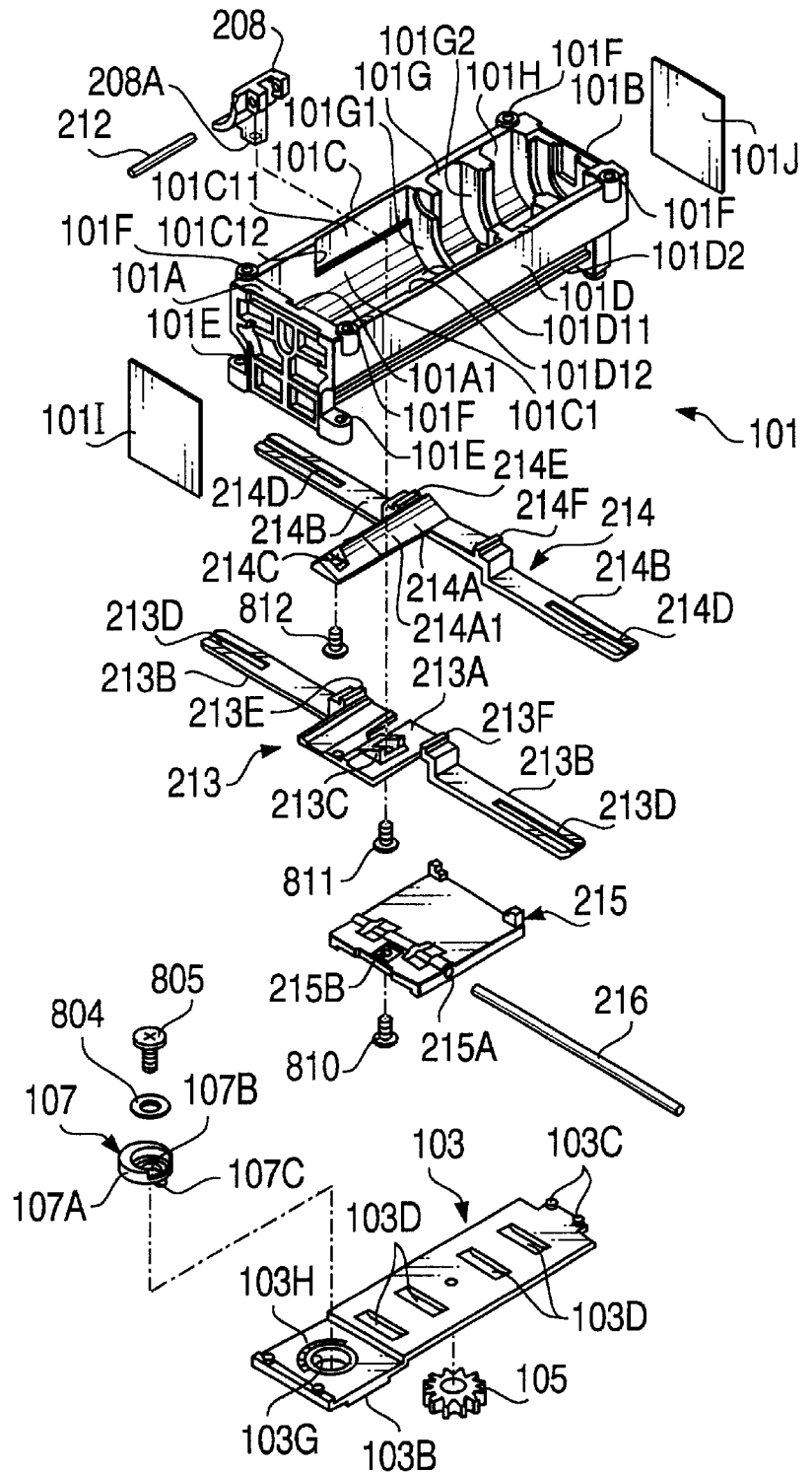
FIG. 9 shows an exploded perspective view, illustrating a portion of an optical operating unit and a supporting unit shown in FIG. 7.
Figure 10:
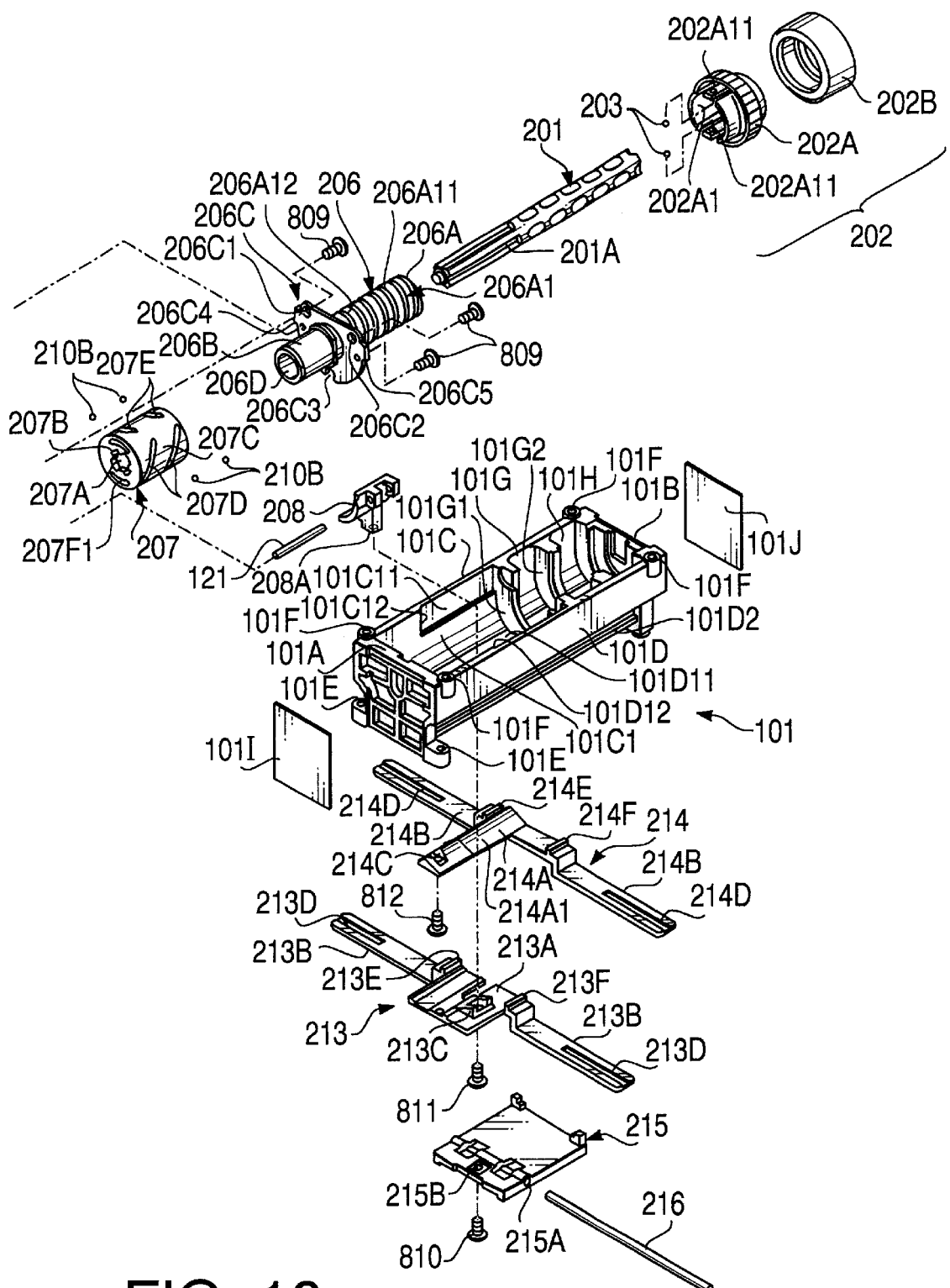
FIG. 10 shows an exploded perspective view, illustrating the structure of the optical operating unit shown in FIG. 7.
Figure 11:
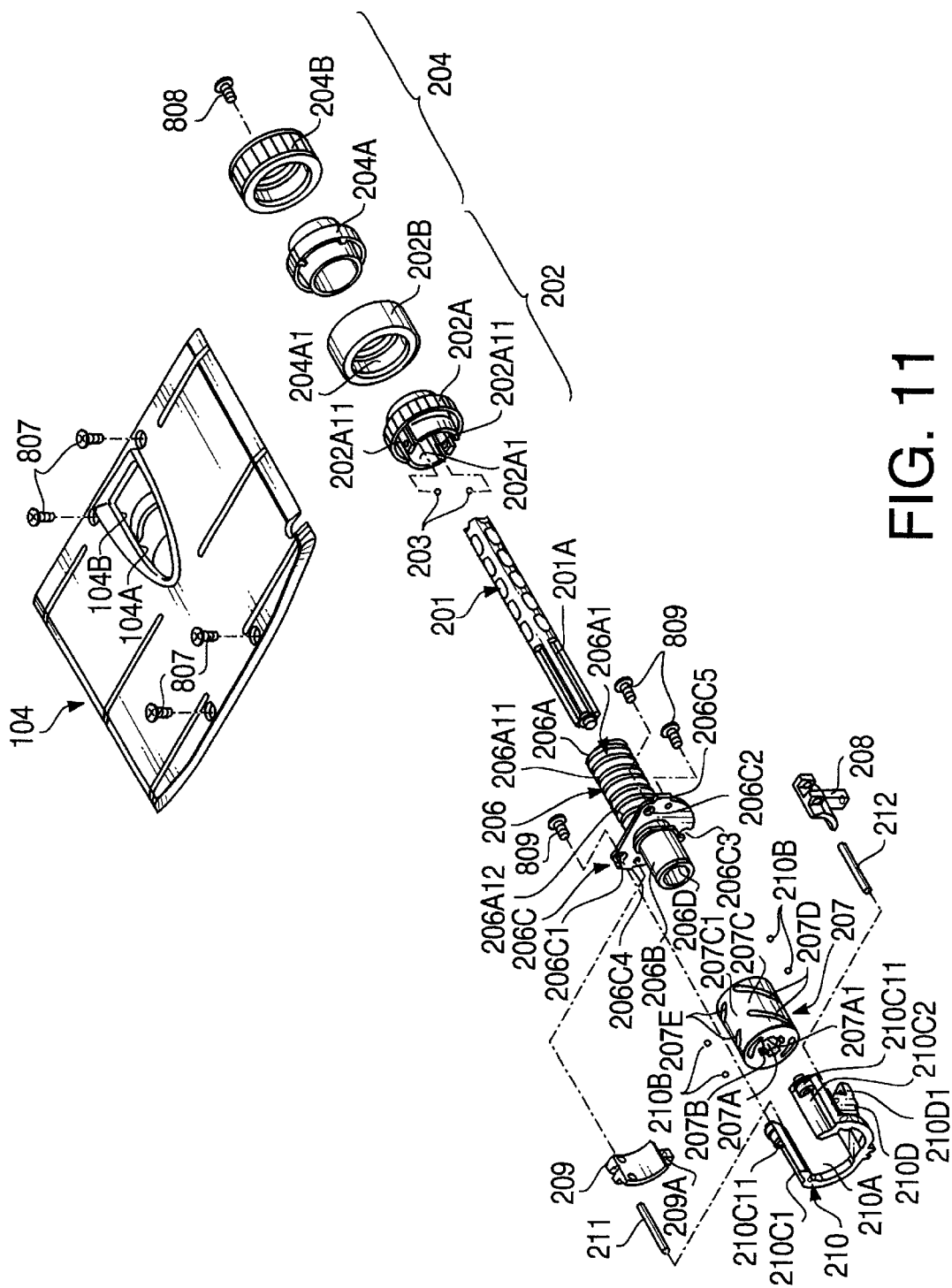
FIG. 11 shows an exploded perspective view, illustrating a structure of a portion of the optical operating unit and an upper plate shown in FIG. 7.

FIG. 8 shows an exploded perspective view illustrating a portion of a supporting member, FIG. 9 shows an exploded perspective view illustrating a portion of an optical operating unit and the supporting unit, FIG. 10 shows an exploded perspective view illustrating the structure of the optical operating unit, and FIG. 11 shows an exploded perspective view illustrating a structure of a portion of the optical operating unit and an upper plate.

Figure 12:
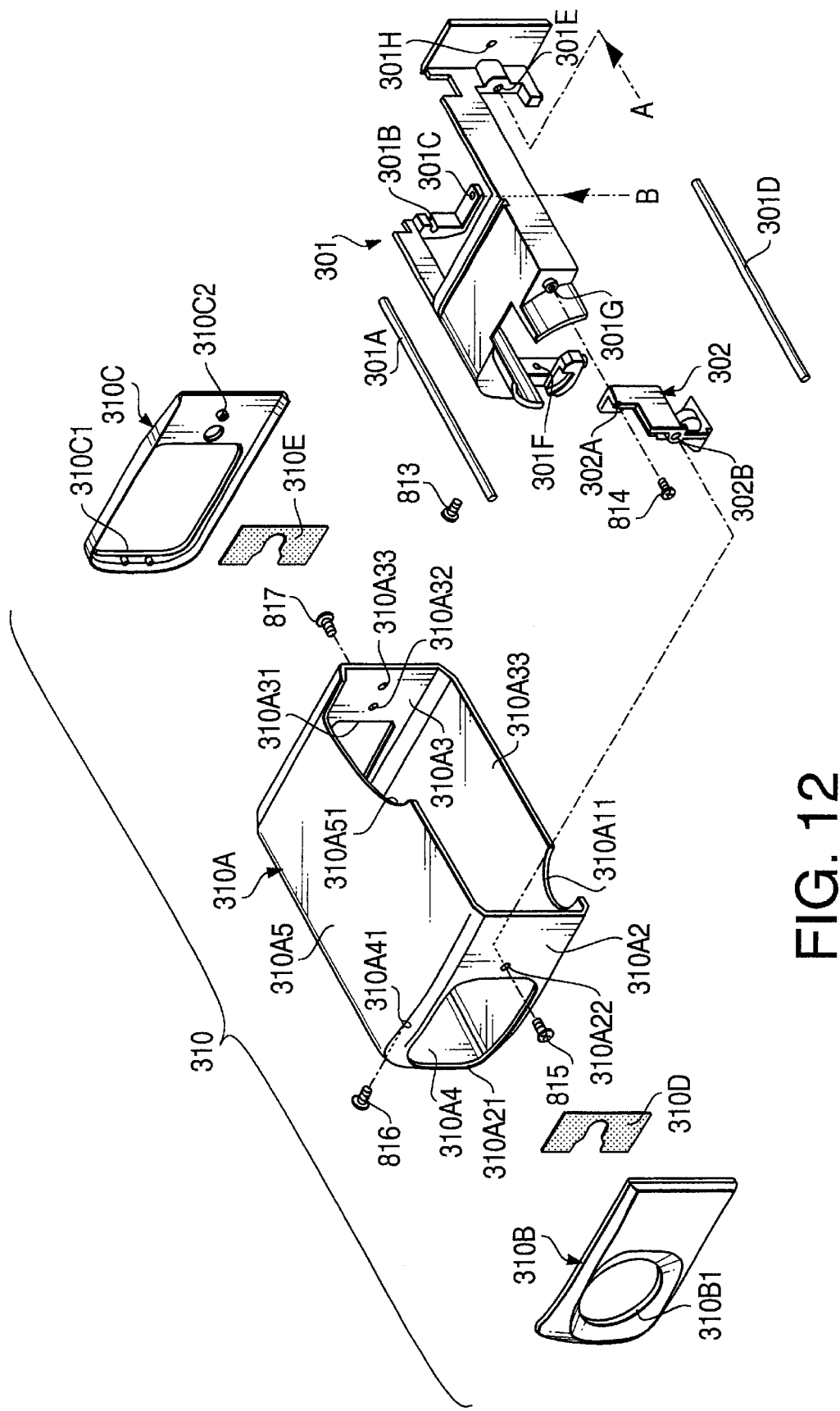
FIG. 12 shows an exploded perspective view, illustrating at least a right outer unit of a right lens barrel.

FIG. 12 shows an exploded perspective view illustrating mainly a structure of a right outer unit of the right lens barrel.

Figure 13:
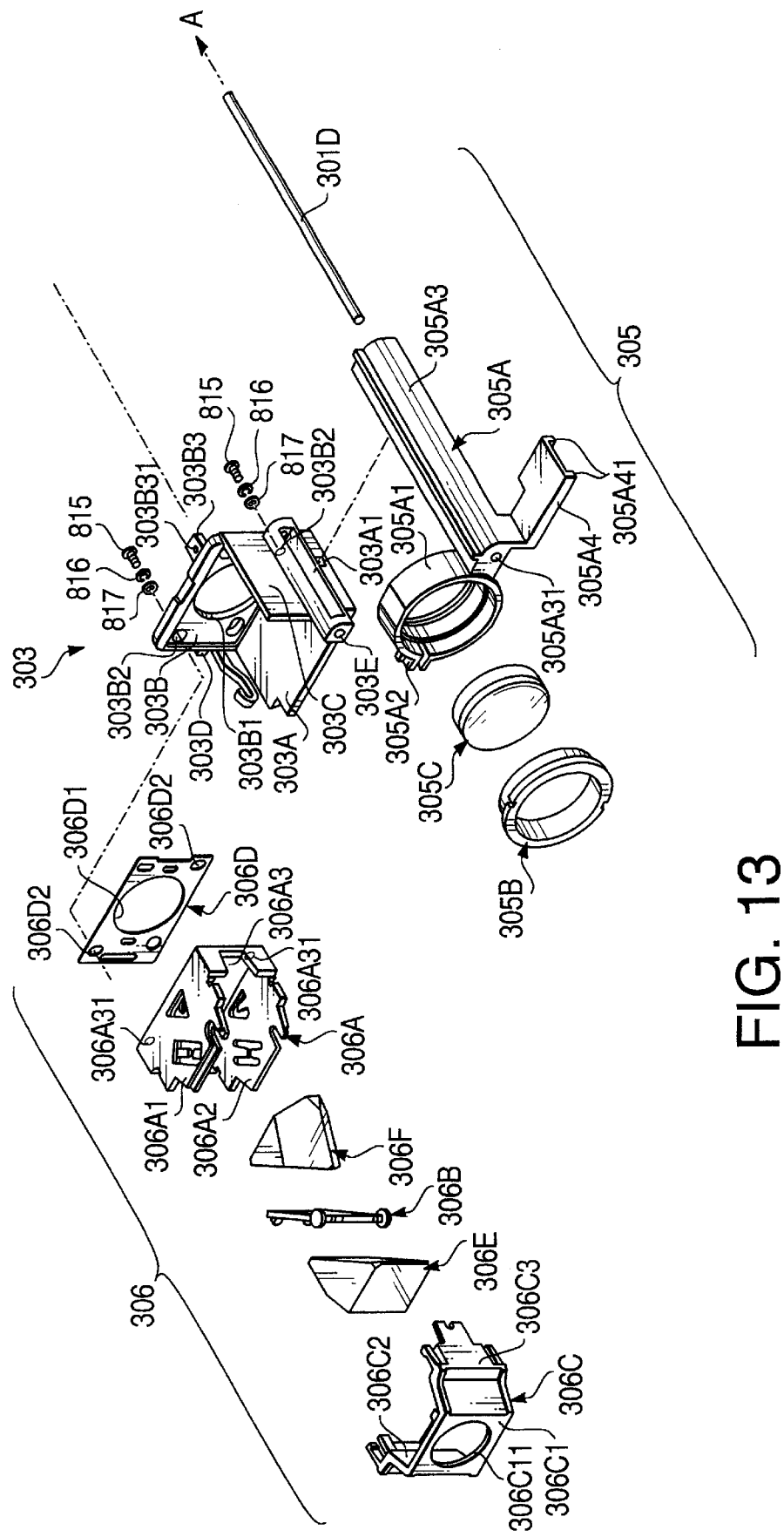
FIG. 13 shows an exploded perspective view, illustrating at least a right moving unit, a right objective unit and a right prism unit of the right lens barrel.
Figure 14:
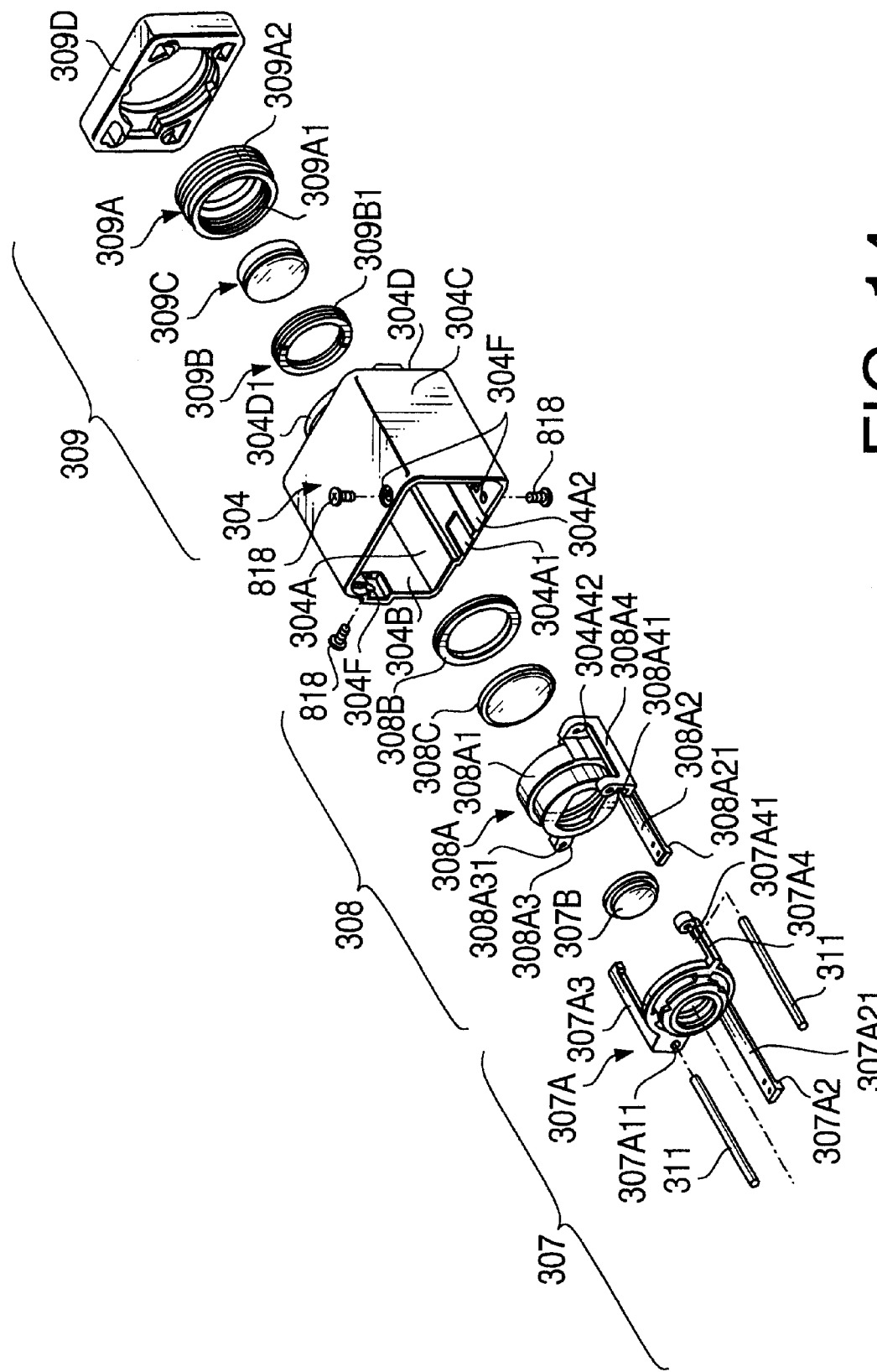
FIG. 14 shows an exploded perspective view, illustrating at least a first lens unit, a second lens unit and an eyepiece unit of the right lens barrel.

FIG. 13 shows an exploded perspective view illustrating mainly a structure of a right moving unit, a right objective unit and a right prism unit of the right lens barrel, and FIG. 14 shows an exploded perspective view illustrating mainly a structure of a first lens unit, a second lens unit and an eyepiece unit of the right lens barrel.

Figure 15:
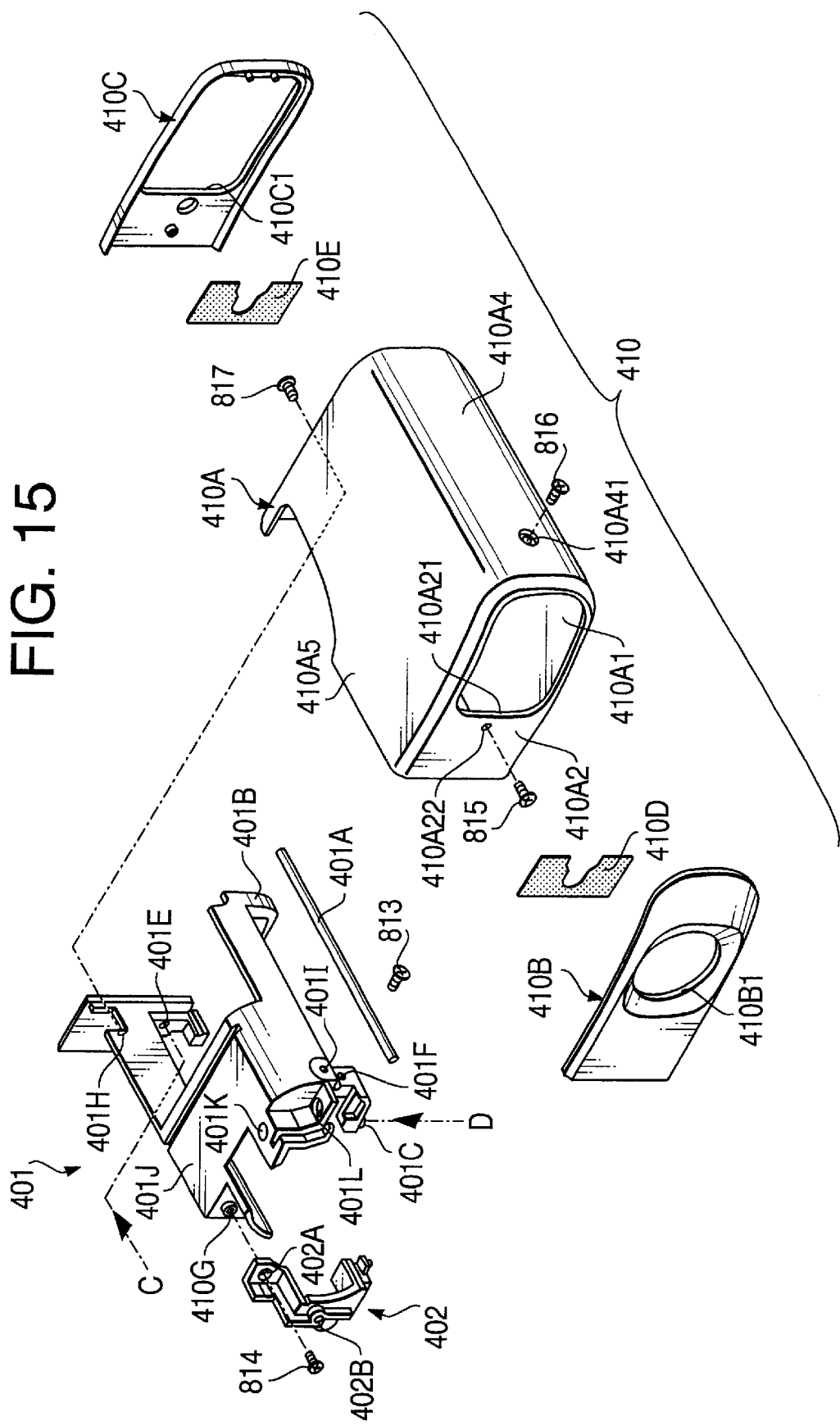
FIG. 15 shows an exploded perspective view, illustrating at least a left outer unit of the left lens barrel.
Figure 16:
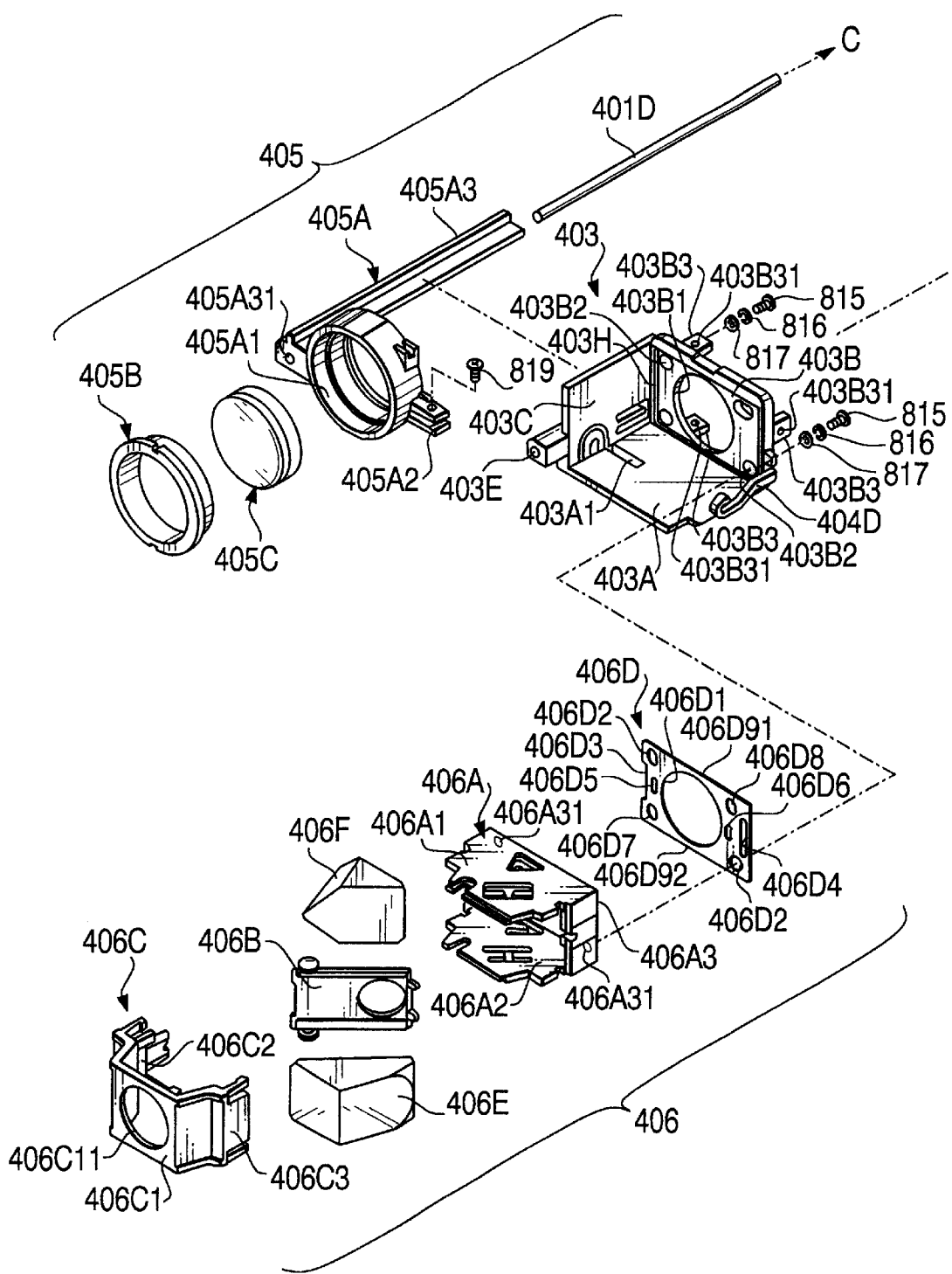
FIG. 16 shows an exploded perspective view illustrating mainly a left moving body, a left objective optical system and a prism unit.
Figure 17:
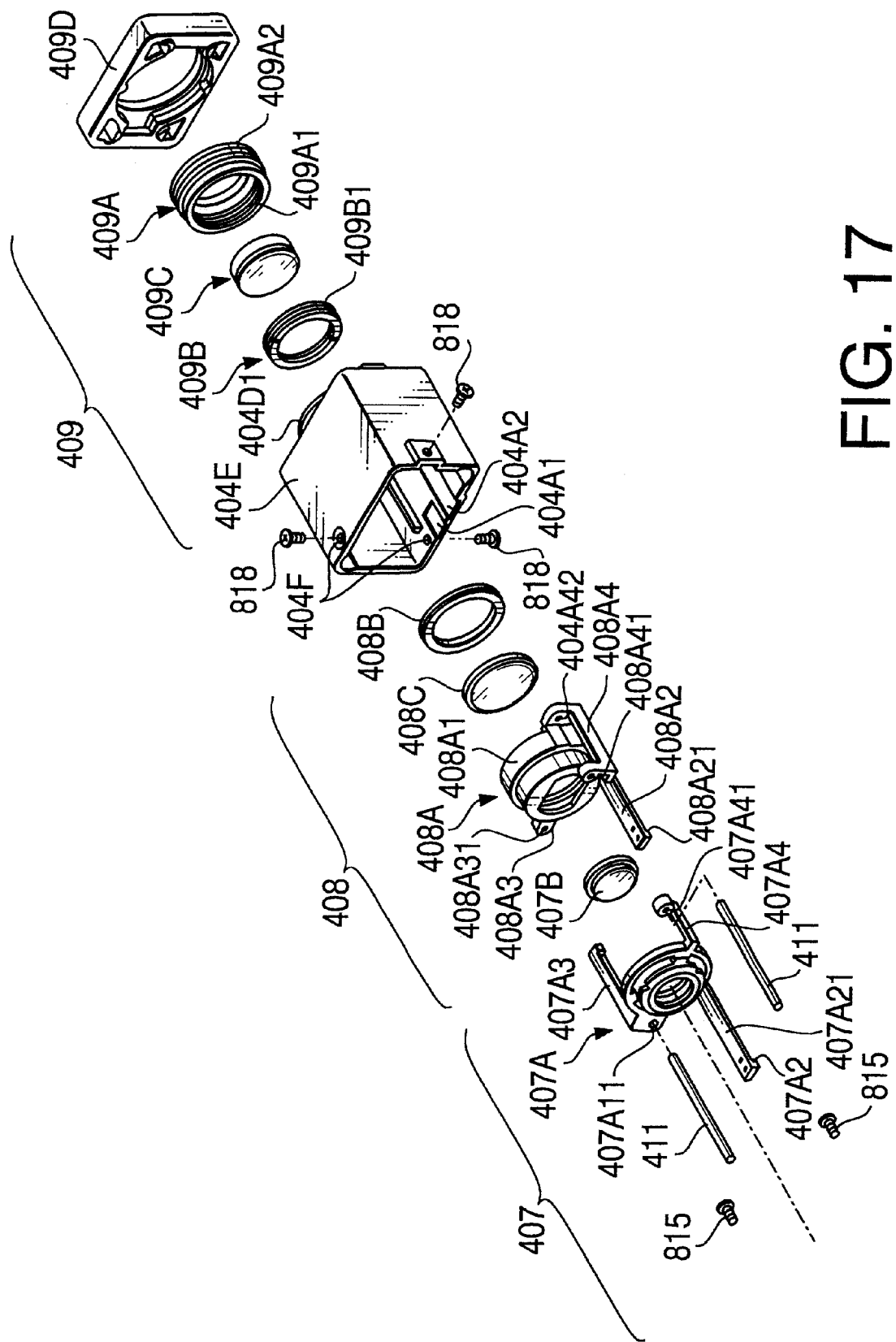
FIG. 17 shows an exploded perspective view, illustrating at least the first lens unit, the second lens unit and the eyepiece unit of the left lens barrel.

FIG. 15 shows an exploded perspective view illustrating mainly a structure of a left outer unit of the left lens barrel. FIG. 16 shows an exploded perspective view primarily of the structure of a left moving body, a left objective unit and a prism unit of the left lens barrel. FIG. 17 shows an exploded perspective view primarily of the structure of the first lens unit, the second lens unit and the eyepiece unit of the left lens barrel.

Figure 18:
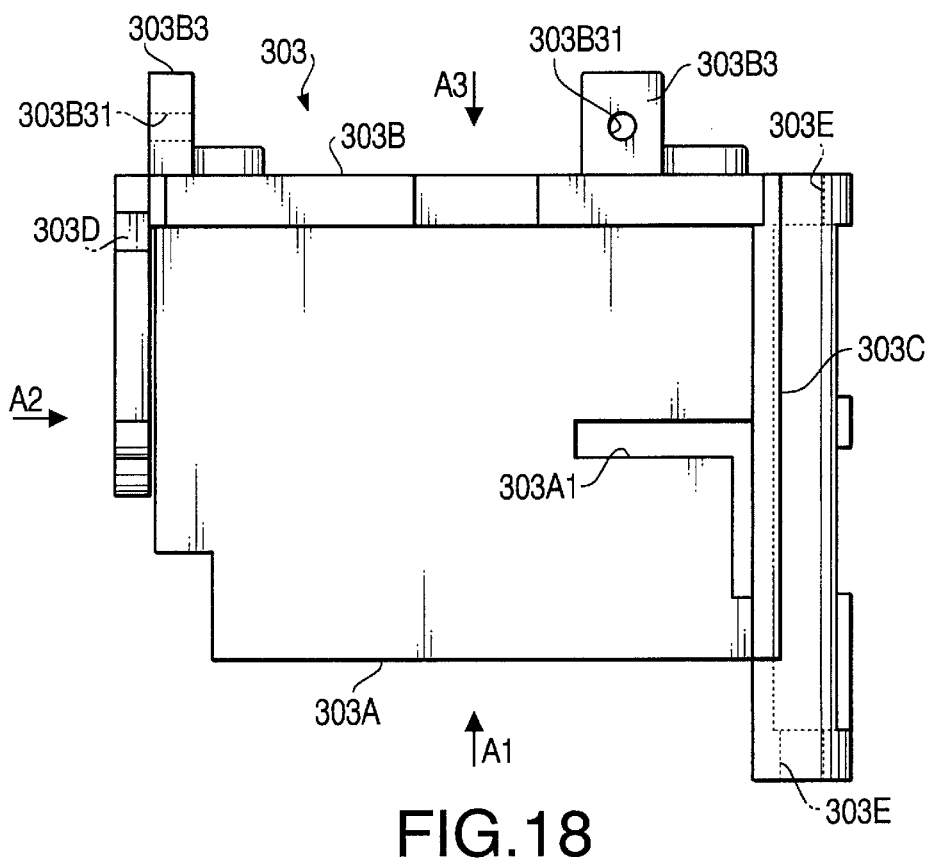
FIG. 18 shows a plan view of a right moving body.
Figure 19:
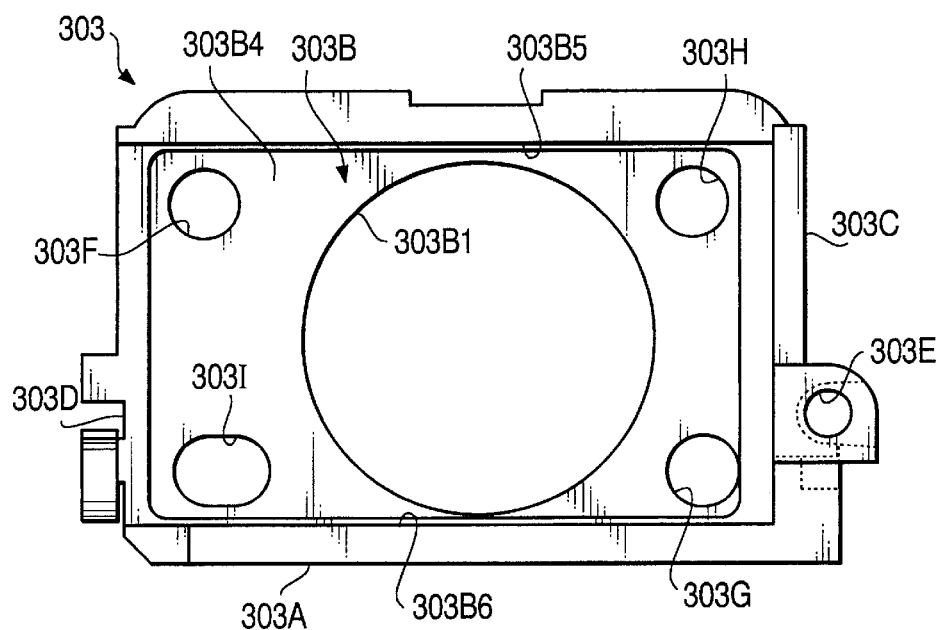
FIG. 19 shows a front plan view of the right moving body illustrated in FIG. 18 seen from an arrow A1 direction.
Figure 20:
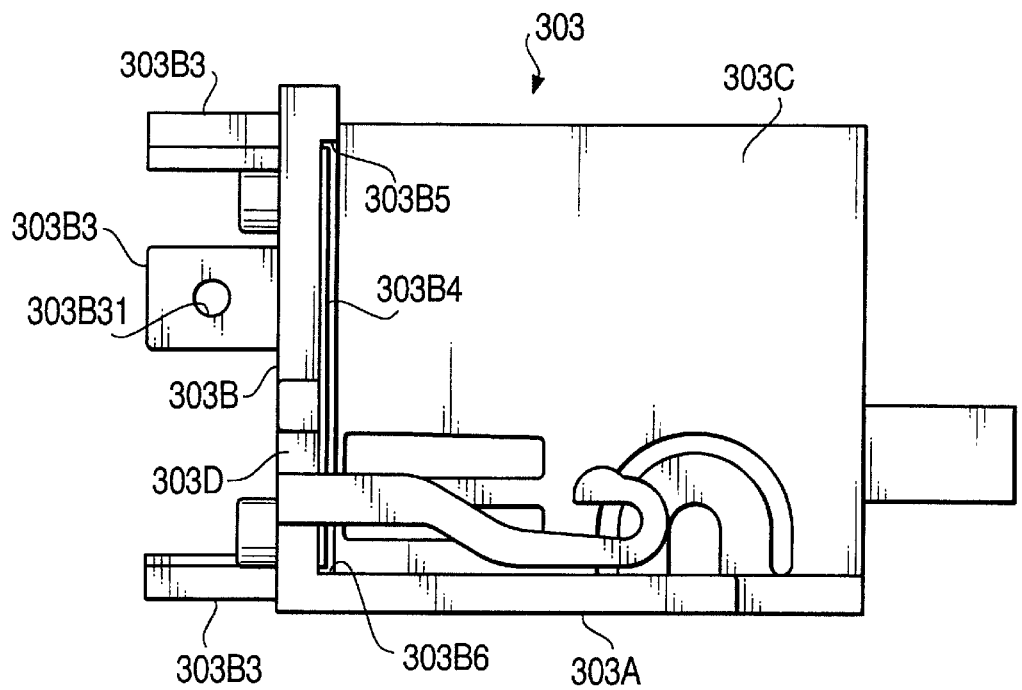
FIG. 20 shows a side plan view of the right moving body illustrated in FIG. 18 seen from an arrow A2 direction.
Figure 21:
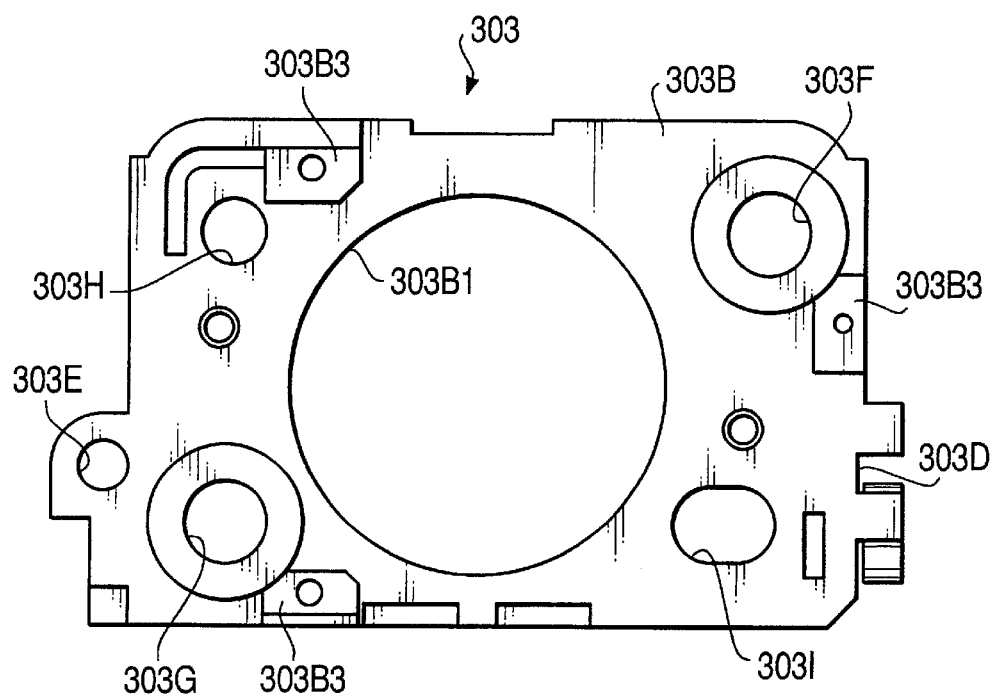
FIG. 21 shows a back plan view of the right moving body illustrated in FIG. 18 seen from an arrow A3 direction.

FIG. 18 shows a plan view of a right moving body, FIG. 19 shows a front plan view of the right moving body from a direction of an arrow A1 in FIG. 18, FIG. 20 shows a side plan view of the right moving body seen from a direction of an arrow A2 in FIG. 18, and FIG. 21 shows a back plan view of the right moving body seen from a direction of an arrow A3 in FIG. 18.

Figure 22:
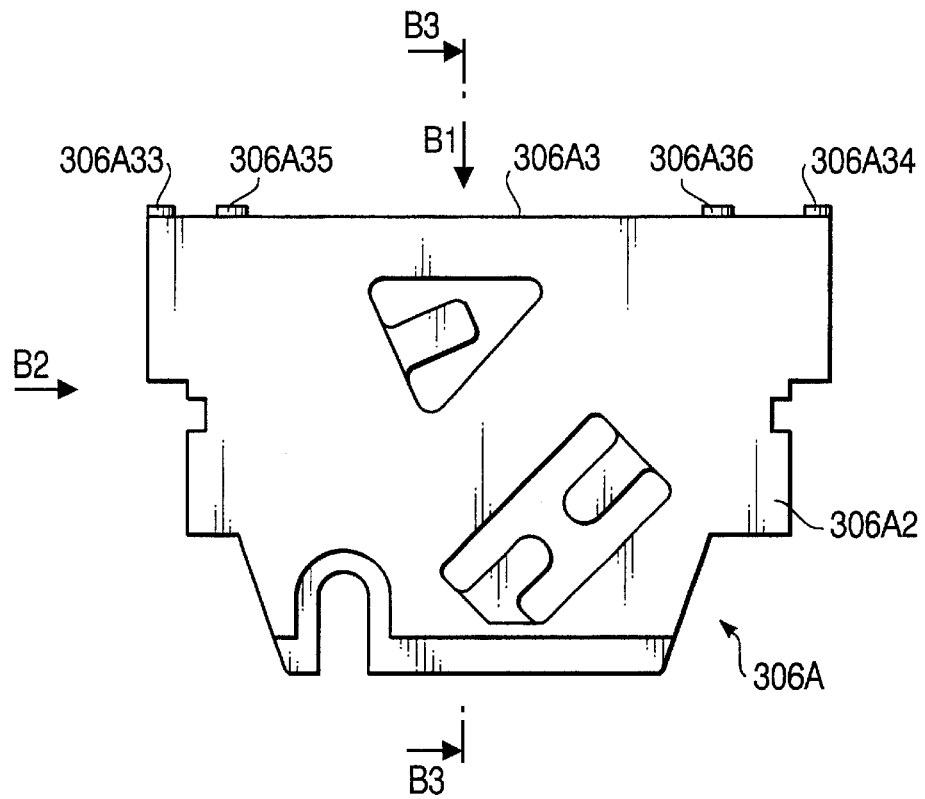
FIG. 22 shows a bottom plan view of a holder holding prisms seen from underside.
Figure 23:
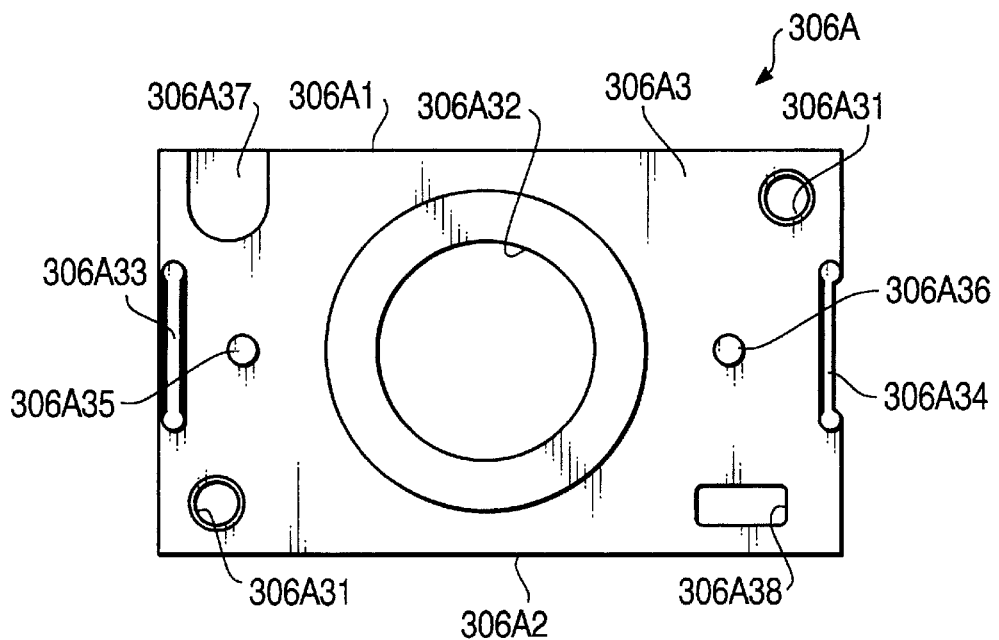
FIG. 23 show a front plan view of the holder illustrated in FIG. 22 seen in an arrow B1 direction.
Figure 24:
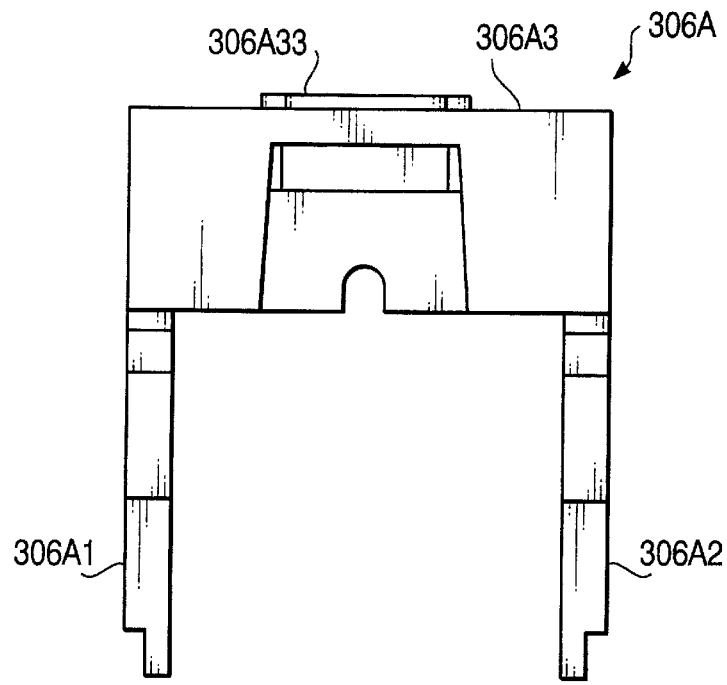
FIG. 24 shows a side view of the holder illustrated in FIG. 22 seen in an arrow B2 direction.
Figure 25:
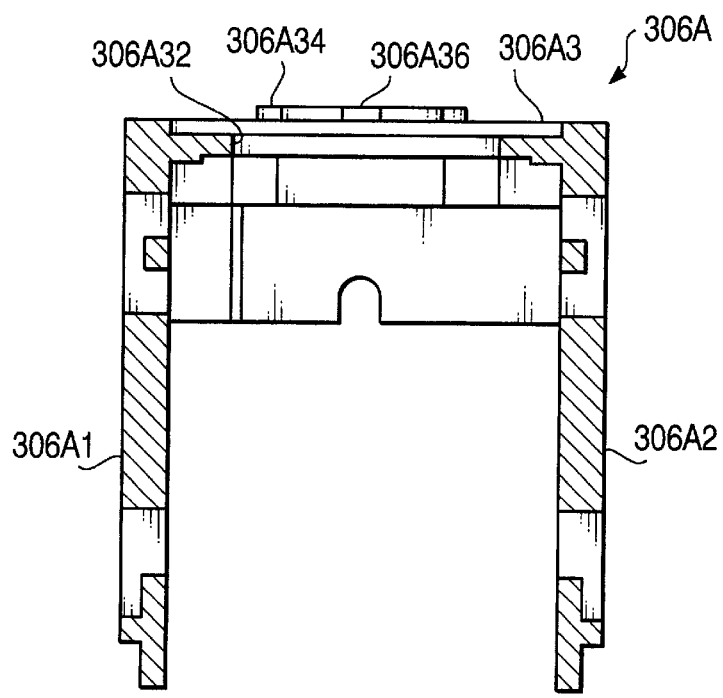
FIG. 25 shows a cross sectional view of the holder illustrated in FIG. 22 seen in an arrow B3 direction.

FIG. 22 shows a bottom plan view of a holder holding a prism, seen from beneath, FIG. 23 shows a front plan view of the holder seen in a direction of an arrow B1 in FIG. 22, FIG. 24 shows a side view of the holder seen in a direction of an arrow B2 in FIG. 22, FIG. 25 shows a cross sectional view of the holder seen in a direction of an arrow B3 in FIG. 22.

Figure 26:
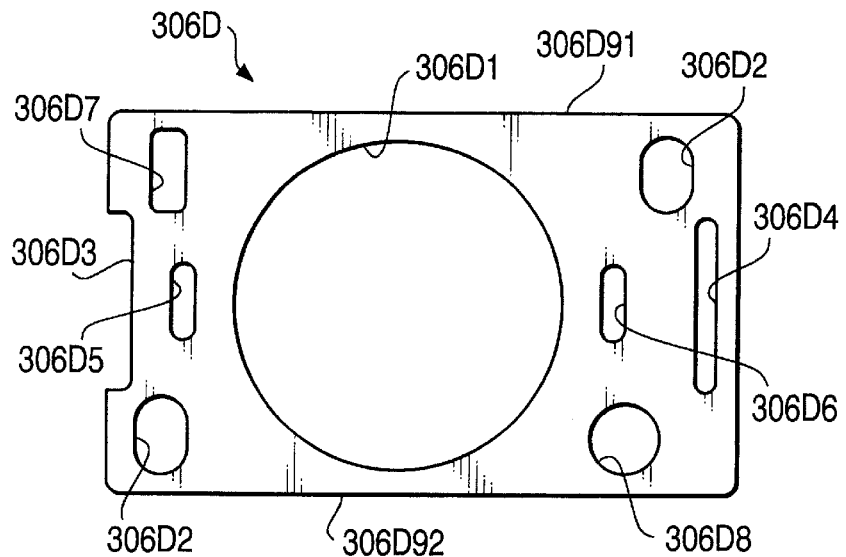
FIG. 26 shows a back plan view of a thin plate.

FIG. 26 shows a back plan view of a thin plate.

Figure 27:
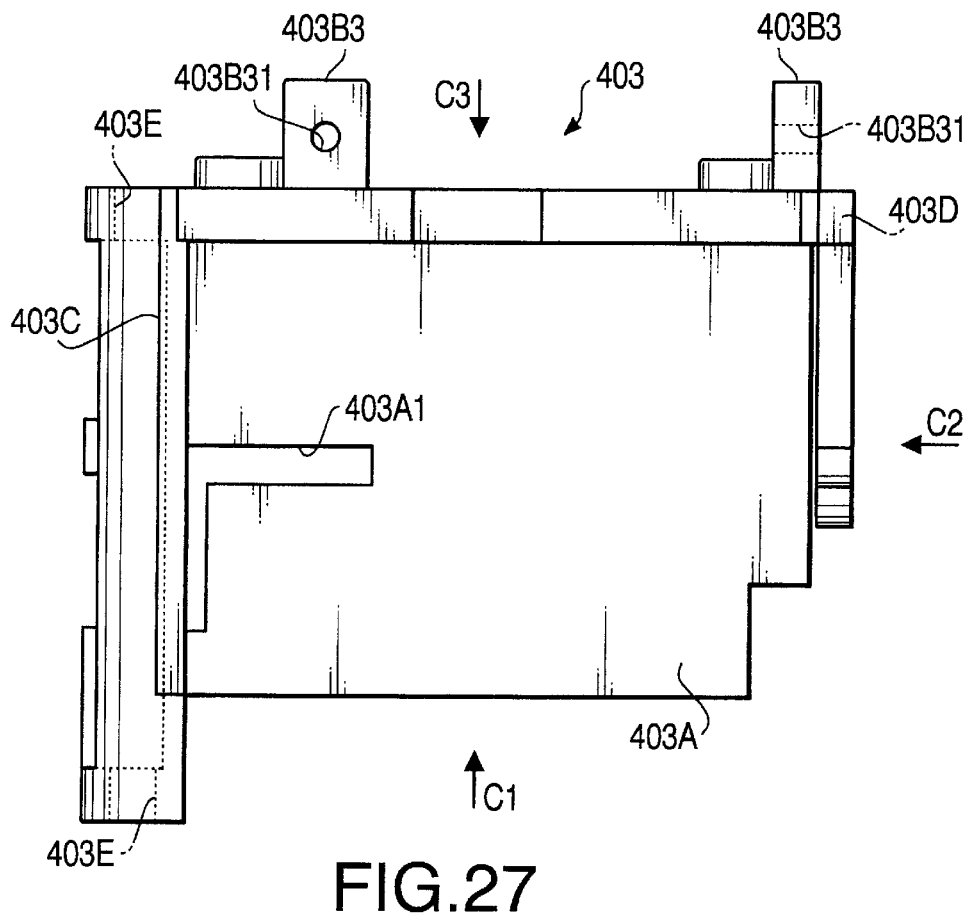
FIG. 27 shows a plan view of a left moving body.
Figure 28:
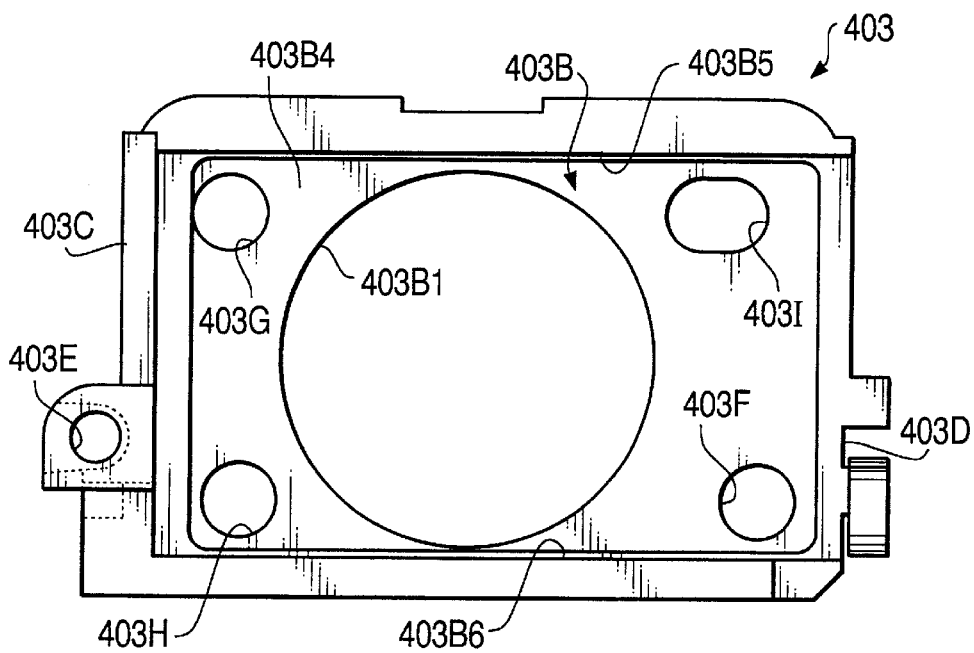
FIG. 28 shows a front plan view of the left moving body illustrated in FIG. 27 seen from an arrow C1 direction.
Figure 29:
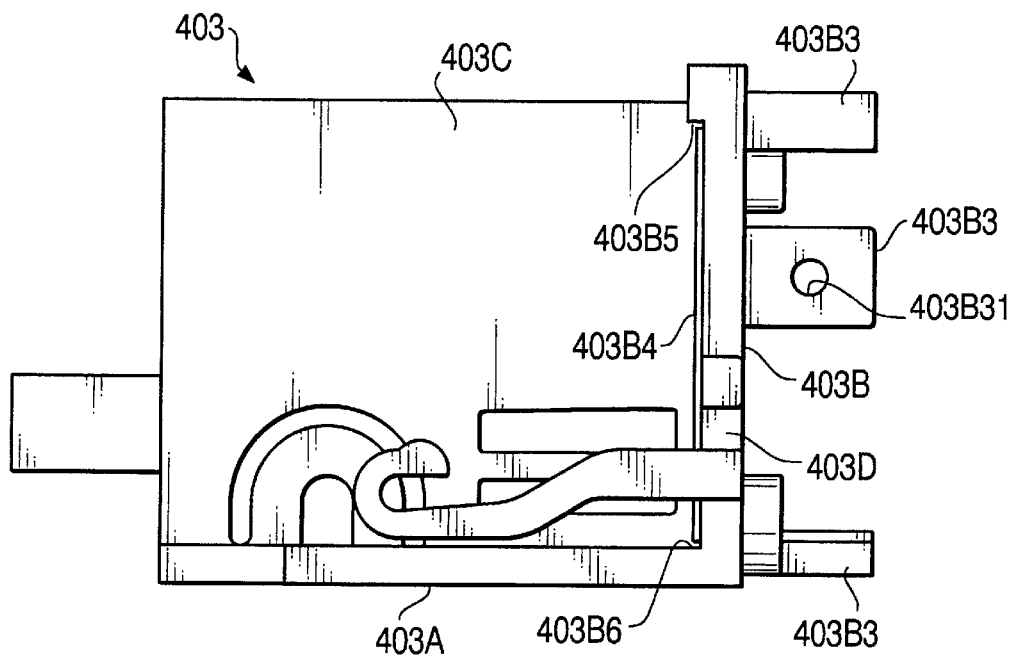
FIG. 29 shows a side plan view of the left moving body illustrated in FIG. 27 seen from an arrow C2 direction.
Figure 30:
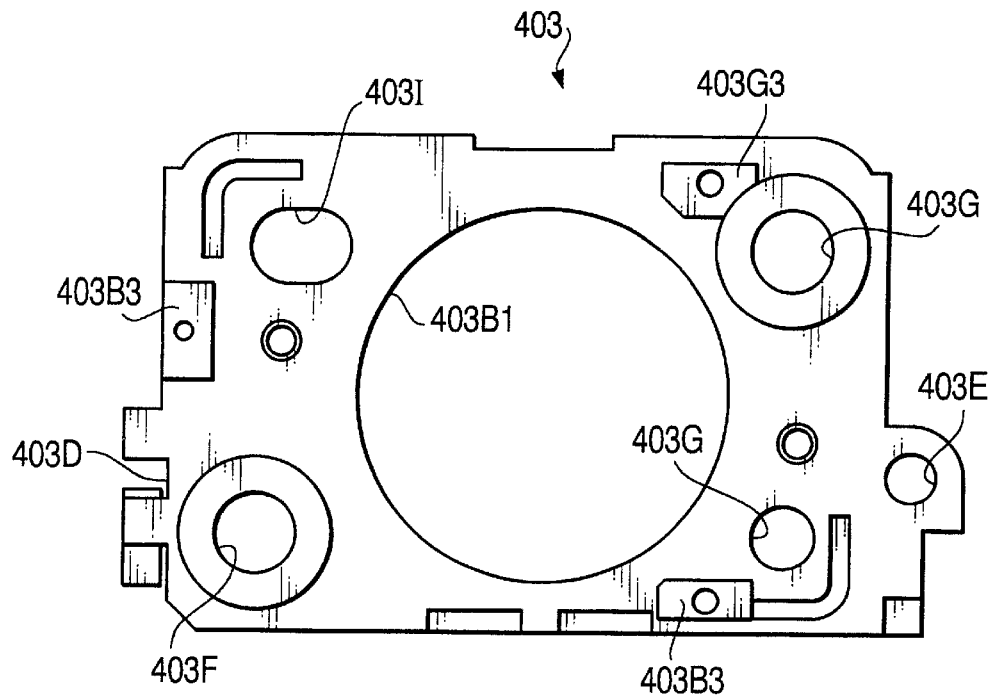
FIG. 30 shows a back plan view of the left moving body illustrated in FIG. 27 seen from an arrow C3 direction.

FIG. 27 shows a plan view of a left moving body, FIG. 28 shows a front plan view of the left moving body seen from a direction of an arrow C1 in FIG. 27, FIG. 29 shows a side plan view of the left moving body seen from a direction of an arrow C2 in FIG. 27, and FIG. 30 shows a back plan view of the left moving body seen from a direction of an arrow C3 in FIG. 27.

Figure 31:
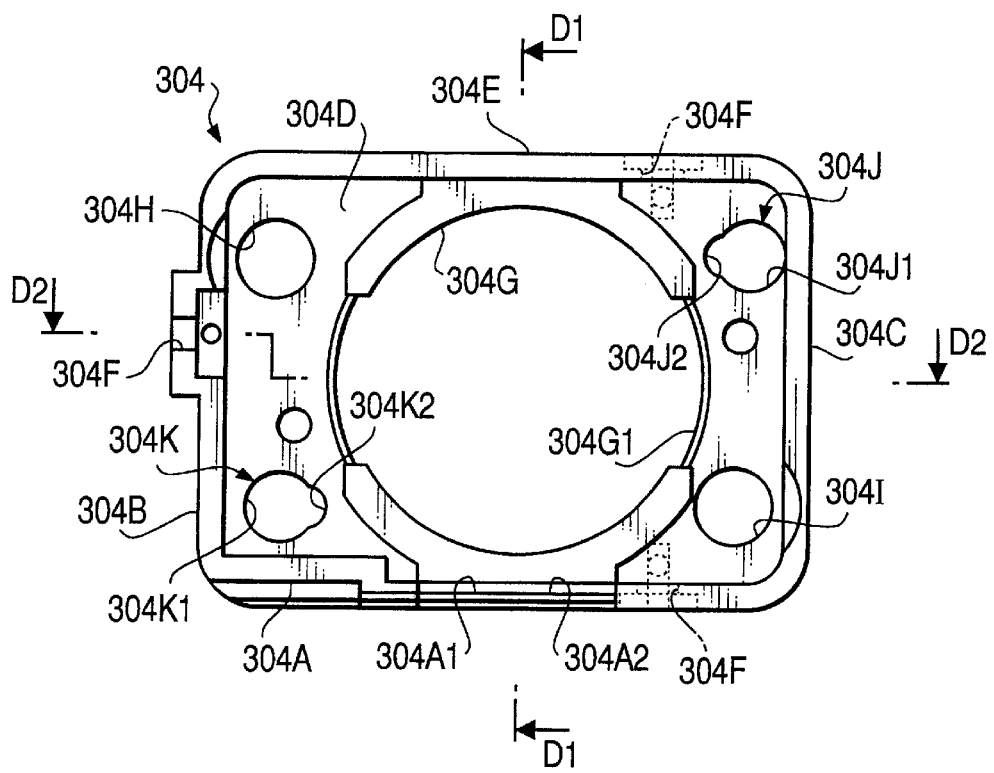
FIG. 31 shows a front plan view of a right eyepiece cylinder seen from the front.
Figure 32:
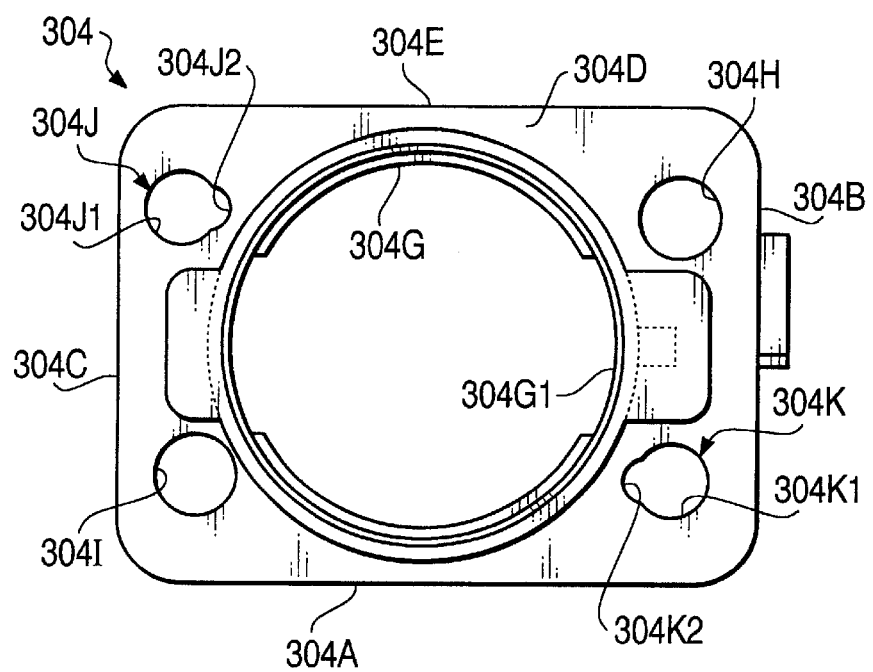
FIG. 32 shows a back plan view of the right eyepiece cylinder seen from the back.
Figure 33:
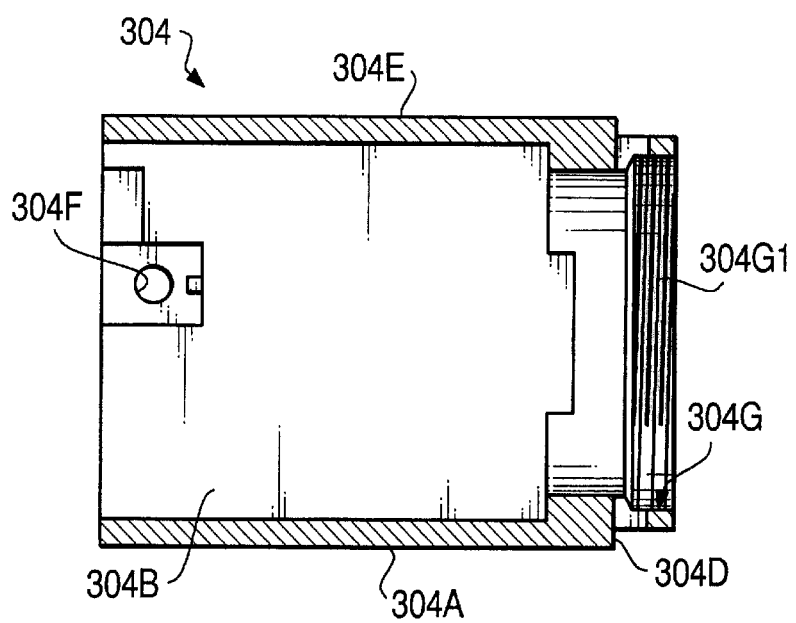
FIG. 33 shows a cross sectional view of the right eyepiece cylinder of FIG. 31 along the line D1—D1.
Figure 34:
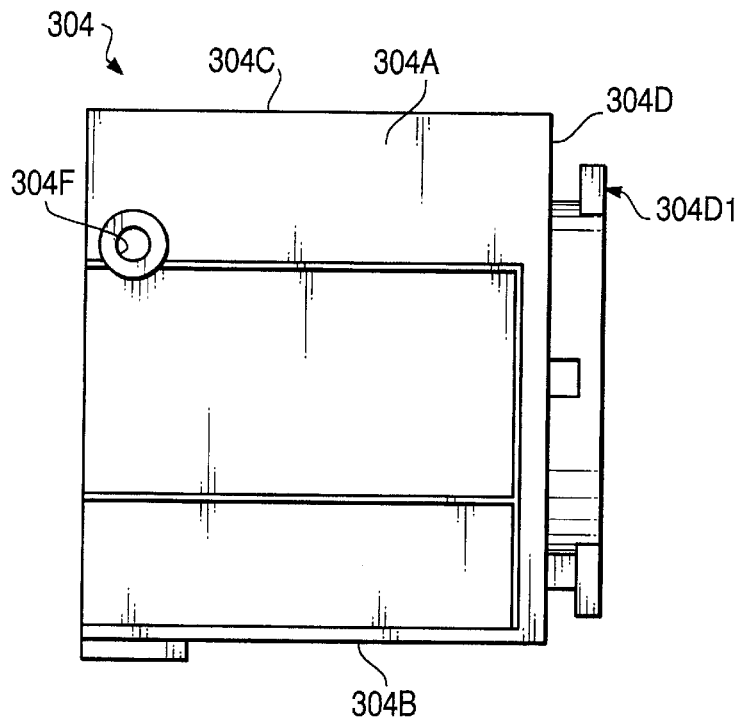
FIG. 34 shows a bottom plan view of the right eyepiece cylinder.
Figure 35:
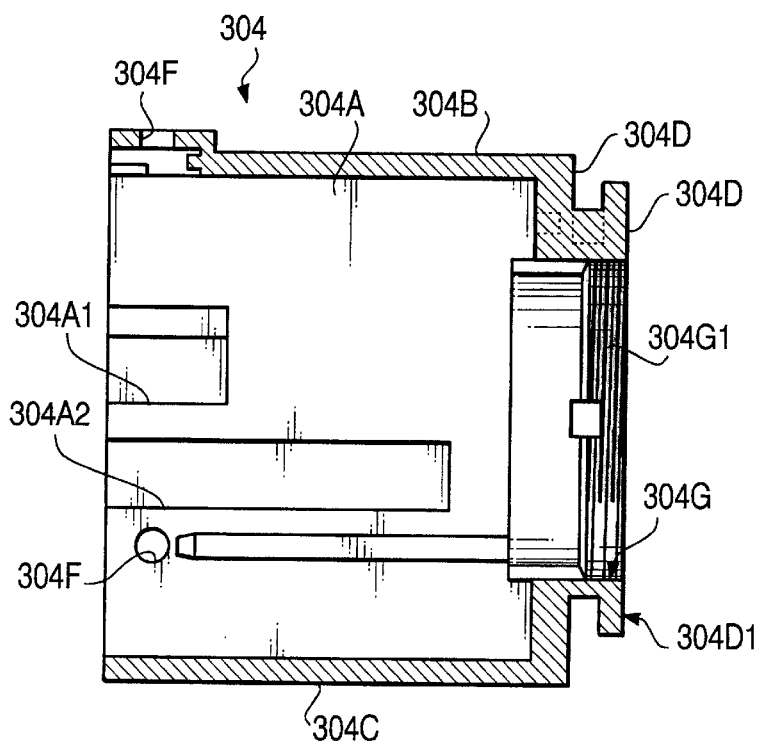
FIG. 35 shows a cross sectional view of the right eyepiece cylinder of FIG. 31 along the line D2—D2.

FIG. 31 shows a front plan view of an right eyepiece cylinder seen from the front, FIG. 32 shows a back plan view of the right eyepiece cylinder seen from the back, FIG. 33 shows a cross sectional view of the right eyepiece cylinder along the line D1—D1 of FIG. 31, FIG. 34 shows a bottom plan view of the right eyepiece cylinder, and FIG. 35 shows a cross sectional view of the right eyepiece cylinder along the line D2—D2 of FIG. 31.

Figure 36:
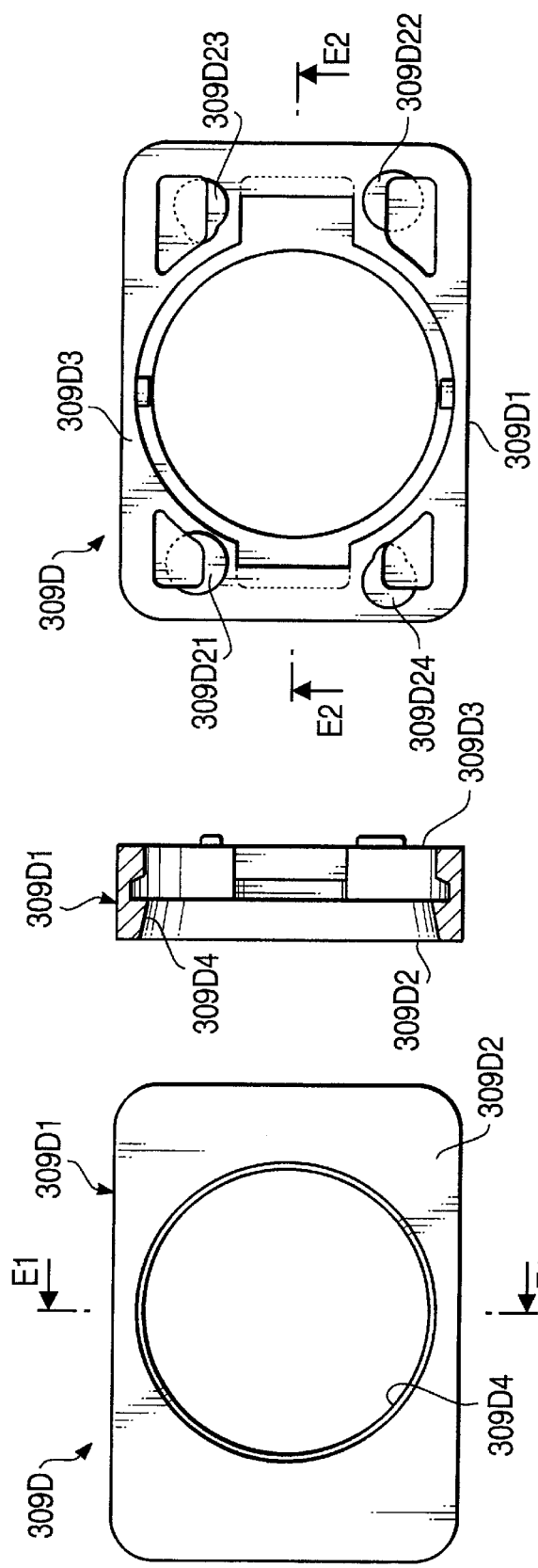
FIG. 36A shows a back plan view of an eyepiece seen from behind.
FIG. 36B shows a side plan view of the eyepiece of FIG. 36A seen from the E1 direction.
FIG. 36C shows a front plan view of the eyepiece of FIG. 36A seen from the front.
FIG. 36D shows a bottom plan view of the eyepiece of FIG. 36C seen from the E2 direction.

FIG. 36A shows a back plan view of an eyepiece seen from behind, FIG. 36B shows a side plan view of the eyepiece seen from a direction of an arrow E1 in FIG. 36A, FIG. 36C shows a front plan view of the eyepiece of FIG. 36A, and FIG. 36D shows a bottom plan view of the eyepiece seen from a direction of an arrow E2 in FIG. 36C.

Figure 37:
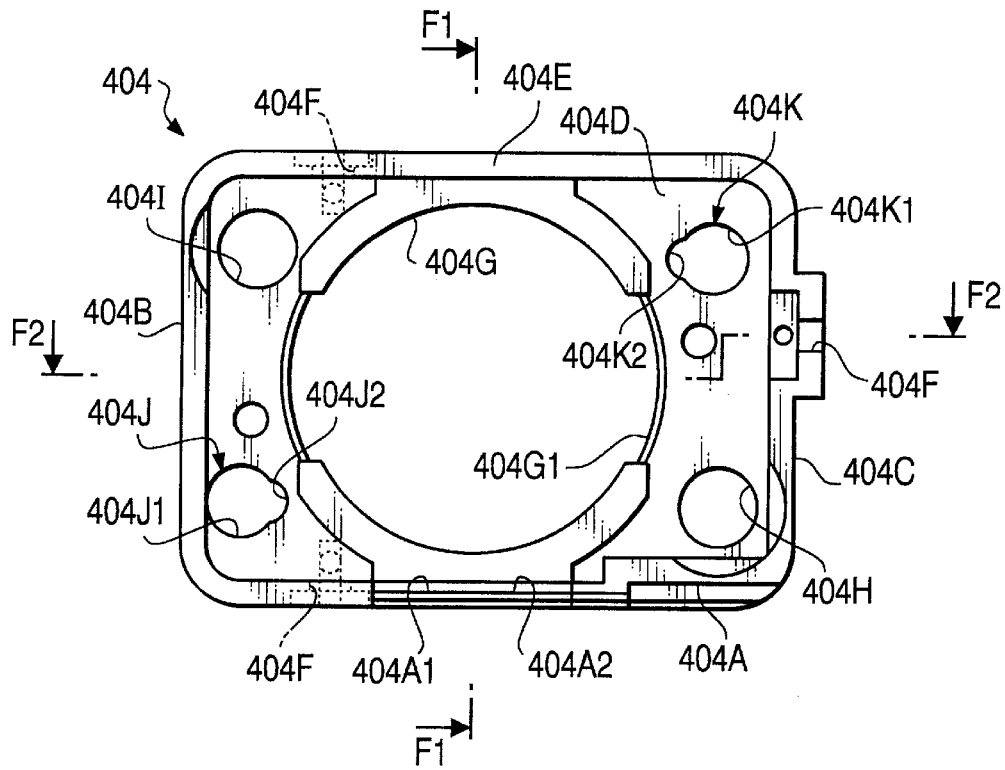
FIG. 37 shows a front plan view of a left eyepiece cylinder seen from the front.
Figure 38:
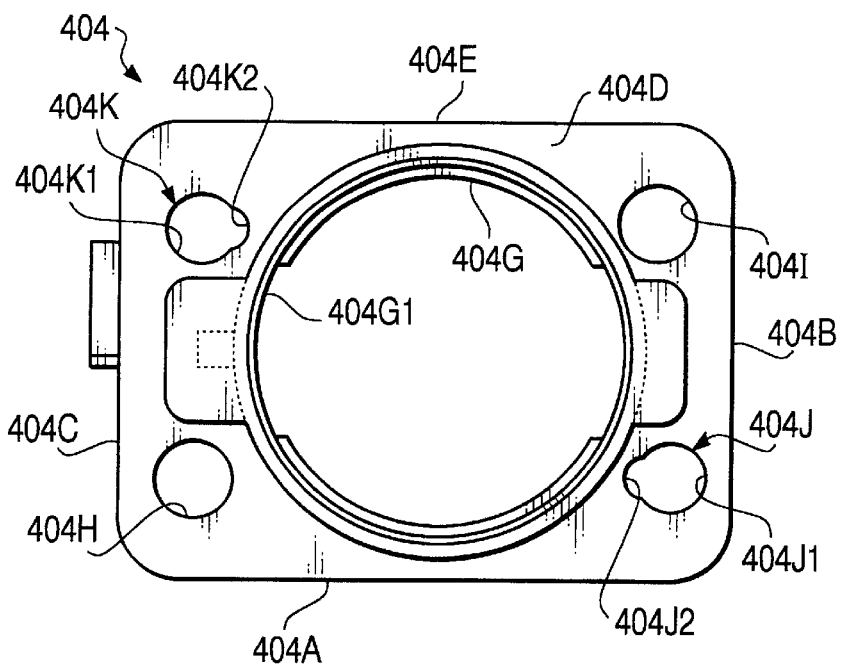
FIG. 38 shows a back plan view of the left eyepiece cylinder seen from the back.
Figure 39:
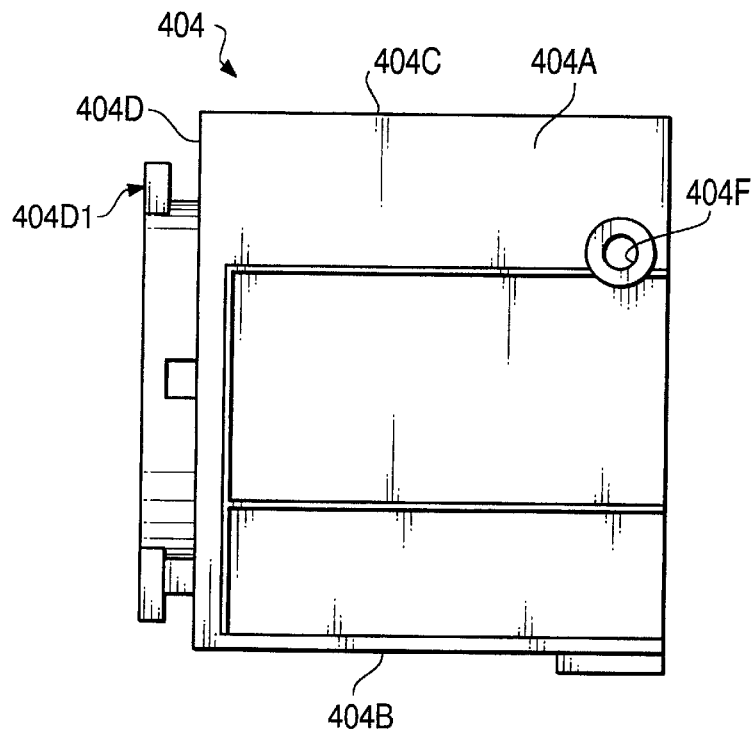
FIG. 39 shows a cross sectional view of the left eyepiece cylinder of FIG. 37 along the line F1—F1.
Figure 40:
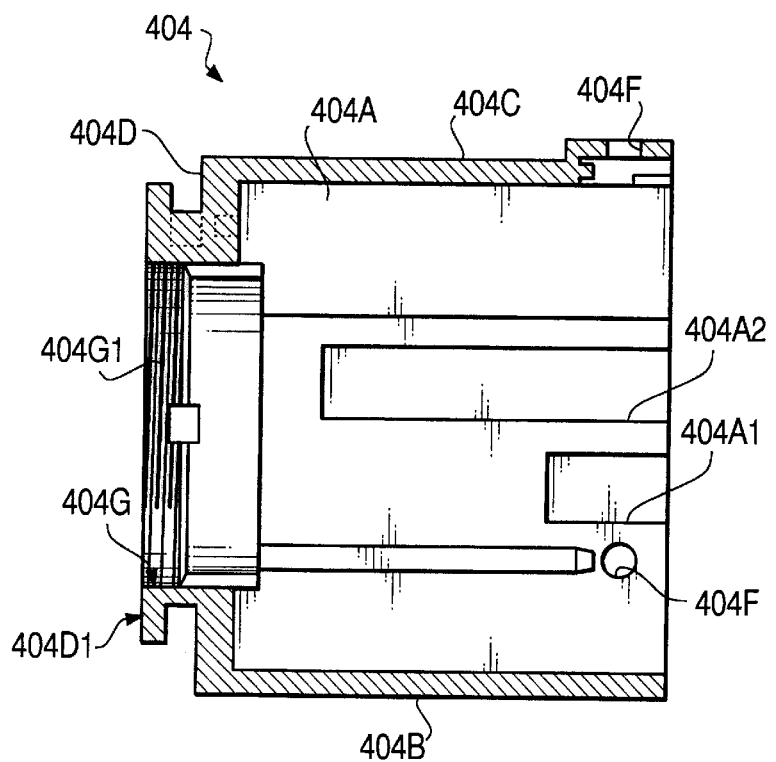
FIG. 40 shows a bottom plan view of the left eyepiece cylinder.
Figure 41:
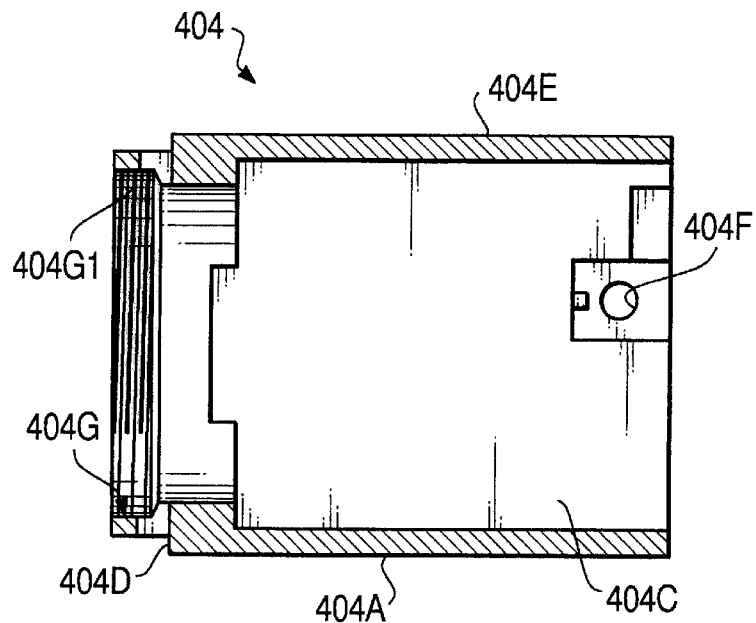
FIG. 41 shows across sectional view of the left eyepiece cylinder of FIG. 37 along the line F2—F2.

FIG. 37 shows a front plan view of a left eyepiece cylinder seen from the front, FIG. 38 shows a back plan view of the left eyepiece cylinder seen from the back, FIG. 39 shows a cross sectional view of the left eyepiece cylinder along the line F1—F1 of FIG. 37, FIG. 40 shows a bottom plan view of the left eyepiece cylinder and FIG. 41 shows a cross sectional view of the left eyepiece cylinder along the line F2—F2 of FIG. 37.

Referring to the FIGS. 7 to 11, the structures of the supporting unit 100 and the optical operating unit will now be described.

As shown in FIGS. 7 through 11, the supporting unit 100 includes a body 101 (shown in FIGS. 9 and 10), a supporting plate 102 (shown in FIGS. 7 and 8), a bottom lid 103 (shown in FIGS. 7 through 9), an upper plate 104 (shown in FIGS. 7 and 11), a pinion gear 105, a right cooperation plate 109, a left cooperation plate 110 and other parts as described below. The bottom lid 103 together with the diopter decorative ring 106 and a diopter arranging eccentric seat 107 form a diopter correction unit, which is described below.

The supporting plate 102 is formed in a generally rectangular shape, and has longitudinal sides that are substantially parallel to front and rear edge lines of the binocular 1000. The right and left sides of the supporting plate 102 are parallel to the right and left sides of the binocular 1000.

As shown in FIG. 8, two protrusions 102A1 and 102A2 are formed disposed in the vicinity of the upper right edge portion, near to the front corner and rear corner, respectively, of the supporting plate 102. Similarly, two protrusions 102B1 and 102B2 are formed disposed in the vicinity of the upper left edge portion, near to the front corner and rear corner, respectively, of the supporting plate 102.

Two protrusions 102B3 and 102A3 are formed in this order from the front side of the supporting plate 102 and projecting therefrom, and positioned approximately on the binocular center line between the lateral sides on the supporting plate 102. A circular opening 102C is formed between the front protrusion 102B3 and the front edge, and a threaded hole 102D is formed (penetrating the supporting plate 102) between the two protrusions 102B3 and 102A3.

Two engaging grooves 102H1 and 102I1 are formed (penetrating the supporting plate 102 in the height direction), extending near to and parallel to the front edge of the supporting plate 102. The engaging groves 102H1 and 102I1 are formed symmetrically with respect to the center of the width of the binocular 1000. Similarly, two engaging grooves 102H2 and 102I2 are formed (penetrating the supporting plate 102 in the height direction) extending near to and parallel to the rear edge of the supporting plate 102. The engaging groves 102H2 and 102I2 are also formed symmetrically with respect to the center of the width of the binocular 1000.

Two notches 102J1 and 102J2 are formed disposed at a predetermined distance along the right edge of the supporting plate 102, near to the front and rear edge, respectively, and opening toward the right. Two notches 102K1 and 102K2 are provided similarly at the left edge disposed at a predetermined distance along the left edge of the supporting plate 103 and opening to the left.

A right slide (cooperation) plate 109 includes a rectangular body 109A, and an extending member 109B extending from the rectangular body 109A. Two guiding grooves 109A1 and 109A2 are formed near to front and rear edge of the rectangular body 109A, extending in the width or lateral direction, so as to receive the projections 102A1 and 102A2 penetrating therethrough. A guiding groove 109B1 is formed on the extending member 109B, extending laterally, to receive the projection 102A3 penetrating therethrough.

Two threaded holes 109C1 and 109C2 are provided, penetrating the right slide plate 109, respectively positioned at the front and rear corners of the left side of the body 109A of the right slide plate 109. Two threaded holes 109D1 and 109D2 are provided, penetrating the right slide plate 109, respectively positioned at the front and rear corners of the right side of the body 109A of the right slide plate 109. The threaded holes 109C1 and 109C2 are disposed with the same distance therebetween as is between the guiding grooves 102H1 and 102H2, and the through-hole 109D1 and 109D2 are disposed with the same distance therebetween as is between the notches 102J1 and 102J2 on the supporting plate.

The left slide (cooperation) plate 110 includes a rectangular body 110A, and an extending member 110B extending from the rectangular body 110A. Two guiding grooves 110A1 and 110A2 are formed near to the front and rear edges of the rectangular body 110A, extending laterally or in the width direction, so as to receive the projections 102B1 and 102B2 penetrating therethrough. A guiding groove 110B1 is formed on the extending member 110B, extending laterally, to receive the projection 102A3 penetrating therethrough.

Two threaded holes 110C1 and 110C2 are provided, penetrating the left slide plate 110, respectively positioned at the front and rear corners of the left side of the body 110A of the left slide plate 110. Two threaded holes 110D1 and 110D2 are provided, penetrating the left slide plate 110, respectively positioned at the front and rear corners of the left side of the body 110A of the left slide plate 110. The threaded holes 110C1 and 110C2 are disposed with the same distance therebetween as is between the guiding grooves 102I1 and 102I2, and the through-hole 110D1 and 110D2 are disposed with the same distance therebetween as is between the notches 102K1 and 102K2 on the supporting plate.

A right rack 109B2 and a left rack 110B2 are provided respectively at the front edge of the extending member 109B of the right slide plate 109, and at the rear edge of the extending member 110B of the left slide plate 110. The right rack 109B2 and left rack 110B2 extend laterally, in the width direction, toward the center of the binocular 1000.

The right slide plate 109 is slidably supported on the supporting plate 102. The guiding grooves 109A, 109A2 and 109B1 have inserted therethrough, respectively, the projections 102A1, 102A2 and 102A3, each of which has a threaded hole formed thereon. In this manner, screws 802 are engaged to the threaded holes having intervening washers 801.

The left slide plate 110, similarly, includes guiding grooves 110A1, 110A2 and 110B1 having inserted therethrough, respectively, the projections 102B1, 102B2 and 102B3, each of which has a screw engaging a threaded hole and intervening washers 801.

A pinion gear 105 is disposed between the right and left rack 109B2, 110B2 so as to mesh with the two racks 109B2, 110B2. The shaft portion of a screw 803 penetrates the threaded hole 102D on the supporting plate 102 from the underside thereof, and also penetrates a center hole of the gear 105, ultimately engaging a threaded hole 103A of the bottom lid 103.

The position and arrangement of the bottom lid 103 are shown in FIGS. 7 and 8. The bottom lid 103 and the supporting plate 102 are positioned on either side (top and bottom, respectively) of the extending portion 109B of the right slide plate 109 and the extending portion 110B of the left slide plate 110. Further, the bottom lid 103 is positioned between the under surface of the body 101 and upper surface of the supporting plate 102 in a manner detailed below.

The position of bottom lid 103 with respect to the supporting plate 102 is determined as described herein. Edge portions 103B (the right side edge portion 103B being hidden in FIG. 8) formed on the right and left front edges are inserted into the grooves 102E extending along the optical direction, on both right and left edges of the supporting plate 102. Accordingly, notches 103C formed at the rear right and left edges of the bottom lid 103 are fitted into the projections 102F formed at the rear right and left edges, symmetrically formed with respect to the width direction, on the upper surface of the supporting plate 102. Accordingly, the bottom lid 103 is positioned on the supporting plate 102. In the center of the projection 102F is formed a threaded through-hole 102G, through which a screw 806 is inserted. It should be noted that throughout the drawings, the various screws (including the screw 806 and various other screws) are in some cases exaggerated in scale to aid review of the drawings.

In the bottom lid 103 are formed four protrusions 103D projecting downward in the height direction. A center portion of each protrusion 103D is curved downward, i.e., having a lowest point in the lateral center, so that the protrusions 103D exhibit a curved plane (arcing from left to right) extending perpendicularly to the longitudinal direction of the bottom lid 103. These four protrusions 103D press the upper surface of the extending portion 109B of the right slide plate 109 and the extending portion 110B of the left slide plate 110 (i.e., the rear two protrusions 103D press on the right side plate 109, while the front two protrusions 103D press on the left side plate 110) to create friction force when the right and left slide plates 109 and 110 are moved laterally. This friction force gives abetter feeling to the operation of sliding the optical barrels 300 and 400 laterally, as detailed below.

With the above constitution, the rack 109B2 of the right slide plate 109 and the rack 110B2 of the left slide plate 110 mesh with the pinion gear 105, so that the right slide plate 109 and left slide plate 110 slide toward and away from each other in the lateral direction. Moreover, since the racks 109B2, 110B2 and the pinion gear 105 have the same tooth pitch for engagement, the right slide plate 109 and left slide plate 110 simultaneously move the same distance (with respect to each other).

A through-hole 103G is formed in an area surrounded by the right and left protrusions 103B, at the front part of the bottom lid 103.

A user diopter adjustment mechanism is shown in FIGS. 6 through 9. As shown in FIGS. 6 through 8, the diopter decorative ring 106 has a disc-shaped diopter correction body 106A having a disc diameter that is larger than that of the through-hole 103G, a shaft portion 106B projected from the upper center of the body 106A, and a threaded hole 106C that is formed on the shaft portion 106B. The diopter correction body 106A has an axis parallel to that of the shaft portion 106B. As shown in FIGS. 6 through 9, the diopter decorative ring 106 engages a diopter eccentric seat 107. The diopter is corrected by rotating the body 106A about the axis of the shaft portion 106B, as detailed below, which in turn rotates protrusions 107C of the diopter eccentric seat 107 engaging indentations 106D, and thereby the entire diopter eccentric seat 107. Two engaging protrusions 107C are provided on opposite sides of the eccentric axis of the diopter eccentric seat 107, for engaging two engaging slots 106D of the diopter decorative ring 106. Here, even if only one engaging slot 106D and corresponding protrusions 107C of the diopter eccentric seat 107 engage, the mechanism can correct the diopter; that is, engagement via only one engaging slot 106D and only one corresponding protrusion 107C may be considered equivalent, although engagement of two portions provides more positive driving.

As shown in FIGS. 6 through 9, the diopter eccentric seat 107 is provided with a disk-shaped body 107A having a disc diameter that is larger than the inner diameter of the through-hole 103G, an eccentric hole 107B penetrating the disk-shaped body 107A in the height direction, with a predetermined eccentricity relative to a center of the body 107A, and the two protrusions 107C which are inserted to the two engaging slots 106D of the diopter decorative ring 106.

As assembled, the shaft portion 106B of the diopter decorative ring 106 penetrates the through-hole 103G from the under side of the bottom lid 103, and is inserted into the eccentric hole 107B of the diopter eccentric seat 107. The two protrusions 107C of the diopter eccentric seat 107 are inserted into the two engaging slots 106D of the diopter decorative ring 106. As shown in FIGS. 6 through 8, a screw 805, having a spring washer 804, is inserted through the eccentric hole 107B of the diopter eccentric seat 107 and affixed, so that the shaft portion of the screw 805 is screw coupled into the screw hole 106C formed at the shaft portion of the diopter decorative ring 106, fixing the diopter eccentric seat 107 on the diopter decorative ring 106 via the bottom lid 103.

In such a constitution, as shown in FIG. 6, the body 106A of the diopter decorative ring 106 is exposed (downward from the bottom surface of the supporting plate 102) via the through-hole 102C. The diopter decorative ring 106, coupled with the diopter eccentric seat 107, is disposed at the center in the width direction of the binocular 1000 and near to the front end of the binocular 1000.

Referring to FIGS. 6 through 9, the periphery of the through-hole 103G under the bottom lid 103 is formed with a protrusion 103J in the peripheral direction (hidden in FIG. 6). The protrusion 103J engages with a curved channel 106E on the upper portion of the diopter decorative ring 106 while engaged, so that the end of the peripheral curved channel 106E of the diopter decorative ring 106 abuts the end of the peripheral protrusion 103J, controlling the amount of the rotation of the diopter decorative ring 106.

The diopter decorative ring 106 and the diopter correction eccentric seat 107 are integrally fixed in the rotation direction of the shaft 106B (by the engagement between the concaved portion 106D and the protrusions 107C) but are slightly movable in the shaft direction of the shaft portion 106B so as to permit detent "clicking" as described below.

Referring to FIGS. 6 through 9, an engagement portion 103H composed of a plurality of detent knurled portions extends about the peripheral direction of the through-hole 103G, formed at the peripheral portion of the through-hole 103G of the upper surface of the bottom lid 103. Further, a protrusion or set of protrusions 107D (hidden in FIG. 6) formed under the surface of the diopter eccentric seat 107 engages the engaging portion 103H. One protrusion is sufficient (although two or more may be used). Accordingly, the protrusion(s) 107D "clicks" with the engaging portion 103H, while the diopter decorative ring 106 is rotated, giving a comfortable operational clicking feeling (tactile and/or auditory feedback) thereby. In this operation, the spring washer 804 presses the under surface of the body 107A and the protrusions 107D of the diopter eccentric seat 107 onto the engaging portion 103H to provide sufficient play to permit the "clicking" engagement without excessive tightness or jamming.

As shown in FIGS. 9 and 10, the body 101 is configured with a front wall 101A, a rear wall 101B, a right wall 101C and a left wall 101D, all of the walls being rectangularly shaped. The front and rear wall 101A and 101B are connected by the right and left walls 101C and 101D respectively at the right and left sides of the body 101. The upper and lower parts of the body 101 are open in a rectangular shape.

The bottom part of the body 101, being covered by the bottom lid 103, is coupled onto the supporting plate 102. Four screws 806 are inserted through four screw holes 102G formed on the supporting plate 102, to be screw coupled to the four threaded holes 101E formed at the under side of the body 101.

As shown in FIGS. 7 and 11, the upper plate 104 is formed in a generally rectangular shape, is of approximately the same size as the supporting plate 102, and covers the upper part of the body when attached. Openings 104B and 104C are formed in the center in the width direction near to the rear end of the binocular, so that a portion of each of the focus arrangement ring 202 and zooming arrangement ring 204 which are accommodated therein are exposed therethrough.

Rectangular shaped decorative plates 101I and face plate 101J are respectively attached to the front side of the front wall 101A and the rear side of the rear wall 101B.

In the supporting portion 100 mentioned above, the body 101, supporting plate 102, bottom lid 103 and the upper plate 104 are integrally fixed. The right slide plate 109 and left slide plate 110 are supported to be slidable in the width direction by the supporting plate 102.

The optical operating unit 200, shown in FIGS. 7, 10, and 11, is described below.

Referring to both FIGS. 10 and 11, the optical operating unit 200 is provided with a body 101 (FIG. 10), a main shaft 201 (FIGS. 10 and 11), a focus arrangement ring 202 (FIGS. 10 and 11), a zooming arrangement ring 204 (FIG. 11), a movement shaft 206 (FIGS. 10 and 11), a cam ring 207 (FIGS. 10 and 11), a first lens guiding piece 208 (FIGS. 10 and 11), a second lens guiding piece 209 (FIG. 11), a cam frame 210 (FIG. 11), a guiding piece shaft 211 and 212 (FIG. 11), a first lens slider 213 (FIG. 10), a second lens slider 214 (FIG. 10), a pressing plate 215 (FIG. 10), a cooperation shaft 216 (FIG. 10) and additional parts as discussed below.

As shown in FIGS. 10 and 11, the main shaft 201 extends parallel to the optical axes of the lens barrels 300 and 400. The front and rear ends of the main shaft 201 are supported respectively by axle bearings (101A1 and 101B1) provided on the front wall 101A and rear wall 101B of the body 101. The main shaft 201 rotatably supports the focus arrangement ring 202 and the zooming arrangement ring 204, as detailed below. The diopter decorative ring 106 is rotatably disposed about an axis perpendicular to the axis of the main shaft 201.

On the outer peripheral surface of the front end portion, splines 201A are formed extending along the axis direction, disposed at a predetermined distance about the periphery of the front end portion of the main shaft 201 and extending for a predetermined distance along the front end portion of the main shaft 201. These splines 201A inserted into matching grooves 207B formed in a hole 207A of the cam ring 207.

The zooming arrangement ring 204 includes a ring-shaped body 204A and a rubber ring 204B covering the outer periphery of the body 204A.

The body 204A includes a hole A1 having an inner bore through which the rear portion of the main shaft 201 is inserted, the body 204A being coupled to the main shaft 201. A screw 808 screw-couples the body 204A to the rear portion of the main shaft 201 from the rear side.

As shown in FIGS. 10 and 11, the cam ring 207 includes a wall portion 207C that is substantially cylindrically shaped. The center axis of the wall portion 207C is coaxial with the axis of the main shaft 201. An outer surface of the wall portion 207C is provided with an outer circumferential surface 207C1 that is cylindrically shaped.

The wall portion 207C of the cam ring 207 is provided with a ring-shaped wall 207A, formed at one end of the wall portion 207C in the center axis direction.

The wall 207A has a hole 207A1 formed therein, bored through the center. About the diameter (the inner surface) of the hole 207A1 are formed protrusions 207B protruding toward the central axis. The protrusions 207B engage the groove 201A of the main shaft 201, so that the main shaft 201 supports the cam ring 207 via the hole 207A1 and protrusions 207B to be movable along the main shaft 201 but not rotatable with respect to the main shaft 201.

The wall portion 207C is optionally provided with two arcuate shaft bearings (internal, not shown) protruding in an arc about the center axis and arranged as two symmetrical portions about the axis of the main shaft 201 (coaxial with the axis of the moving shaft 206).

As noted, the bearings 207F are arcuate, receiving the outer circumferential surface of the second shaft portion 206B of the moving shaft 206. The bearings 207F are rotatably supported by the second shaft portion 206B of the moving shaft 206 (i.e., the bearings 207F support the cam ring 207 to be rotatable about the moving shaft 206).

The outer circumferential surface 207C1 of the cam ring 207 is provided with two first cam grooves 207D and two second cam grooves 207E formed thereon. The two first cam grooves 207D are configured to have substantially the same shape as one another, and the two second cam grooves 207E are also configured to have substantially the same shape as one another. Although the same shape, as noted below, the cam grooves 207D and 207E extend in different directions.

The two first cam grooves 207D and the two second cam grooves 207E are formed on the outer circumferential surface 207C, extending by a predetermined distance along the circumferential direction. The two first cam grooves 207D and the two second cam grooves 207E are formed at substantially the same position (front to back) along the central axis of the cam ring 207, that is, about the shaft axis line of the main shaft 201. The two first cam grooves 207 and the two second cam grooves 207E extend in directions that are transverse to one other on the outer circumferential surface 207C.

The moving shaft 206 includes a first shaft portion 206A provided at the rear portion thereof, a second shaft portion 206I at the front portion thereof, a flange 206C formed between the first and second shaft portion, and a hole 206D penetrating the first shaft portion 206A. The flange 206C and the second shaft portion 206B extend along the axis of the moving shaft 206. The inner diameter of the hole 206D is formed so that the main shaft 201 is rotatable while inserted therethrough.

A helical guiding groove 206A1 is formed on the outer peripheral surface of the first shaft portion 206. The guiding groove 206A1 includes a first groove portion 296A11 with a wide pitch along the shaft direction, and a second groove portion 206A12 with a narrow pitch (in this order toward the object side).

The focus arrangement ring 202 includes a ring body 202A and a rubber ring 202B, the rubber ring covering the circumference of the body 202A. The diameters of the focus arrangement ring 202 and zooming arrangement ring 204 are formed to be approximately the same size. That is, the outer diameters of the rubber ring 202B and 204B have nearly the same size.

The inner peripheral surface 202A1 of the body 202A has two ball holders 202A11 formed therein on the opposite positions in the diameter direction to hold two balls 203. The two balls 203 can rotate but are not movable in the diameter direction.

An arm 202A1 is integrally formed on the body 202A (shown in FIG. 11), extending in the diameter direction, to rotate when the focus arrangement ring is rotated. When the focus arrangement ring is rotated, the balls 203 engaged in the engagement portion 202A11 on the arm 202A1 move along the helical guiding groove 206A1 formed in the first shaft portion 206A of the moving shaft 206. The helical guiding groove 206A1 is formed "doubled screwed", i.e., having a thread pitch that changes along its length (at a certain point) from coarser to finer.

Protrusions 206C4, 206C5 (shown in FIG. 11) are formed on the right and left portion of the flange 206C of the moving shaft 206. The protrusions 206C4, 206C5 are arranged to engage and move along guiding grooves 101C11 and 101D11 (shown in FIG. 9) formed extending along the right and left wall 101c and 101D.

When assembled, each protrusion 206C1 and 206C2 abuts a respective bank 101C12 and 101D12 (shown in FIGS. 9 and 10) for restricting the front range of the moving shaft 206. Moreover, each protrusion 206C4 and 206C5 abuts the rear wall 101G1 (shown in FIGS. 9 and 10) of the body 101 for restricting the rear movable range.

As shown in FIG. 11, when the balls 203 engage the first groove 206A11 (with a wide/coarser pitch), the moving amount of the moving shaft by rotation of the focus rotation ring 202 is larger than that when engaging the second groove 206A12 (with a narrow/finer pitch).

The cam frame 210, shown in FIG. 11, is a substantially ring-shaped frame, having an inner portion 210A. Both of the upper sides of the inner portion 210A hold a shaft (numbered 211, 212 on right and left sides) extending parallel to the optical axis. The circumference of each shaft 211, 212 faces the center axis of the cam frame 210. The first lens guiding piece 208 and the second lens guiding piece 209 are slidably held on shafts 211, 212, respectively.

The cam frame 210 is held by an inner surface 101C1 of a right side wall 101C and an inner surface 100D1 of a left side wall 101D of the body 101, so that the cam frame 210 can move along the optical axis, but is not rotatable about the axis.

The main shaft 201 is inserted in a hole 207A of the cam ring 207, and the cam ring 207 is axially and slidably supported by the main shaft 201. The cam ring 207 is rotatably supported by the second shaft portion 206B of the movement shaft 206 such that the cam ring 207 is rotatable relative to, but fixed axially with respect to, the second shaft portion 206B. A bayonet-type engagement formed on the second shaft portion 206B near the flange 206C and on the rear of the cam ring 207 is employed for this purpose, although other structures would serve as well. Accordingly, the cam ring 207 is supported by the main shaft 201, and is not rotatable but is movable in the axial (optical axis) direction with respect to the main shaft 201.

The cam frame 210, accommodating the cam ring 207, is coupled to the flange 206C of the moving shaft 206 by three screws 809, so that the cam frame 210 and the moving shaft 206 are integrally fixed.

The substantially cylindrical inner portion 210A has a right arm 210C1 on the right side of the cam frame 210, and a left arm 210C2 on the left side of the cam frame 210. The rear portions of the right and left arms 210C1 and 210C2 are respectively provided with threaded holes 210C11 and 210C21 opening rearward. In addition, a rear part of a connecting arm 210D facing rearward has a threaded hole formed therein (not shown), the threaded hole opening toward the rear of the binocular 1000. Threaded holes 210C11, 210C21 and the threaded hole opening to the rear are screw coupled by screws 809 that are inserted via the through-holes 206C1, 206C2 and 206C3 provided on the flange 206C of the moving shaft 206, so that the cam frame 21 is fixed to the moving shaft 206. Moreover, the rear end of the connecting arm 210 has a threaded hole 210D1 formed therein facing downward.

Protrusions 206C4, 206C5 (shown in FIGS. 10 and 11) are formed protruding from the right and left edge portions of the flange 206C of the moving shaft 206.

Guiding grooves 101C11 and 101D11 are formed respectively on the upper portions of the inner surfaces 101C1 and 101D1 of the respective right wall 101C and left wall 101D, the guiding grooves 101C11 and 101D11 extending in the optical axis direction.

The protrusions 206C4 and 206C5 engage the guiding grooves 101C11 and 101D11 and move along the guiding grooves 101C11 and 101D11 that extend along the right and left wall 101C and 101D. That is, the flange 206C is movable along the optical axis direction but not rotatable about the optical axis direction. Accordingly, the moving shaft 206 and cam frame 210 are movable along the optical axis direction but not rotatable about the optical axis direction.

Each protrusion 206C1 and 206C2 abuts respective banks 101C12 and 101D12 for restricting the front (forward) movable range of the moving shaft 206. Moreover, each protrusion 206C4 and 206C5 abuts the rear wall 101G1 of the body 101 for restricting the rear (backward) movable range.

The second shaft portion 206B of the main shaft 201 is inserted into a hole 207A of the cam ring 207, so that the cam ring 207 is rotatably supported by the second shaft portion 206B.

As noted above, the cam frame 210, accommodating the cam ring 207 therein, is coupled to the flange 206C of the moving shaft 206 via three screws 809, so that the cam frame 210 and the moving shaft 206 are integrally coupled.

The body 101 is provided with two guiding portions 101C2 (hidden) and 101D2 formed on the lower edges of the right wall 101C and left wall 101D, at a region exposed downward. The guiding portions 101C2 and 101D2 are provided with ridges extending along the optical axis direction and disposed laterally with the same predetermined distance from the center of the body 101. In FIGS. 9 and 10, though only the left guiding portion 101D2 of the left wall 101D is visible, the right guiding portion 101C2 of the right wall 101C is substantially symmetrical. Accordingly, in the following description, when a left guiding portion 101D2 is described, the description applies to the symmetrical right guiding portion 101C2 unless otherwise noted.

The two protrusions 101C2 and 101D2 are formed to support a first and second lens slider 213 and 214 to be movable along the optical axis direction and not movable perpendicular to the optical axis direction.

The cam ring 207 has first cam grooves 207D and second cam grooves 207E formed therein. As shown in FIGS. 10 and 11, the second lens guiding piece 209 has two holding surfaces therein that are spherically concave so as to hold two balls 210B, the two balls 210B being rotatably engaged in the grooves 207E of the cam ring 207. The first lens guiding piece 208 has two similar holding surfaces therein (hidden in FIGS. 10 and 11) that are shaped spherically concave so as to hold another two balls 210B, the additional two balls 201B being rotatably engaged in the grooves 207D of the cam ring 207.

When the cam ring 207, held by the cam frame 210, is rotated by the rotation of the main shaft 201, the first and second cam grooves 207D and 207E of the cam ring 207 rotate with respect to the cam frame 210. This rotation movement makes the first and second lens guiding pieces 208 and 209 move along the axial direction. Here, the first and second lens guiding pieces are disposed at both sides of the cam frame 210, facing each other and containing the cam ring 207, so that they move in opposite directions with respect to each other along the optical axis. That results in the movable ranges of the first and second lens guiding pieces overlapping in the axial direction of the main shaft 201.

In particular, the two first cam grooves 207D and the two second cam grooves 207E extending in directions transverse to one another on the outer circumferential surface 207C, so that the first lens guiding piece 208 and the second lens guiding piece 209 are moved in opposite directions with respect to each other (that is, moving apart from or toward each other along the axis line direction).

Consequently, when the cam ring 207 is rotated in a predetermined direction, the first lens guiding piece 208 and the second lens guiding piece 209 are moved to approach each other, and when the cam ring 207 is rotated about the axis line in the opposite direction, the first lens guiding piece 208 and the second lens guiding piece 209 are moved apart from each other.

As noted above, the first and second cam groove 207D and 207E are formed in substantially the same (front to back) position about the axis line on the outer circumferential surface 207C1 of the cam ring 207, so that the movable ranges of the first lens guiding piece 208 and the second lens guiding piece 209 along the optical axis direction overlap each other when the cam ring 207 is rotated.

An attaching portion 208A, having a threaded hole bored in the vertical direction, is formed at a lower part of the first lens guiding piece 208. The attaching portion 208A is configured to engage an engagement portion 213C of the first lens slide plate 213, and the engagement is secured with a screw 811. An attaching portion 209A, having a threaded hole bored in the vertical direction, is formed at a lower part of the second lens guiding piece 209. The attaching portion 209A (see FIG. 11) is configured to engage an engagement portion 214C of the second lens slide plate 214, and the engagement is secured with a screw 812 (see FIG. 10).

The pressing plate 215 is a rectangularly shaped plate, provided with a through-hole 215B in the height direction. A screw 810, inserted via the through-hole 215B, engages the bottom wall of the cam frame 210 so that the pressing plate 215 is attached to the cam frame 210. That is, the pressing plate 215 moves (at least with respect to movement along the optical axis) integrally with the moving shaft 206, the cam ring 207 and the cam frame 210 (although certain of these members are rotatable with respect to one another as set forth herein). The first and second lens slide plates 213 and 214 are intermediate the pressing plate 215 and the bottom wall of the main body 101. Protrusions on the upper rear side of the pressing plate 215 maintain a clearance in which the slide plates 213 and 214 are movable in front and rear directions.

The first lens slide plate 213 is screw coupled to the first lens guiding piece 208 by a screw 811, and is integrally movable with the first lens guiding piece 208. In a similar fashion, the second lens slide plate 214 is screw coupled to the second lens guiding piece 209 (as shown in FIG. 11) by a screw 812, and is integrally movable with the second lens guiding piece 209.

The first lens slide plate 213 includes a rectangularly shaped body 213A, arms 213B and an engagement portion 213C. The body 213A is supported, intermediate the pressing plate 215 and the bottom wall of the body 101, to be slidable along the optical axis direction. The arms 213B extend linearly from the right and left edges of the body 213A over the pressing plate 215, respectively in right and left directions. The engagement portion 213C is formed at the front edge portion of the body 213A, extending upwards to engage the first lens guiding piece 208, secured via a screw 811.

The second lens slide plate 214 is configured to include a body 214A, arms 214B and an engagement portion 214C. The body 214A is supported intermediate the body 213A of the first lens slide plate 213 and the bottom wall of the body 101 to be slidable along the optical axis direction. The arms 214B extend linearly from the right and left edges of the body 214A over the pressing plate 213, respectively in right and left directions. The engagement portion 214C is formed at the front edge portion of the body 214A, extending frontward therefrom to engage the second lens guiding piece 209, secured via a screw 812.

The first lens slide plate 213 is formed in one piece by a first center portion 213A and a first arm 213B. The first center portion 213A is a rectangular-shaped plate to be connected to the first lens guiding piece 208, and the first arm 213B is first bent downward from the right and left sides of the first center 213A and is then bent to extend horizontally, laterally and linearly.

The first center portion 213A is provided with an engagement portion 213C for engaging the engaging portion 208A of the first lens guiding piece 208, the engagement portion 213C having a through-hole through which the screw 811 is inserted and screw-couples the engaging portion 208A.

A guided portion 213E, 213F includes a protrusion extending along the axis at the area where the right and left first arm 213B connect to the first center portion 213A. The right and left first arm portion 213B extend laterally from the guided portion. These guided portions are movably supported by the guiding portion 101C2 and 101D2 of the body 101, movable along the optical axis direction.

The first center portion 213A is movably supported in the optical axis direction, with its upper and lower surfaces in the height direction being pressed respectively by the pressing plate 215 and by the bottom of the body 101.

The right and left ends of the engaging arm 213B are respectively provided with channel grooves 213D formed extending laterally outward. The channel grooves 213D are engaged slidably with a first lens unit 307 (shown in FIG. 14) and 407 (shown in FIG. 17) of the right and left telescope optical system, slidable in the lateral direction.

As shown in FIGS. 9 and 10, the second lens slide plate 214 is formed in one piece including a second center 214A and a second arm 214B. The second center 214A is a rectangularly shaped plate to be connected to the second lens guiding piece 209, and the second arm 214B bends downward from the right and left sides of the second center plate 213A and then bends to extend horizontally, laterally and linearly.

The second center plate 214A is provided with an extension 214A1 extending forward, where an engagement portion 214C is formed for engaging the engaging portion 209A of the first lens guiding piece 209. The engagement portion 214C has a through-hole through which the screw 812 inserts and secures (screw-couples) the engaging portion 209A of the second lens guiding piece 209. The rear bottom surface of the extension 214A1 connects to and is substantially flush with the upper surface of the second center portion 214A.

Guided portions 214E and 214F are formed as short ridges extending along the axis at the area where the right and left second arms 214B connect to the second center portion 214A. The right and left second arm portions 214B extend laterally from the guided portions 214E and 214F.

These guided portions 214E and 214F are movably supported by the guiding portions 101C2 and 101D2 of the body 101, movable along the optical axis direction.

The second center portion 214A is movably supported in the optical axis direction, with its upper and lower surfaces in the height direction being pressed respectively by the pressing plate 215 and by the bottom of the body 101.

The right and left ends of the engaging arm 214B are provided respectively with channel grooves 214D formed extending laterally outward, the channel grooves 214D being engaged slidably with a second lens unit 308 (shown in FIG. 14) and 408 (shown in FIG. 17) of the right and left telescope optical system, slidable in the lateral direction.

The first and second lens slide plates 213 and 214 are disposed in this order along the optical axis, and are intermediate the pressing plate 215 and the bottom of the body 101, wherein the upper surface of the first center portion 213A is abutted by the extension 214A1 of the second center portion 214A. With such a structure, the first and second arms 213D and 214D are flush with each other, and the first and second center portions 213A and 214A are nearly flush with each other.

A hole 215A, penetrating the pressing plate 215 laterally (left to right), is formed on the pressing plate 215 on its front area, and a sliding shaft 216 is inserted into the hole 215A and supported by the pressing plate 215, extending outward toward the right and left side of the shaft 216.

The right moving unit 303 (a holding member, as shown in FIG. 13) and left moving unit 403 (a holding member, as shown in FIG. 16), supporting the right and left eyepiece optical system, are respectively provided with engaging portions 303A1 and 403A1 that engage with the moving shaft 216. The right and left moving unit 303 and 403 are thereby supported slidably to slide not only in the lateral direction along the moving shaft 216 in the right and left directions but also to slide in the optical axis direction together integrally with the moving shaft 216.

As shown in FIGS. 6 and 7, the lens barrel cooperation shaft 216, supported by the pressing plate 215, is disposed between the first lens slide plate 213 and the second lens slide plate 214, the first lens slide plate 213 being provided between the pressing plate 215 and the bottom of the body 101.

The first and second lens slide plates 213 and 214 are respectively coupled to the first and second lens guiding piece 208 and 209, and the first and second lens guiding piece 208 and 209 are supported by the cam ring 207 and cam frame 210. As described, the cam ring 207 and cam frame 210 are configured to be movable integrally with the pressing plate 215 in the axis line direction, that is, the optical axis direction. Therefore, the first and second lens cooperation plate 213 and 214 are moved integrally with the pressing plate 215 in the optical axis direction.

As shown in FIGS. 9 and 10, the body 101 of the supporting unit 100 includes a first container 101G and a second container 101H, disposed with a space therebetween. The first container 101G accommodates the focus arrangement ring 202, supported to be rotatable about the axis of the main shaft 201 but not movable along the axis direction. The second container 101H accommodates the zooming ring 204, supported to be rotatable with the axis of the main shaft 201 but not movable along the axis direction.

In the structure mentioned above, when the zooming arrangement ring 204 is rotated without rotating the focus arrangement ring 202, the main shaft 201 fixed to the zooming arrangement ring 204 is rotated, so that the cam ring 207 fixed to the front end of the main shaft 201 is accordingly rotated in the inside of the cam frame 210. Consequently, the first and second cam grooves 207D and 207E, provided on the peripheral outer surface of the cam ring 207, rotate with respect to the cam frame 210. The first and second lens guiding pieces 208 and 209, engaging with the balls 210B, cooperating with the rotation of the first and second cam grooves 207D and 207E, and guided by the guiding shafts 211 and 212, are moved along the axial direction. As mentioned above, the first and second lens guiding pieces 208 and 209 move in reverse (opposite) direction with respect to each other when the zooming arrangement ring 204 is rotated.

When the focus arrangement ring 202 is rotated without rotating the zooming arrangement ring 204, the shaft 201 is not rotated. Consequently, the balls 203, engaging the body 202A of the focus arrangement 202, are not moved along the axis direction but rotate about the axis while engaging the guiding grooves 206A1 of the moving shaft 206. Accordingly, the moving shaft 206 and the cam frame 210, integrally fixed to the shaft 206, are moved inside of the body 101, along the axis of the main shaft.

As mentioned above, the guiding grooves 206A include a first groove 206A11 with a long/wide (coarse) pitch, and a second groove 206A12 with a short/narrow (fine) pitch, the first and second groove 206A11 and 205A12 being connected with each other.

Accordingly, when the moving shaft 206 and the cam frame 210 move along the optical axis with the balls 203 engaged in the first groove 206A11, the amount of movement is much more than that with the balls 203 in the second groove 206A12. Therefore, the lens barrels can be promptly drawn into the body in the former case (first groove 206A11), and the focal distance can be arranged precisely in the latter case (second groove 206A12).

The right lens barrel 300 and left lens barrel 400 are described below with reference to FIG. 5. The left and right assemblies have numerous similarities. For example, the right lens barrel 300 and left lens barrel 400 include a plurality of laterally symmetric elements with the same functions. Accordingly, where elements are laterally symmetric, the present description is restricted to the right side, and the explanation for the left side is omitted. One skilled in the art will recognize how the description for the right side may be related to the corresponding elements on the left side. A consistent numbering scheme is used throughout this specification, such that when a part is described for the right lens barrel in the "300" series, a corresponding part on the left lens barrel is numbered similarly in the "400" series. Accordingly, the description with respect to the right side "300" series should be considered to apply to those numbered elements of the left side "400" series that appear in the drawings, but that have not been specifically described herein by such numbers. Of course, where those numbered elements of the left side "400" have been specifically described, the description thereof should be considered.

As shown in FIG. 5, the right lens barrel 300 includes a right frame 301, a right frame lid 302, a right movement unit 303, a right eyepiece cylinder 304, a right objective unit 305, a right prism unit 306, a first lens unit 307, a second lens unit 308, a right eyepiece unit 309, a right outer unit 310 and other parts as described below.

The right frame lid 302, the right objective unit 305 and the right outer unit 310, being attached to the right frame 301, are mounted to the right slide plate 109 (refer to FIG. 7) to be movable in the lateral direction together with the slide plate 109.

As shown in FIGS. 5 and 13, the right moving unit 303 is slidable with respect to the right frame 301 along the optical axis. The right prism unit 306 is provided at the front portion of the right moving unit 303. A right eyepiece cylinder 304 is coupled to the rear portion of the right moving unit 303. The eyepiece cylinder 304 (shown in FIGS. 5 and 14) includes an eyepiece unit 309 that is coupled to the rear portion of the right eyepiece cylinder 304. Moreover, as shown in FIGS. 5 and 14, a first lens unit 307 and a second lens unit 308 are slidably disposed between the right moving unit 303 and the right eyepiece cylinder 304.

That is, the objective unit 305 is mounted to the right frame 301, while the prism unit 306, the first lens unit 307, the second lens unit 308 and the eyepiece unit 309 are mounted to the right moving unit 303. Therefore, the right moving unit 303 moves slidably with respect to the right frame 301 along the optical axis, so that as the distance between the objective unit 305 and the right prism unit 306, the first lens unit 307, the second lens unit 308 and the eyepiece unit 309 changes. Accordingly, the focal length can be adjusted.

Next, referring to the FIGS. 8 and 12 to 14, the structure of the right lens barrel will be detailed.

As shown in FIG. 12, right frame 301 is provided with a holding member 301B for holding the rear part of a right guiding shaft 301A at the center (in the height direction) of the rear right side. The under part of the holding member 301B has a threaded hole 301C formed therethrough, to which a screw is engaged for mounting the right frame 301 to the right slide plate 109 (refer to the arrow "B").

Referring to FIG. 8, the attachment of the right frame 301 to the right slide plate 109 is described below in detail.

Screws 820, 820 (front and rear) are screw coupled to a screw hole formed on the rear part of the right frame 301 (not shown) and to a screw hole (not shown) formed on a frame lid 302 (shown in FIG. 12, and discussed below), via guiding grooves 102H1 and 102H2 of the supporting plate 102 and through-holes 109C1 and 109C2. In such a structure, the head of the screws 820 and 820 are accommodated in the guiding grooves 102H1 and 102H2 on the supporting plate 102 without interference, and are thereby laterally slidable.

Screw 821, 821 are screw coupled to screw holes formed on the front and rear area of the right frame 301 via through-holes 109D1 and 109D2 (the front screw hole corresponds to the screw hole 301C; refer to arrow "B" in FIGS. 8 and 12). Here, the heads of the screw hole 821 and 821 can be moved to and accommodated into notches 102J1 and 102J2 in the outer lateral side at front and rear of the supporting plate 102, without interference, and are thereby laterally movable.

In such a structure, the right frame 301 is mounted on the right slide plate 109 by means of the screws 820 and 821.

The left frame 401 is also similarly mounted to the left slide plate 110 (described below with reference to FIG. 15), described immediately below.

Screws 822, 822 are screw coupled to the screw hole (not shown) formed on the rear part of the left frame 401 and to the screw hole (not shown) formed on the frame lid 402 (discussed below), via guiding grooves 102I1 and 102I2 of the supporting plate 102 and through-hole 110C1 and 110C2. In such a structure, the head of the screws 822 and 822 are accommodated in the guiding groove I1 and 102I2 on the supporting plate 102I1 without interference, and are thereby laterally slidable.

Screw 823, 823 are screw coupled to screw holes formed on the front and rear area of the left frame 401 via through-holes 110D1 and 110D2. Here, the heads of the screw hole 823 and 823 can be moved to and accommodated into the notches 102K1 and 102K2, without interference, and are thereby laterally movable. In such a structure, the left frame 401 is mounted on the left slide plate 110 by means of the screws 822 and 823.

Returning to the right lens barrel 300, as shown in FIG. 12, the right frame 301 is provided with a supporting member 301E at the approximate center area (in the height direction) of the left rear portion of the right frame 301, supporting the rear portion of the left guiding shaft 301D (refer to arrow A).

The right frame 301 is provided with a threaded hole 301F formed approximately in the center area in the height direction of the front right wall, to which a screw 813 is screw coupled. The guiding shaft 301A is intermediate the head of the screw 813 and the right wall, supporting the guiding shaft.

As shown in FIG. 12, the right frame 301 has a threaded hole 301G formed at the right upper portion of a front wall thereof. A screw 814 is screw coupled to the screw hole 301G via a through-hole 302A, so that the right frame lid 302 is fixed to the front of the right frame 301. Further, the front end of the guiding shaft 301D (shown in FIG. 13) is supported by the right frame lid 302.

The right outer housing unit 310 includes a right outer housing 310A, a right front cover 310B, a right rear cover 310C (an eyepiece) and so on. Moreover, a screw hole 302B is formed at the front portion of the right frame lid 302, to which a screw 815 is coupled via a through-hole 310A22 in the front wall 310A2 of the right outer housing 310A. Accordingly, the front portion of the right frame 301 is fixed to the front wall 310A2 of the outer housing 310A.

A screw 816 is screw coupled to an upper portion of the screw hole 301F of the right frame 301 via through-hole 310A41 that is formed on the right wall 310A4 of the right outer housing 310A. Accordingly, the right side of the right frame 301 is fixed to the right wall 310A4 of the right outer housing 310A.

A screw hole 301H is formed on the rear left side of wall of the right frame 301, to which a screw 817 is screw coupled via a through-hole 310A32 that is formed on the rear wall 310A3 of the right outer housing 310A. Accordingly, the rear side of the right frame 301 is fixed to the rear wall 310A3 of the right outer housing 310A.

A hole 301J is formed on the rear left portion of the rear wall, opening rearward, to which an insertion projection 310C2 of the right rear cover 310C (discussed below) is inserted.

The right outer housing 310 includes a right outer housing 310A, a right front cover 310B, a right rear cover 310C and other parts as described herein. As shown in FIG. 12, the right outer housing 310A includes a bottom wall 310A1, and a front wall 310A2, rear wall 310A3 and right side wall 310A4 that extend from, respectively, the front, rear and right edge of the bottom wall 310A1.

An opening 310A21 is formed on the front wall 310A2 for the objective optical system, and an opening 310A31 is formed in the rear wall 310A3 for the right eyepiece cylinder 304, including a third lens 309C, to move therethrough.

A "V" shaped notch 310A51 is formed on the left edge and rear side of the upper wall 310A5 for accommodating the focus arrangement ring 202 and the zooming arrangement ring 204.

The right front cover 310B is attached to the front side of the front wall 310A2 via a double sided adhesive tape 310D, with the opening 310B1 aligned with the opening 310B1.

The right rear cover 310C is attached to the rear side of the rear wall 310A3 via a double sided adhesive tape 310E, with the opening 310C1 aligned with the opening 310A31.

As shown in FIGS. 5 and 12, the rear wall 310A3 of the right outer housing 310A is provided with a through-hole 310A33, corresponding to the hole 301J of the right frame 301, through which the insertion projection 310C2 of the right rear cover 310C is inserted into the hole 301J. Accordingly, the right rear cover 310C is positioned with respect to the right frame 310 and the right outer housing 310A.

A half-circular notch 310A11 is formed on the front left edge on the bottom wall 310A1 of the right outer housing 310A. The half-circular notch is formed in such a manner to avoid, i.e., not to interfere with, the diopter decorative ring 106.

As shown in FIG. 13, the objective unit 305 includes an objective frame 305A, an objective pressing ring 305B, an objective lens 305C and other parts as described below.

The objective frame 305A includes a cylindrical body 305A1, a first holding portion 305A2 provided on the right side of the body 305A1, a second holding portion 305A3 extending rearward from the left side of the body 305A1, and an engaging portion 305A4 extending to the left from the front area of the second holding portion 305A3.

The inner circumference of the body 305A1 is female threaded, and an outer circumference of the pressure ring 305B is male threaded. The objective lens 305C is intermediate the body 305A1 and the pressure ring 305B, fixing the objective lens 305C securely therebetween.

The first holding portion 305A2 is slidable along the guiding shaft 301A (shown in FIG. 12), holding the guiding shaft 301A. As shown in FIG. 13, the second holding portion 305A3 is provided with a spindle hole 305A31, parallel to the optical axis, through which the guiding shaft 301D is slidably held. Thus, the objective frame 305A is configured to be slidable along the guiding shafts 301A and 301D.

Therefore, the objective lens 305C, being fit in the objective frame 305A, can be positioned anywhere along the range of positions defined by the guiding shafts 301A and 301D (along respective axes).

The engaging portion 305A4 is formed in a substantially rectangular shape, having two engaging walls 305A41 extending downward at the front and rear edges thereof. The two engaging walls 305A41 are parallel to one another, extending in the lateral (left to right) direction.

The outer circumferential surface of the diopter eccentric seat 107 is intermediate, i.e., held between, the two engaging walls 305A41. When the diopter eccentric seat 107 is rotated, the outer circumferential surface of the diopter eccentric seat 107 is eccentrically rotated, moving the two abutting engaging walls 305A41 along the optical axis direction.

FIGS. 18, 19 and 20 respectively show a bottom plan view of the binocular, in which the indicia zero point "0" mark 106F, plus "+" mark 106G and minus "−" mark 106H of the diopter decorative ring 106 are respectively aligned with the reference mark 102C.

FIGS. 5, 6 and 18 show that when the diopter eccentric seat 107 is rotated, the right objective frame 305A is moved along the optical axis, guided by the guiding shafts 301A, 301D, thereby arranging the location of the objective lens 305C along the optical axis.

That is, the right objective frame 305A is moved with respect to the right frame 301 by the rotation of the diopter eccentric seat 107 (engaged with the engaging walls 305A41) about the shaft portion 106 of the diopter decorative ring 106.

Figures 4A, 4B:
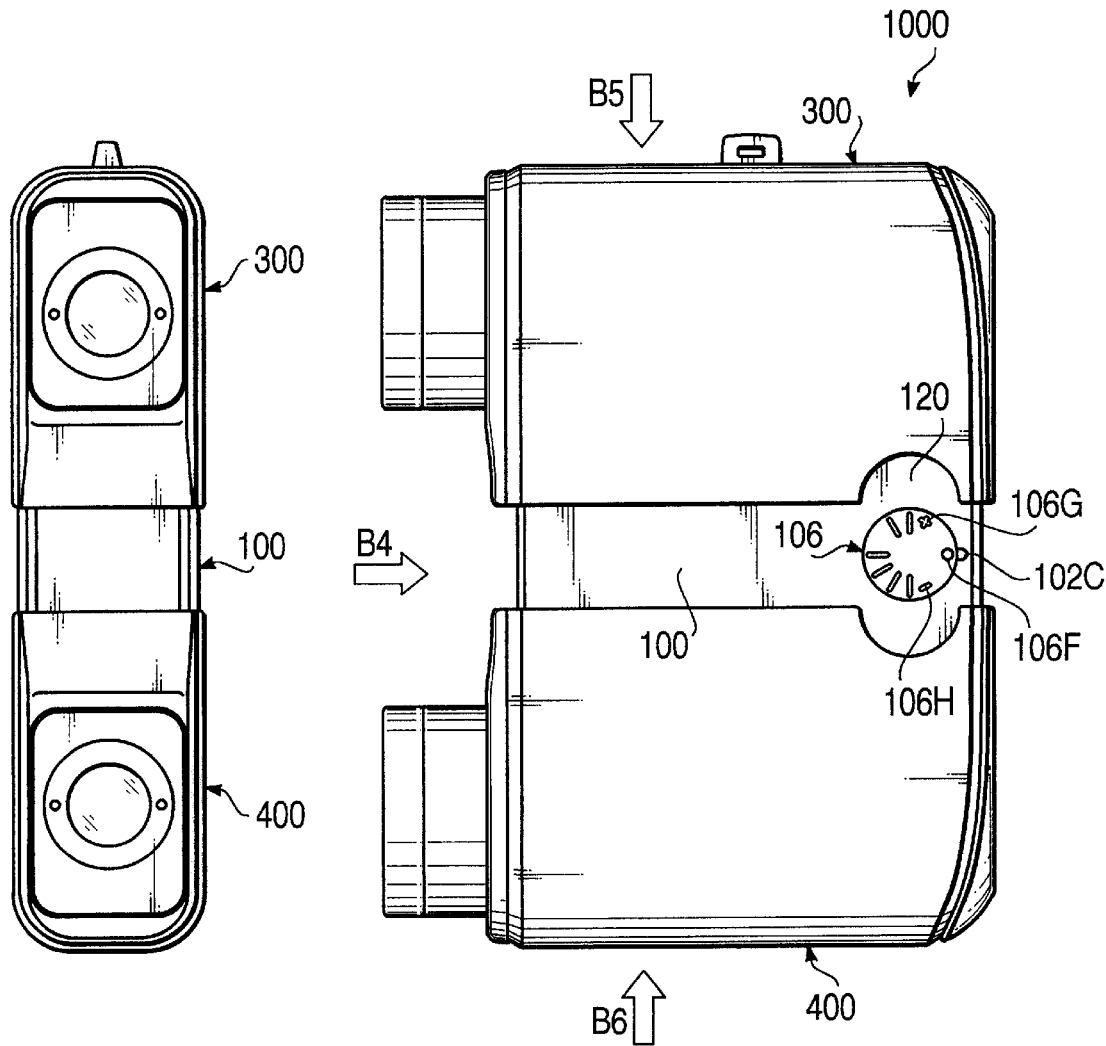
FIG. 4A shows a bottom plan view of the binocular in the same configuration as FIGS. 3A through 3D.
FIG. 4B shows a back view of the configuration of FIG. 4A seen from the direction of an arrow B4.
Figure 4C:
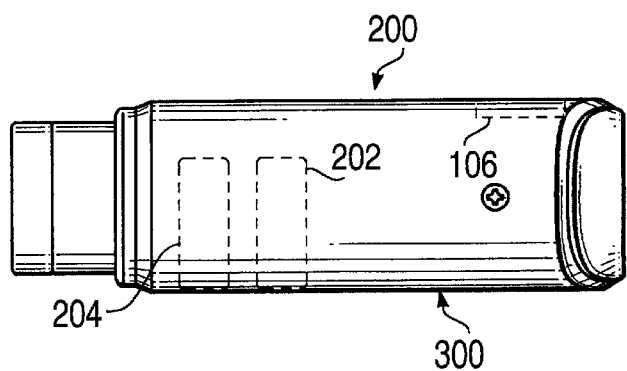
FIG. 4C shows a side view of the configuration of FIG. 4A seen from the direction of an arrow B5.

As shown in FIG. 4, when the diopter decorative ring 106 is arranged so that the zero point "0" mark 106F is aligned with the reference mark 102 provided on the supporting plate 102, the right objective frame 305A is arranged to be situated at the center point in the adjustable range with respect to the right frame 301. As previously described, the diopter decorative ring 106 and the diopter eccentric seat 107 are rotatably supported by the bottom lid 103 that is fixed on the supporting plate 102.

That is, when the diopter eccentric seat 107 is rotated, the right objective frame 305A is moved along the guiding shafts 301A and 301D (i.e., in the optical direction).

As shown in FIGS. 13 and 19 through 21, the right moving unit includes a bottom wall 303A that is rectangularly shaped, a rear wall 303B extending from the rear edge of the bottom wall 303A, and a side wall 303C extending from the left edge of the bottom wall 303A.

FIG. 18 shows the top of the right moving unit 300, the front being at the bottom of the drawing, and the rear being at the top of the drawing. FIG. 19 shows the right moving unit 300 seen from the front, where the bottom wall 303A is provided with the engaging portion 303A1 (see FIG. 18) formed therein, extending laterally from approximately the central part of the left edge in the optical direction. The engaging portion 303A1 is configured to engage with the cooperation shaft 216, the shaft 216 being slidable in the shaft direction. Although hidden with respect to the right moving unit 300 in FIG. 13, the engaging portion 303A1 appears substantially similarly to the left-side engaging portion 403A1 as shown with respect to the left moving unit 400 in FIG. 16.

As shown in FIGS. 18 and 19, the central area of the rear wall 303B is provided with a circular hole 303B1. The bottom wall 303A is provided with a bearing 303D at the right edge of the bottom wall 303A, for receiving the guiding shaft 301A. The side wall 303C is provided with a through-hole bearing 303E at the lower part of the side wall 303C, for receiving the guiding shaft 301D.

Therefore, the right moving unit 303 is movably supported by the bearings 303D and 303E, being guided respectively by guiding shafts 301A and 301D along the optical axis.

As shown in FIGS. 19 and 20, a front-side surface of the rear wall 303B of the right moving body 303 forms a rectangularly shaped attaching surface 303B4, to which a thin plate 306D is attached. The thin plate 306D is shown in FIG. 26 and is described in detail below. A bank 303B5 and a bank 303B6 are formed extending laterally on the attaching surface 303B4, respectively at upper and lower areas, near to the upper and lower edges of the attaching surface 303B4. These banks 303B5 and 303B6 oppose each other, and respectively abut an upper edge 306D91 and a lower edge 306D92 of the thin plate 306D (see FIG. 26), so that the thin plate 306 is supported to be movable in the lateral direction and but not movable in the vertical (up and down) direction.

It is noted that the lateral and vertical directions may be considered a first direction and a second direction (or vice versa), both directions perpendicular to the optical axes of the telescope systems and both directions perpendicular to one another.

As shown in FIGS. 19 and 21, screw holes 303F and 303G are bored in the length direction of the rear wall 303B at the left upper and right lower portions (from the front, i.e., the direction of FIG. 19) of the rear wall 303B on either side of the hole 303B1.

A circular through-hole 303H (for receiving a jig) is bored on the rear wall 303B at the right upper portion in the length direction of the rear wall 303B and adjacent the hole 303B1. An elongated opening 303I, elongated in the lateral direction, is bored at the left lower portion (seen from the front, i.e., the direction of FIG. 19) in the length direction of the rear wall 303B adjacent the hole 303B1. The elongated opening 303I opposes a jig guiding hole 306D8 of the thin plate 306 (see FIG. 26) and includes an edge portion that is surrounds the edge portion of the jig guiding hole 306D8 of the thin plate 306.

As shown in FIGS. 13, 26, and 27, the prism unit 306 includes a holder 306A (a prism holder), an intermediate plate 306B, a holder lid 306C, a thin plate 306D (an intermediate member), a first prism 306E, a second prism (an erecting prism, specifically a Dach or roof prism in the variation) 306F and other parts described below.

As shown in FIGS. 22 through 25, the holder 306A includes an upper wall 306A1 and bottom wall 306A2 supporting the upper and bottom surfaces of the first 306E and second prism 306F, and a rectangularly shaped rear wall 306A3 connecting the rear edges of the upper wall 306A1 and bottom wall 306A2.

The first prism 306E and the second prism 306F form an erecting system including a Dach or roof prism.

The first prism 306E and the second prism 306F are configured in a manner such that light passes through the first prism 306E, then the second prism 306F, and that the outcoming surface of the first prism 306E and the incident surface of the second prism 306E oppose to each other. The intermediate plate 306B is intermediate the first prism 306E and second prism 306F, such that the first and second prism 306E and 306F contact and are coupled to the upper wall 306A1 and the bottom wall 306A2 of the holder 306A.

A holder lid 306C includes a front wall 306C1, and a right and left side wall 306C2 and 306C3 extending toward the rear from the right and left edges of the front wall, for connecting the edges of the upper wall 306A1 and the bottom wall 306A2 of the holder 306A1. The front wall 306C1, opposing the incident surface of the first prism 306E, has an opening 306C11 formed therethrough, through which light passes.

The rear wall 306A3 of the holder 306A is also provided with an opening, through which light exiting the second prism 306F passes.

As shown in FIG. 13, the thin plate 306D (see FIG. 26) is disposed between the rear side of the rear wall 306A3 (see FIG. 24) of the holder 306A and the front of the rear wall 303D (see FIG. 20) of the right moving unit 303. An opening 306D1, permitting light to pass, is formed in the center of the thin plate 306D.

The rear wall 306A3 of the holder 306A is provided with two threaded holes 306A31, in opposite positions with respect to each other across the hole 306A32. As shown in FIG. 13, two screws 815 are screw coupled to the two threaded holes 306A31 of the rear wall 306A3 of the holder 306A. The screws 815 are affixed, via a spring washer 816 and washer 817, through the through-holes 303G and 303F of the rear wall 303B of the moving unit 303 and the through-holes 306D2 of the thin plate 306D, so that the holder 306A can be integrally fixed to the moving body 303 (once adjusted, and after the screws 815 are tightened).

As shown in FIGS. 22 through 25, protrusions 306A33 and 306A34 protrude backward near to and along the right and left edges of the back side surface of the rear wall 306A3 of the holder 306A. The protrusions 306A33 and 306A34 extend in the vertical direction, and the center position of the combined two protrusions 306A33 and 306A34 is located at the vertical center-line of the rear wall 306A, i.e., the protrusions 306A33 and 306A44 are equal distances from the center line of the rear wall 306A.

As shown in FIG. 23, a cutaway 306A37, indented with respect to the surface of the rear wall 306A3, is formed at the upper-left area (seen from the back of the holder 306A) adjacent the hole 306A32. A jig engagement long groove 306A38 is formed in the surface of the rear wall 306A3, extending laterally, on the lower-right area (seen from the back of the holder 306A)adjacent the hole 306A32.

FIG. 26 shows the thin plate 306D seen from the back. The left edge portion (seen from the back of the thin plate 306D) has a cut away portion 306D3, extending vertically, the cut portion 306D3 abutting and guiding the protrusion 306A33 in the vertical direction. A long groove 306D4, extending in the vertical direction and bored through the length direction of the thin plate 306D, is formed at the right side edge portion (seen from the back of the thin plate 306D) of the thin plate 306D, the long groove 306D receiving and vertically guiding the protrusion 306A34.

Long grooves 306D5 and 306D6, extending vertically, are disposed respectively between the hole 306D1 and the cut portion 306D3 and between the hole 306D1 and the long groove 306D4. The long grooves 306D5 and 306D6 receive and vertically guide the protrusions 306A35 and 306A36.

A jig engagement long groove 306D7, extending vertically, is formed through the length direction of the thin plate 306D, on the upper-left portion (seen from the back of the thin plate 306D) adjacent the hole 306D1. A circular-shaped jig guiding hole 306D8, bored in the length direction of the thin plate 306D is formed on the lower-right portion (seen from the back of the thin plate 306D) adjacent the hole 306D1.

As mentioned above, although the holder 306A is (eventually) securely attached to the right moving body 303 via the thin plate 306D, the locations of the first and second prism 306E and 306F, being supported on the holder 306A, can be adjusted in the vertical and lateral direction with respect to the telescope optical axis direction (e.g., after initial "loose", engagement of the screws 815 and before tightening of the same, or before the screws 815 are engaged).

Referring to FIGS. 23 and 26, the arrangement of the holder 306A and the thin plate 306D is explained below. The front surface of the thin plate 306D, that is, the opposite side of the back surface of the thin plate 306D illustrated in FIG. 26, is attached to the back surface of the rear wall 306A3 of the prism holder 306A, the front surface of the thin plate 306D and the back surface of the prism holder 306A contacting each other.

As mentioned above, the protrusions 306A33, 306A34, 306A35 and 306A36 abut or are inserted into, respectively, the cutaway portion 306D3 of the thin plate 306D and long grooves 306D4, 306D5 and 306D6, so that the holder 306A is supported to be vertically movable, but laterally fixed, with respect to the thin plate 306D (by virtue at least engagement of lateral sides in the width direction of the protrusions and grooves).

The cutaway 306A37, formed on the rear wall 306A3 of the holder 306A, opposes the jig engagement long groove 306D7, and the jig engagement long groove 306A38 of the rear wall 306A3 of the holder 306A opposes the jig guiding hole 306D8 of the thin plate 306D.

Referring to FIGS. 19, 23 and 26, the arrangement among the right moving body 303, thin plate 306D and the holder 306A is explained below.

The attaching surface 303B4 of the rear wall 303B of the right moving body 303 contacts the rear surface of the thin plate 306D, so that the thin plate 306D is attached to the rear wall 303B.

The banks 303B5 and 303B6 abut the upper edge 306D91 and the lower edge 306D92, so that the thin plate 306D is supported to be laterally movable but vertically fixed with respect to the right moving body 303.

The jig guiding hole 303H, formed on the rear wall 303B of the right moving body 303, opposes the jig engagement long groove 306D7 of the thin plate 306D, and the opening 303I of the rear wall 303B of the right moving body 303 opposes the jig guiding hole 306D8 of the thin plate 306D.

Therefore, according to the configuration mentioned above, the jig guiding hole 306D8 of the thin plate 306D and the jig engagement long groove 306A38 of the prism holder 306A face rearward through the opening 303I of the rear wall 303B of the right moving body 303.

The jig engagement hole 306D7 of the thin plate 306D and the cutaway 306A37 of the holder 306 are face rearward through the jig guiding hole 303H of the rear wall 303B of the right moving body 303.

Figure 42A:
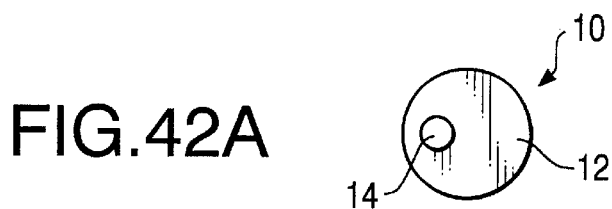
FIG. 42A shows a front plan view of a jig for adjusting locations of a holder and a thin plate.
Figure 42B:
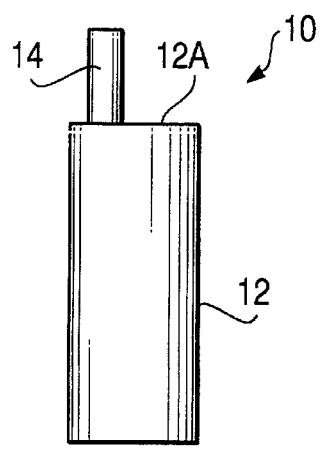
FIG. 42B shows a side view of the jig for adjusting locations of the holder and the thin plate.

FIGS. 42A and 42B show a configuration view of the jig guiding holes and one example of an appropriate jig 10, to be inserted into each jig engagement long groove for moving the location of the prism holder 306A and the thin plate 306D. FIG. 42A is a front plan view of the jig 10 and FIG. 42B is a side view of the jig 10.

The jig 10 has a first shaft portion 12 (a body) and a second shaft portion 14 (eccentric shaft portion), the second shaft portion 14 extending from the end surface 12A of the first shaft portion 12 and being cylindrically shaped.

The diameter of the first shaft portion 12 is set such that the first shaft portion 12 can be inserted into the jig guiding holes 303H and 306D8 noted above, rotatable about the center axis of the shaft 12, without play with respect to the jig guiding holes 303H and 306D8.

The diameter of the second shaft portion 14 is set at a size appropriate to be inserted into the jig engagement long grooves 306A38 and 306D7 noted above, in such a manner that the outer circumference of the second shaft 14 abuts the longitudinal side edges that extend longitudinally. As noted, the center axis of the second shaft portion 14 is disposed eccentrically with respect to the center axis of the first shaft portion 12.

The diameter of the jig guiding hole 303H of the right moving body 303 and that of the jig guiding hole 306D8 of the thin plate 306D are optionally made equal, and the distance between the two side edges of the jig engagement long groove 306A38 is optionally configured to be the same size as that between the two side edges of the jig engagement groove 306D7 of the thin plate 306D.

Figure 43:
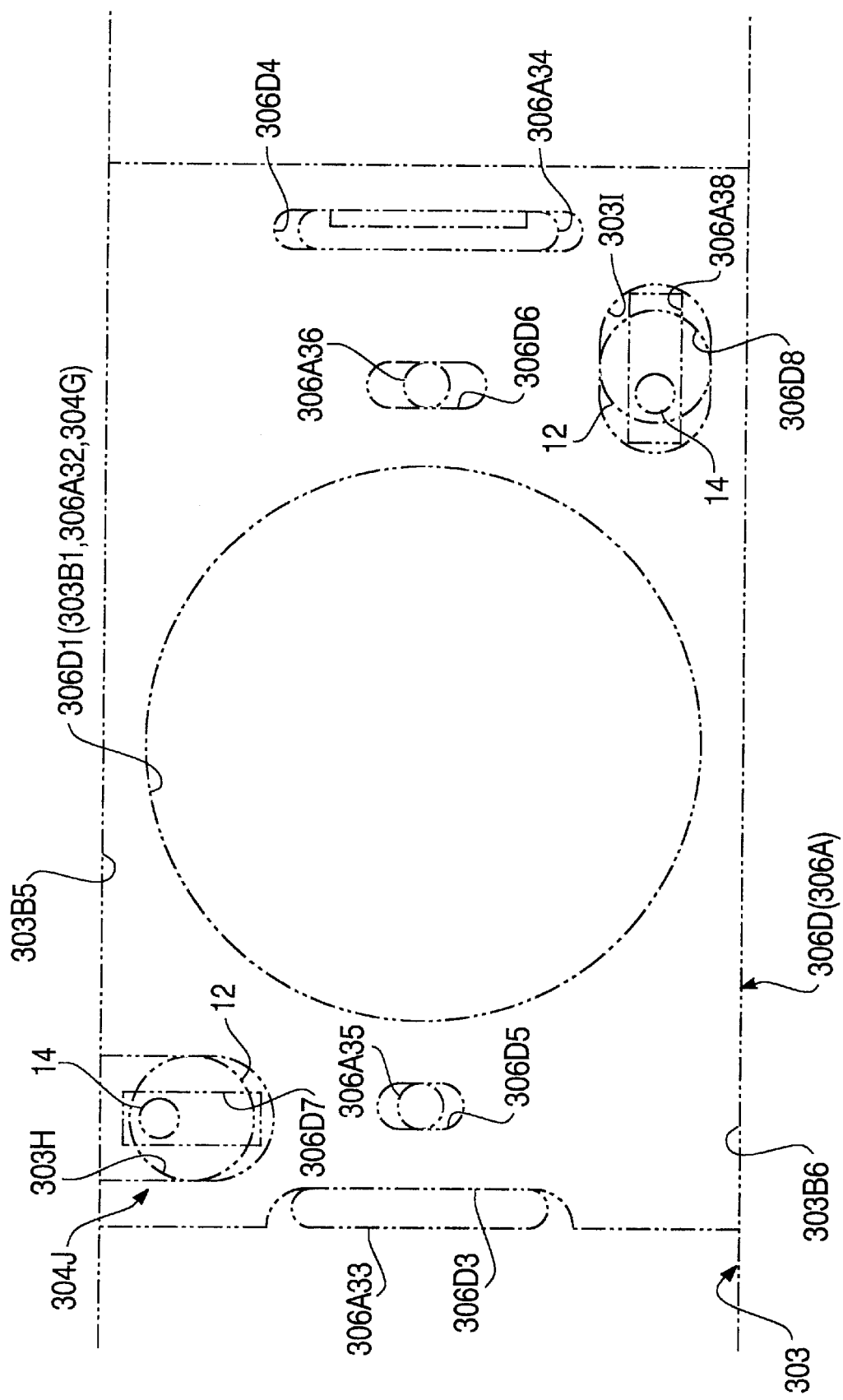
FIG. 43 shows an explanation view illustrating the (location) relationship among a rear wall, a thin plate and a holder of the right moving body and the jig.

The operation of adjusting the vertical location of the holder 306A, by using the jig 10 as above, is described below, referring to FIG. 43 illustrating the locations of the rear wall of the right moving body, thin plate, holder and jigs, in addition to FIGS. 18 through 26 and 42A and 42B discussed above.

FIG. 43 shows the rear wall 303B of the right moving body seen from the back to the front. It is noted that the holder 306A and the right moving body 303, between which is arranged the thin plate 306D, may have been previously screw coupled loosely by the two screws 815 (omitted in FIG. 43 for clarity).

The first shaft portion 12 and the second shaft portion 14 of the jig 10 are inserted into the jig guiding hole 306D8 of the thin plate 303D through the opening 303I of the rear wall 303B from the back of the right moving body 303, and the second shaft portion 14 is inserted into the jig engagement long groove 306A38 of the holder 306A. In this condition, the jig 10 is rotated while the first shaft portion 12 is guided by the jig guiding hole 306D8. That is, the jig 10 is rotated while engaged in a prism location arrangement structure that is formed by the jig guiding hole 306D8 and the jig engagement long groove 306A38.

Subsequently, the second shaft portion 14, eccentric to the first shaft portion 12, moves about the center of the jig guiding hole 306D8 while the circumferential surface abuts the side edges of the jig engaging long groove 306A38. The prism holder 306A can be moved only in the vertical direction with respect to the thin plate 306D, because the holder 306A is supported to be vertically movable but not movable laterally.

That is, the thin plate 306D is supported to be not movable vertically with respect to the right moving body 303. Therefore, the prism holder 306A is movable only vertically with respect to the right moving body 303.

However, the second shaft portion 14 is movable in the jig engagement long groove 306A38 that extends laterally, so that the second shaft portion 14 does not give any lateral force to the holder 306A.

The lateral location of the holder 306A is adjusted as follows, using the jig 10 (or, as noted below, an additional jig 10). The first shaft portion 12 and the second shaft portion 14 of the jig 10 are inserted into the jig guiding hole 303H of the rear wall 303B of the right moving body 303 from the rear of the binocular, so that the second shaft 14 is inserted into the jig engagement groove 306D7 of the thin plate 303D. Then, under this condition, the jig 10 is rotated while the first shaft portion 12 is guided by the jig guiding hole 303H. That is, the jig 10 is rotated while engaged in the prism arrangement structure that is formed by the jig guiding hole 303H and jig engagement long groove 306D7.

Accordingly, the second shaft portion 14, eccentric to the first shaft portion 12, moves about the center of the jig guiding hole 303H, while the circumferential surface of the second shaft portion 14 abuts the side edges of the jig engagement long groove 306D7, so that the thin plate 306D is moved only laterally, because the thin plate 306D is supported to be movable in the lateral direction but not movable vertically. The prism holder 306A is supported to be not movable laterally with respect to the thin plate 306D, so that during lateral adjustment the holder 306A is only movable in the lateral direction with respect to the right moving body 303.

The second shaft portion 14 moves in the jig engagement long groove 306D7 that extends vertically, not giving any vertical force to the thin plate 306D.

The cutaway 306A37 of the rear wall 306A3 of the holder 306A functions to accommodate the top end of the second shaft potion 14 of the jig 10, the second shaft portion 14 being inserted into the jig engagement long groove 306D7 of the thin plate 306.

The adjustment is verified to be correct by optical or mechanical measurement, observation, or otherwise. After the location of the holder 306A is adjusted laterally and vertically by using the jig 10, two screws 815 are screwed securely (tightened) so that the holder 306A and the right moving body 303, between which is arranged the thin plate 306D, are securely fixed.

Accordingly, by using jig 10, the holder 306A having the first and second prism 306E and 306F (along with the optical axis of the erecting prisms, e.g., Dach or roof prism) can be easily adjusted in the lateral and vertical directions.

Thus, using the jig 10, the location of the erecting prism (e.g., Dach or roof prism) can be easily adjusted, so that the time and cost for the adjustment is reduced compared with the conventional binocular, enhancing assembly or adjustment efficiency without requiring special skills.

The rotation of the jig 10 causes only a small amount of movement of the second shaft portion 14, so that the thin plate 306D can be operably adjusted by a slight amount in both or either of the vertical and lateral directions.

As noted, the diameter of the jig guiding hole 303H and that of the jig guiding hole 306D8 are optionally made equal, and the distance between the two side edges of the jig engagement long groove 306A38 is made equal to that of the jig engagement long groove 306D7, so that the same jig 10 can be used to the two adjustment mentioned above. However, different-sized jigs can be used, e.g., different jigs adapted to different diameters of each jig guiding holes and different distances of the jig engagement long grooves.

Although the jig 10 is configured to be removable from the right moving body 303, holder 306A and thin plate 303D, the jig 10 may be integrated with the right moving body 303, holder 306A and thin plate 303D. In this case, the jig may be additionally provided with an ordinary, proprietary, or custom screw head engagement for turning the jig.

As noted, although the binocular is configured such that the jig 10 is able to adjust both the vertical and lateral directions, the jig 10 may adjust the location of only one of the directions. Furthermore, the same jig 10 can be sequentially used to adjust the horizontal and vertical position (or in the reverse order) of the holder 306A, each adjustment being unaffected by the other. However, two (same or different size) jigs 10 can be used simultaneously. That is, during vertical adjustment, no interference is caused with respect to a jig 10 placed for horizontal adjustment, at least since the horizontal jig 10 is generally closer to the end from which the jigs 10 are inserted, and may be accommodated within the vertically elongated cutaway 306A37. At the same time, during horizontal adjustment, no interference is caused with respect to a jig 10 placed for vertical adjustment, at least since the vertical jig 10 is accommodated by laterally elongated grooves/holes 306A38 and 303I.

The screws 815, before tightening, move together with the body to which they are coupled, i.e., the holder 306A. Therefore, the screws also move laterally with respect to the moving body 303, and also vertically with respect to the moving body 303, before the screws 815 are tightened. Alternatively, if the jig(s) 10 is employed before the screws 815 are inserted, the threaded holes 306A31 (which will accept the screws 815) also move laterally with respect to the moving body 303 and vertically with respect to the moving body 303. Accordingly, the holes 303F, 303G are sufficiently large to accommodate vertical and horizontal movement of the outer diameter of the threaded holes 306A31 or the screw 815 shaft to avoid interference with the holes 303F, 303G and the screws 815.

During vertical adjustment, no interference is caused with respect to the screws 815, at least because the range of relative movement of the screws 815 is accommodated by the diameter of the threaded holes 303F, 303G and the vertically elongated holes 306D2. At the same time, during horizontal adjustment, no interference is caused with respect to the screws 815, at least because the range of relative movement of the screws 815 is accommodated by the diameter of the threaded holes 303F, 303G.

Moreover, as described below, the location of the erecting prism noted above can even be adjusted after the right eyepiece cylinder 304 is attached to the right moving body 303.

As shown in FIG. 13, the rear wall 303B of the moving unit 303 has protrusions 303B3, which extend rearward and in which are formed threaded holes 303B31 in the height direction therethrough. As shown in FIGS. 14 and 32 through 35, the right eyepiece cylinder 304 includes a bottom wall 304A and an upper wall 304E, as well as a right side wall 304B, a left side wall 304C and a rear wall 304D that extend, respectively from the right edge, left edge and the rear edge of the bottom wall 304A. The upper wall 304E is connected to the upper edges of the right side wall 304B, the left side wall 304C and the rear wall 304Dd.

The front edges of the bottom wall 304A, the right wall 304B and the upper wall 304E are formed to receive the rear wall 303B of the moving unit 303 (shown in FIG. 13), and are provided with respective screw holes 304F. Three screws 818 are screw coupled to the threaded holes 303B31 (shown in FIG. 13) formed on the corresponding protrusions 303B3 of the rear wall 303B through respective through-holes 304F, so that the rear wall 303B is securely coupled to the right eyepiece cylinder 304.

Therefore, the right eyepiece cylinder 304, the prism unit 306 and the moving unit 303 are integrally coupled so as to be movable with respect to the right frame 301 and the objective unit 305, guided by the guiding shaft 301A and 301D along the optical axis.

The rear wall 304D of the right eyepiece cylinder 304 has a through-hole 304G formed at the center thereof, bored in the length direction of the rear wall 304D. The inner circumferential surface of the hole 304G is provided with a female screw 304G1 threaded for attaching the attaching portion 304D1. The attaching portion 304D1 is configured to receive an eyepiece lens frame 309A.

As shown in FIG. 14, two guiding shafts 311 are provided, parallel with each other along the optical axis, between the rear surface of the rear wall 303B of the moving unit 303 (shown in FIG. 13) and the front surface of the rear wall 304D of the right eyepiece cylinder 304 (shown in FIG. 13).

As shown in FIG. 14, the first lens unit 307 includes a first lens frame 307A and a first lens 307B. FIGS. 28A and 28B show a detailed view of the first lens frame 307A and second lens frame 308A.

As shown in FIGS. 14 and 28A, the first lens frame 307A includes a body 307A1 (shaped cylindrically), an engaging arm 307A2 extending frontward from the lower part of the body 307A1, and two shaft holder arms 307A3 and 307A4 extending toward the rear, respectively, from the right and left edges of the body 307.

As shown in FIG. 14, the outer circumference of the first lens 307B is held on the inner circumference of the body 307A1 of the first lens frame 307.

As shown in FIG. 14, an engaging protrusion 307A21 is formed at the lower front end of the engaging arm 307A2 for engaging with the channel groove 213D (shown in FIG. 9) that is provided on the right arm 213B of the first lens slide plate 213. The engaging protrusion 307A21 (shown in FIG. 14) is engaged with the channel groove 213D (shown in FIG. 9)so as to be movable laterally, but immovable along the optical direction.

As shown in FIG. 14, the shaft holder arm 307A3 of the body 307A1 is provided with shaft holes at the front (307A31) and rear end to pass the guiding shaft 311 therethrough. The shaft holder arm 307A4 is provided with a shaft hole 307A41 to pass the guiding shaft 311 therethrough.

Accordingly, the body 307A1 is slidably supported, by the guiding shafts 311 through the front (307A31) and rear shaft holes of the shaft holder arm 307A3 and the shaft hole 307A41 of the shaft holder arm 307A41, to slide along the optical axis.

The second lens frame 308A includes a body 308A1 (shaped cylindrically), an engaging arm 308A2 extending toward the front from the lower edge of the body 308A1, a shaft holder 308A3 provided at the right edge of the body 308A1, and a shaft holder 308A4 provided at the left edge of the body 308A1.

The inner circumference of the body 308A1 of the second lens frame 308A is formed to hold the outer circumference of the second lens 308C. A female screw (threads) formed on the inner circumference is engaged to the male screw formed around the outer circumference of the pressing ring 308B, so that the second lens 308C is held by the body 308A1 and the second lens pressing ring 308B.

The lower front end of the engaging arm 308A2 includes an engaging protrusion 308A21 formed thereon for engaging the concaved groove 214 (shown in FIG. 9) provided on the left arm 214B of the second lens slide plate 214. The engaging protrusion 308A21 (shown in FIG. 14) is engaged with the channel groove 214D (shown in FIG. 9) so as to be movable laterally, but immovable in the optical direction.

As shown in FIG. 14, the eyepiece unit 309 includes an eyepiece lens frame 309A, an eyepiece lens pressing ring 309B, an eyepiece lens (third lens) 309C and an eyepiece 309D.

The inner circumferential surface of the eyepiece lens frame 309A is formed to hold the outer circumferential edge of the third lens 309C. The female thread 309A1, formed around the inner circumference, is screwed by the male thread 309B1 of the outer circumferential edge of the pressing ring 309B, so that the third lens 309C is held between the eyepiece lens frame 309A and the eyepiece lens pressing ring 309B.

The rear wall 304D of the right eyepiece cylinder 304 has a through-hole formed therein in the length (front to back) direction of the rear wall 304D. The inner circumference of the through hole is provided with a female thread for providing an attaching portion 304D1. A female thread of the attaching portion 304D1 is screwed by the male thread 309A2 formed around the outer circumference of the eyepiece lens frame 309A, so that the eyepiece lens frame 309A is fixed to the attaching portion 304D1.

As shown in FIGS. 36A through 36D, the eyepiece 309D includes a body 309D1, rectangularly shaped, the body 309D1 being provided with a circular hole 309D4 bored at the center portion, a rear surface 309D3 and a front surface 309D2 in the length direction, and the body 309D1 being substantially ring-shaped.

The rear surface 309D3 is attached to and opposes the rear wall 304D of the right eyepiece cylinder 304. The rear surface 309D3 is provided with protrusions 309D21 and 309D22 formed about the hole 309D4 for insertion into through-holes 304H and 304I formed on the rear wall 304D of the right eyepiece cylinder 304. The rear surface 309D3 is also provided with protrusions 309D23 and 309D24 formed about the hole 309D4 for insertion into the jig insertion holes 304J1 and 304K1 of the shaft receptacles 304J and 304K formed on the rear wall 304 (as described below).

The protrusions 309D21 through 309D24 respectively insert into the through-holes 304H, 304I, shaft bearing 304J and 304K, so that the relative location of the eyepiece 309D and the right eyepiece cylinder 304 are set. Moreover, the eyepiece 309D is attached to the rear wall 304D of the right eyepiece cylinder 304, so that through-holes 304H and 304I and the shaft receptacles 304J and 304K are covered toward the exterior of the binocular. That is, the prism location arrangement structure engages with the arrangement jig at an engaging interface, and the engaging interface of the prism location arrangement structure is covered from an exterior of the binocular by the outer housing member.

The upper surface of the bottom wall 304A of the right eyepiece cylinder is provided with a receiving groove 304A1 extending along the optical axis direction, for receiving the rear portion of the engaging arm 307A2 of the first lens frame 307A while permitting movement along the optical axis direction. Additionally, a receiving groove 304A2 is formed on the upper surface of the bottom wall 304A, extending parallel to and separated by a predetermined distance from the receiving groove 304A1 mentioned above, for receiving the rear portion of the engaging arm 308A2 of the second lens frame 308A while the same is moved.

As shown in FIG. 14, the front portion of the engaging arm 307A2 of the first lens frame 307A and the front portion of the engaging arm 308A2 of the second lens frame 308A extend forward from the front edge of the bottom wall 304A of the right eyepiece cylinder 304.

As shown in FIG. 13, the lower surface of the bottom wall 303A of the moving unit 303 is provided with guiding grooves extending along the optical axis direction. The guiding grooves guide the front portion of the engaging arm 307A2 of the first lens frame 307A and the front portion of the engaging arm 308A2 of the second lens frame 308A.

The engaging arms 307A2 and 308A2 are movably supported by the moving unit 303 and the right eyepiece cylinder 304, to move along the optical axis.

By moving the first lens frame 307A and the second lens frame 308A to approach to/move away from each other, the magnifying power of the telescope optical system is varied. Here, the telescope optical system includes the objective lens 305C, the prism unit 306, the first lens 307B, the second lens 308C and the third lens 309C.

That is, in this telescope system, the objective lens system includes the objective lens 305C, and the eyepiece lens system includes the first lens 307B, the second lens 308C and the third lens 309C. Moving the first lens 307B to approach to/move away from the second lens 308C in the optical direction varies the magnifying-power of the telescope system.

As shown in FIGS. 14 and 32 through 36, the right eyepiece cylinder 304 includes an eyepiece lens-accommodating portion, accommodating the eyepiece lens 309C.

FIG. 32 shows the rear wall 304D of the right eyepiece cylinder 304 as seen from the rear. The circular through-holes 304H and 304I are formed on the right-upper and left-lower parts (as shown in FIG. 32) of the rear wall 304D. The two through-holes 304H and 304I are provided on portions that respectively oppose the two screw holes 306A31 and 306A31 of the holder 306, and also respectively oppose to the two screw holes 303F and 303G of the right moving body 303.

In order to tighten or loosen the screws 815, a screwdriver is inserted through the two through-holes 304H and 304I of the right eyepiece cylinder 304, so that the two screws 815, fixing the thin plate 306D and the holder 306 to the right moving body 303, can be turned by the screwdriver.

At the left-upper and right-lower parts (as viewed from the back in FIG. 32) of the hole 304G of the right eyepiece cylinder 304, shaft receptacles 304J and 304K are provided.

The shaft receptacle 304J includes a part of the rear wall 304D of the right eyepiece cylinder 304 (a plate-like member), a jig insertion hole 304J1 bored in the width direction of the rear wall 304D for receiving the jig 10, and an arch portion 304J2. The arch portion 304J2 is formed on a portion of the hole edge of the jig insertion hole 304J1, thereby forming an arched edge expanding outward from the center of the jig insertion hole 304J1 in the outer diameter direction. The diameter of the arch portion 304J2 is optionally less than the half the diameter of (smaller than) the first shaft portion 12 of the jig 10.

The shaft receptacle 304K also includes a part of the rear wall 304D of the right eyepiece cylinder 304 (a plate-like member), a jig insertion hole 304K1 bored in the width direction of the rear wall 304D for receiving jig 10, and an arch portion 304K2. The arch portion 304K2 is formed on a portion of the hole edge of the jig insertion hole 304K1, thereby forming an arched edge expanding outward from the center of the jig insertion hole 304K1 in the outer diameter direction. The diameter of the arch portion 304K2 is optionally less than the half of the diameter of (smaller than) the first shaft portion 12 of the jig 10.

The holder 306A can be adjusted in the vertical and lateral direction by using the jig 10 from behind the rear wall 304D of the right eyepiece cylinder 304 (as noted above, the holder 306A can also be adjusted before the right eyepiece cylinder 304 is attached or before the parts 306A, 306D, 303 are mounted to the binocular).

Figure 44:
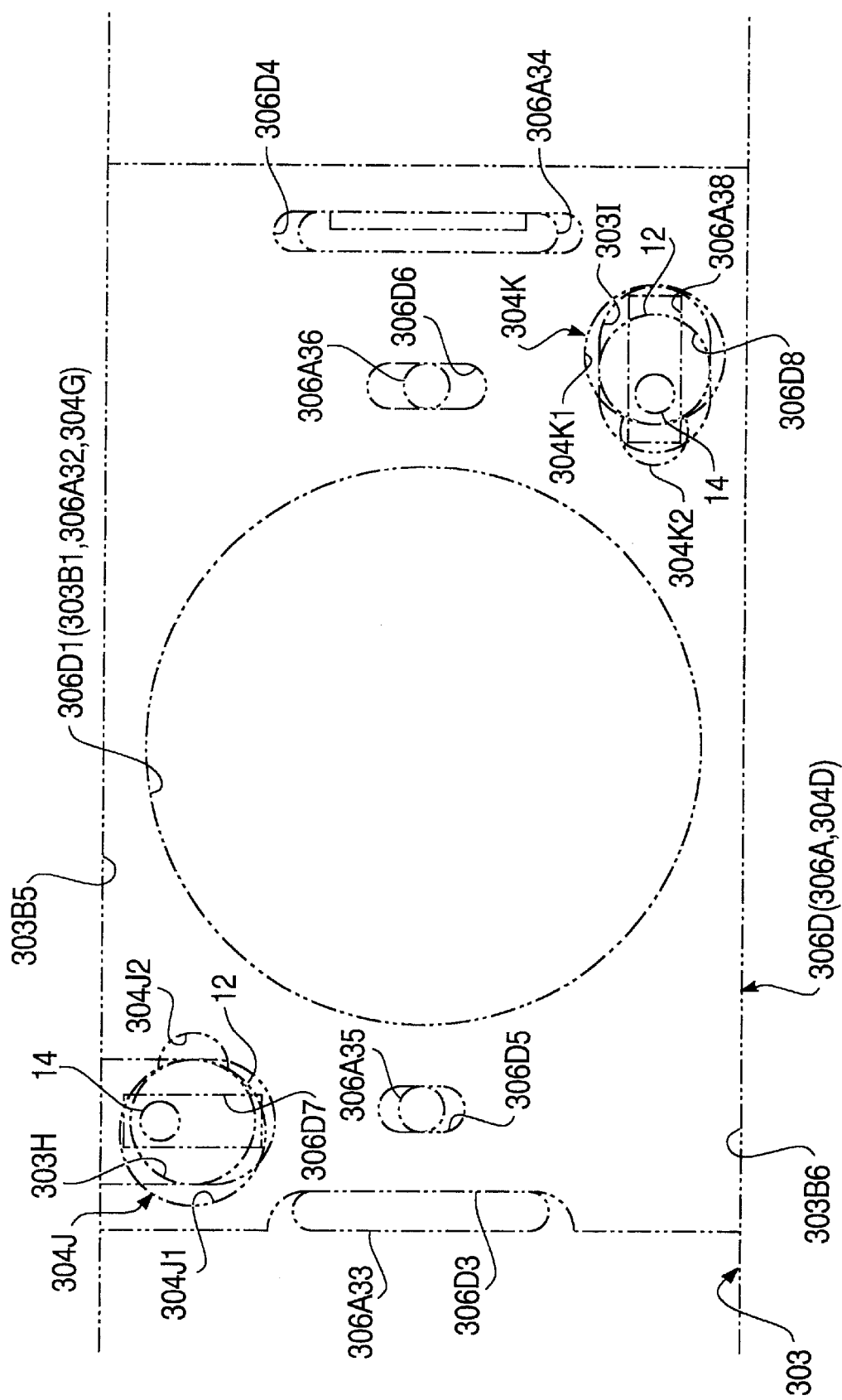
FIG. 44 shows an explanation view illustrating the (location) relationship among the right eyepiece cylinder, a rear wall of right moving body, a thin plate, a holder and the jig.

FIG. 43 shows an explanatory view illustrating the (location) relationship among the rear wall of the prism holder 306A, the thin plate 306D, the holder of the right moving body 303 and the jig 10, and FIG. 44 shows an explanatory view illustrating the (location) relationship among the right eyepiece cylinder 304, the rear wall of the right moving body 303, the thin plate 306D, the prism holder 306A and the jig 10.

FIG. 43 represents shows the right moving body 303 seen from behind (although parts not necessary for explanation are omitted), and FIG. 44 shows the rear wall 304D of the right eyepiece cylinder 304 seen from behind (although parts not necessary for explanation are omitted).

The first and second lens unit 307 and 308 are accommodated between the right moving body 303 and the right eyepiece cylinder 304. The eyepiece lens unit 309 is installed in the right eyepiece cylinder 304. The holder 306A and the right moving body 303 are fixed via two (loosened) screws 815, sandwiching the thin plate 306D therebetween.

As shown in FIGS. 14, 31 and 32, first, the eyepiece 309D is removed from the rear wall 304D of the right eyepiece cylinder 304 (of course, if the eyepiece 309D has not been mounted yet during the manufacturing process, the following still applies) Consequently, the through-holes 304H, 304I, and shaft receptacles 304J and 304K of the right eyepiece cylinder are exposed outward.

A screw driver is inserted into the holes 304H and 304I of the rear wall 304D of the right eyepiece cylinder to loosen the two screws 815 (if they are not already loose), so that the holder 306A and the thin plate 306D become movable with respect to the right moving body. That is, in scenarios where the binocular is being assembled during manufacturing, the screws 815 may already be loosely secured. However, in scenarios where the binocular is being serviced or adjusted, the screws 815 may require loosening.

As shown in FIGS. 43 and 44, the first shaft portion 12 and the second shaft portion 14 are then inserted into the jig insertion hole 304K1 of the shaft receptacle 304K of the rear wall 304D of the right eyepiece cylinder 304, and are further inserted into the jig guiding hole 306D8 of the thin plate 303D via the opening 303I of the rear wall 303B of the right moving body 303, the second shaft portion 14 being inserted into the jig engagement long groove 306A38 of the holder 306A.

The jig 10 is rotated while the first shaft portion 12 is guided by the jig guiding hole 306D8. At the same time as the jig 10 is rotated, the outer circumferential surface of the first shaft portion 12 of the jig 10 is pressed against the arch portion 304K2 of the shaft receptacle 304K. Consequently, the jig 10 is rotatably supported or further supported, because the outer circumferential surface of the first shaft portion 12 is supported stably by the arch portion 304K2 without play.

The arch portion 304K2 may have a smaller diameter than the diameter of the first shaft portion 12, so that the outer circumferential surface of the first shaft portion 12 is stably supported by two portions where the hole edge of jig insertion hole 304K1 connects to the arch portion 304K2. Accordingly, the jig 10 is operably rotated stably, supported by the shaft receptacle 304K.

Optionally, when the diameter of the arch portion 304K2 is the same size as the diameter of the first shaft portion 12, the first shaft portion 12 can be stably supported by a portion of the arch portion 304K2. Therefore, the jig 10 is operably rotated stably by means of the shaft receptacle 304K, in a similar manner to that noted immediately above.

As arranged, the rotation operation of the jig 10 within the shaft receptacle 304K moves the holder 306A only in the vertical direction with respect to the right moving body 303, enabling the vertical adjustment of the prism location.

With respect to the lateral adjustment of the prism location, initially, as shown in FIG. 44, the first shaft portion 12 and the second shaft portion 14 of the jig 10 are inserted into the jig insertion hole 304J1 of the shaft receptacle 304J of the rear wall 304D of the right eyepiece cylinder 304, so that the second shaft portion 14 is inserted into the jig engagement long groove 306D7 of the thin plate 303D.

The jig 10 is rotated while the first shaft portion 12 is guided by the jig guiding hole 303H. At the same time as the jig 10 is rotated, the outer circumferential surface of the first shaft portion 12 of the jig 10 is pressed against the arch portion 304J2 of the shaft receptacle 304J. Consequently, the jig 10 is rotatably supported stably without play, because the outer circumferential surface of the first shaft portion 12 is supported stably by the arch portion 304J2 without play.

The arch portion 304J2 may have a smaller diameter than that of the first shaft portion 12, so that the outer circumferential surface of the first shaft portion 12 is stably supported by two portions where the hole edge of jig insertion hole 304J1 connects to the arch portion 304J2. Accordingly, the jig 10 is operably rotated, stably supported by the shaft receptacle 304J.

Optionally, when the arch portion 304J2 has the same diameter as the diameter of the first shaft portion 12, the outer circumferential surface of the first shaft portion 12 is stably supported by the arch portion 304K2, so that the jig 10 can securely be operably rotated by means of the shaft receptacle 304J.

As mentioned above, the rotation operation of the jig 10 within the haft receptacle 304J moves the holder 306A only in the lateral direction with respect to the right moving body 303, enabling the lateral adjustment of prism location.

After finishing the adjustment of the lateral and vertical location by using the jig 10, the two screws 815 are tightened, retightened or inserted and engaged through the holes 304H and 304I of the rear wall 304D of the right moving body 303 and then tightened, so that the holder 306A and the right moving body 303 are securely fixed, with the thin plate 306D therebetween.

Accordingly, the holder 306A can be easily adjusted, that is to say, the erecting prism unit including the first and second prism 306E and 306F held by the holder 306A can be easily adjusted in the vertical and lateral directions with respect to the optical axes of the telescope optical systems, even while the right eyepiece cylinder 304 is attached to the right moving body 303.

Further, the location of the erecting prisms can be adjusted easily, without removing the right eyepiece cylinder 304 from the right moving body 303 or otherwise dismounting the telescope optical system, so that the prism location is adjusted in a shorter time in an assembling or reassembling process, enhancing productivity.

In the embodiment according to the present invention, the right eyepiece cylinder 304 is provided with an eyepiece 309D that may be considered part of the outer housing member of the binocular, and the eyepiece 309D covers the shaft receptacles 304J and 304K that are capable of engaging the jig 10. Accordingly, the location of the erecting prism can be adjusted by removing only the eyepiece 309D without dismounting other parts. Accordingly, even after the binocular is fully or almost fully assembled, the erecting prism can be adjusted in a short time, enhancing the operational efficiency.

It is a feature (although not an essential feature) of the present invention that the shaft receptacles 304J and 304K stably support the jig 10 without a play during adjustment of the prism location, so that the jig 10 can transmit driving power securely for a better and more secure adjustment.

In the embodiment of the present invention noted above, although the jig 10 is supported by the two portions where the hole edge portion of the jig insertion hole 304K1 connects to the arch portion 304K2, an alternative constitution may be employed, which is also encompassed by the language of the claims.

Figure 45A:
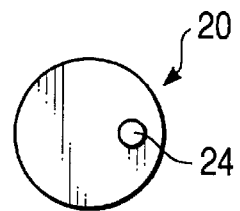
FIG. 45A shows a front plan view of a jig according to another embodiment of the present invention, illustrating a constitution of the jig.
Figure 45B:
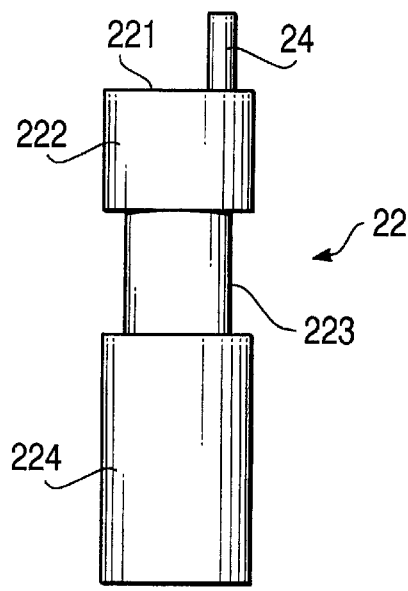
FIG. 45B shows a plan view of the jig according to the another embodiment of the present invention, illustrating the constitution of the jig.
Figure 46:
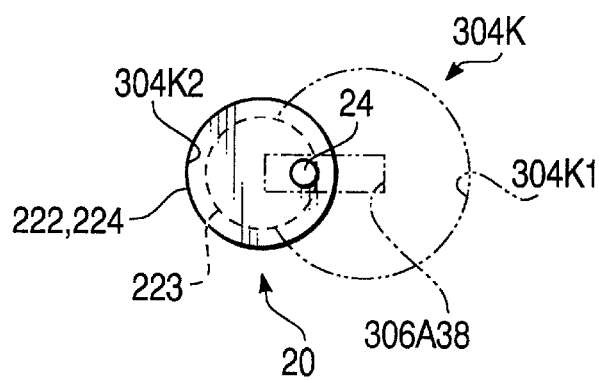
FIG. 46 shows an explanation view illustrating the operation of the jig.

FIGS. 45A and 45B shows an alternative constitution of a jig 20 that is accepted by the shaft receptacles 304J and 304K, FIG. 45A being the front view of the jig 20, and FIG. 45B being the plan view of the jig 20. FIG. 46 is an explanation view illustrating the operation of the jig 20.

As shown in FIGS. 45A and 45B, the jig 20 includes a first shaft portion 22 that is cylindrically shaped, and a second shaft portion 24 extending cylindrically from an end portion 221 of and in the longitudinal direction of the first shaft portion 22.

The first shaft portion 22 includes two large diameter portions 222, 224, and a small diameter portion 223 that connects the two large diameter portions 222, 224.

As shown in FIG. 46, the diameter of the small diameter portion 223 is, for example, approximately the same size as that of the arch portion 304K2 of the shaft receptacle 304K, so that the first shaft portion 22 is rotated stably without play when engaging the arch portion 304K2, because of the contact between the outer circumferential surface of the small portion 223 and the arch portion 304K2.

In this case, the first shaft portion 22 and the second shaft portion 24 of the jig 20 are inserted into the jig guiding hole 306D8 of the thin plate 303D from behind, through the opening 303I of the rear wall 303B of the right moving body 303, so that the second shaft portion 24 is inserted into the jig engagement long groove 306A38 of the holder 306A. Then, in such configuration, the jig 20 is rotated while the small diameter portion 223 is guided by the arch portion 304K2.

That is to say, the jig 20 is rotated while engaging the prism location arrangement structure that is formed by the jig guiding hole 306D8 and jig engagement long groove 306A38. Consequently, the second shaft portion 24, being eccentric to the first shaft portion 22, and with the outer circumferential surface of the second shaft portion 24 abutting the side edges of the jig engagement long groove 306A38, is rotated, centered on the center of the diameter of the arch portion 304K2. The holder 306A, supported to be vertically movable but not movable laterally with respect to the thin plated 306D, is moved only in the vertical direction.

It is noted that the second jig 20 provides substantially equivalent features as that of the jig 10 as mentioned above, and can be accepted by the same receptacles 304J, 304K.

Any jig that is adaptable to the structure of the prism location arrangement structure or an equivalent structure (e.g., a structure having similar contact points, degrees of freedom, and/or mechanical relationships), for example, a shaft portion may be provided with a protrusion that is engageable to the jig engagement long groove 306D7 of the thin plate 306D and/or the jig engagement long groove 306A38 of the holder 306A, the shaft portion being rotated while being supported by the shaft receptacle(s) for moving the thin plate and holder. As noted above, the jig may also be provided as a relatively rotatable part mounted on one of the internal assemblies, in which case a screwdriver-compatible engagement may be formed in the jig for engagement with a screwdriver.

As noted, the erecting prism is adjusted by engaging a jig (such as jig 10) with a first adjustment mechanism (e.g., the structures permitting adjustment via the thin plate 306D such as holes 306D7, 303H, and/or banks 303B5, 303B6, and/or holes 303F, 303G, and similar structures on the left side) operably coupled between a prism holder (such as holder 306A) and an intermediate member (such as thin plate 306D), the prism holder holding the erecting prism. The location of the erecting prism is adjusted in a first direction perpendicular to an optical axis of the binocular. The jig is then engaged with a second adjustment mechanism (e.g., the structures permitting adjustment via the prism holder 30A such as holes 306A38, 306D8, and/or grooves and slots 306D3–D6, and/or holes 303F, 303G, 306D2, 303I, and similar structures on the left side) operably coupled between the intermediate member and a base member (such as moving unit 303).

The location of the erecting prism is then adjusted in a second direction perpendicular to the optical axis of the binocular and perpendicular to the first direction. Of course, unless otherwise specified, the jig 10 may be inserted and used for adjustment in the first and second adjustment mechanism in any order or simultaneously. After adjustment (s), all of the base member, the intermediate member, and the prism holder are affixed together (e.g., via screws 815) in a desired adjusted location of the erecting prism relative to the base member.

More specifically, and optionally, the jig (such as jig 10) can be contacted with a jig support (such as hole 303H in moving unit 303) adjacent the first adjustment mechanism that limits the movement of the jig in the first and second directions. The same applies to the second adjustment mechanism (such as via hole 306D8 in thin plate 306D). Also, the jig can be contacted with a jig support substantially aligned with the first adjustment mechanism (such as receptacle 304J, and/or arch 304J2) that limits the movement of the jig in at least one of the first and second directions. The same applies to the second adjustment mechanism (such as via receptacle 303K, and/or arch 304K2). The jig support can limit the movement of the jig in one of the first and second directions by two point contact to an outer circumference of a substantially circular shaft of the jig (such as that provided by the combination of arch 304J2 and jig 10). The jig support can limit the movement of the jig in one of the first and second directions by arcuate chord contact of an arch portion having a predetermined inner diameter to an outer circumference of a substantially circular shaft of the jig having substantially a same outer diameter as the predetermined inner diameter (such as that provided by the combination of arch 304J2 and jig 20).

Hereinbelow, those portions of the left frame 401 and the left objective frame 405 (of the elements in the left lens barrel 400) that are different from those of the right lens barrel 300 are described.

As shown in FIG. 15, the left frame 401 is provided with a holder 401B formed on the rear left portion at the center in the height direction, for holding the rear part of the left guiding shaft 401A, similar to the right frame 301 described above.

A threaded hole 401F is formed on the front left side wall of the left frame 401 substantially at the center of the height direction. A head of a screw 813, screw-coupling into the hole 401F, and the left side wall together hold the front portion of the guiding shaft 401A so that the guiding shaft 401A is supported.

The lower part of the front left side wall of the left frame 401 has a threaded hole 401C formed therein to be screw coupled, or fixing the left frame 401 to the left slide plate 110 (shown in FIG. 8; refer to the arrow "D").

A holder 401E is formed on the rear right portion of the left frame 401, at substantially the center in the height direction (refer to arrow "C"), for holding the rear portion of the guiding shaft 401D (FIG. 16).

A threaded hole 401G is formed on the right upper part of the front wall of the left frame 401. A screw 814 screw couples into the screw hole 401G, via the through-hole 402A of the left frame lid 402, so that the left lid 402 is attached at the front of the left frame 401. The left lid 402 holds the front of the guiding shaft 401D.

A threaded hole 402B is formed on the front of the left frame lid 402, to which the screw 815 is coupled via the through-hole 410A22 provided on the front wall 410A2 of the left outer housing 410. Accordingly, the front portion of the left frame 401 is fixed to the front wall 410A2 of the left outer housing 410A via the left frame lid 402.

A screw 816 is screwed into the threaded hole 401I formed above the upper portion of the threaded hole 401F of the left frame 401, via the through-hole 410A41 formed on the left side wall 410A4 of the left outer housing 410A. Accordingly, the left side of the left frame 401 is fixed to the left side wall 410A4 of the left outer housing 410A.

A screw 817 is screwed into a threaded hole 401H formed on the rear right wall of the left frame 401, via the through-hole provided on the rear wall 410A3 of the left outer housing 410A, so that the rear part of the left frame 401 is fixed to the rear wall 410A3 of the left outer housing 410A.

An upper wall 401J, defined by and connected to the upper portions of the right and left side walls of the left frame 401, is approximately rectangularly shaped. The front left side of the upper wall 401J is provided with a (vertically extending) circular through-hole 401K.

Under the circular hole 401K is formed an engaging portion 405A4 formed on the left objective frame 405A, the engaging portion 405A opposing the circular through-hole 401K.

As shown in FIG. 16, the left objective frame 405A includes a body 405A1 shaped cylindrically, a first holding member 405A2 provided on the left side of the body 405A, and a second holding member 405A3 provided on the right side of the body 405A1 and extending rearward.

The inner circumferential surface of the body 405A1 is formed to hold the outer circumference of the objective lens 405C, and is female threaded. The male threads formed around the outer circumference of the objective pressing ring 405B are screwed into the female screw, so that the objective lens 405C is held by the body 405A1 and the objective pressing ring 405B.

The first holding member 405A2 is formed to slidably hold the guiding shaft 401A (shown in FIG. 15), i.e., such that the left objective frame 405A is slidable along the axis direction of the guiding shaft 401A. In more detail, the first holding member 405A2 is provided with two holders 405A21 and 405A22 projecting from the left edges of the body 405A1. The holders 405A21 and 405A22 are formed to cover or bracket the outer circumference of the guiding shaft 401A from the top and bottom sides (vertically). The upper holder 405A21 is provided with a threaded through-hole 405A211, and the lower holder 405A22 is provided with a threaded hole. The through-hole 405A211, when the left objective frame 405 is assembled into the left frame 401, opens upward through an oblong circular hole 401L (refer to FIG. 15).

Accordingly, (before the screw 819 noted below is tightened) the guiding shaft 401A is held by the holders 405A21 and 405A22 so that the first holding member 405A2 is movable along the guiding shaft 401A.

The second holding member 405A3 is provided with a shaft hole 405A31 formed to slidably receive the guiding shaft 401D along its axis direction therein. Accordingly, the second holding member 405A3 is formed to hold the guiding shaft 401D, such that the left objective frame 405A is movable in the axis direction of the guiding shaft 401D.

Thus, the left objective frame 405A is held movably in the optical axis direction by the guiding shafts 401A and 401D disposed parallel to each other.

Accordingly, the objective lens 405C is held to the left objective frame 405A, and the location (along the optical axis direction) of the left objective frame 405A can be determined at any position supported on the guiding shafts 401A and 401D with respect to the left frame 401. The left objective lens 405C is securely fixed to the guiding shaft 401A at a decided position by a screw 819, screw-coupled to the first holding member 405A2.

As noted, the left objective frame 405A does not, in the embodiments, include an equivalent to the engagement member 305A4 that is engages the diopter eccentric seat 107 in the right objective frame 305A4. Therefore, the position (in the optical axis direction) of the objective lens 405C with respect to the left frame 401 is fixed in the production stage (before shipment) by the screw 819 affixed to the first holding member 405A2, and a user or operator would not be permitted to adjust the position (after shipment).

On the other hand, the location of the objective lens 305C of the right lens barrel 300 with respect to the right frame 301 in the optical axis direction can be adjusted by rotating the diopter arrangement ring 106, i.e., the diopter eccentric seat 107, for adjusting the diopter difference.

The components forming the left lens barrel 400 also include structures for adjusting the location of the erecting prism (e.g., Dach or roof prism) vertically and laterally as described with respect to the right barrel 300. The structures for adjusting the location of the erecting prism (e.g., Dach prism in the variation) in the left lens barrel 400 are substantially similar to those of the right lens barrel 300 described above.

FIGS. 27 through 30 show the left moving body 403. As noted above, components in the left moving body 403, prism unit 406, and left eyepiece cylinder 404 corresponding to those in the right moving body 303, right prism unit 306 and right eyepiece cylinder 304 are numbered by "400" series numbers and suffixes corresponding to the "300" series numbers and suffixes employed for the right side. The detailed explanation for "300" series elements should be considered to apply to symmetrically corresponding "400" series elements unless otherwise noted.

Although the left moving body 403 is generally configured to be symmetrical to the right moving body 303, the locations of the screw holes 403F, 403G, jig guiding hole 403H and hole 403I formed on the rear wall 403B, correspond to those (303F, 303G, 303H, 303I) on the rear wall 303B of the right moving body 303, but are rotated by 180 degrees, the rotation substantially centered on the optical axis extending in the length direction (as noted below, the same rotation is applied to corresponding holes/grooves in the left side thin plate 406D and the rear surface of the prism holder 406A).

Similarly, a left side thin plate 406D has substantially a symmetrical shape with respect to the right side thin plate 306D, but is configured in such a manner that at least the holes 406D7, 406D2, 406D2, and 406D8 corresponding to the holes 306D7, 306D2, 306D2, and 306D8 in the right thin plate 306D are rotated by 180 degrees, the rotation substantially centered on the optical axis. The thin plate 406D is intermediate the left moving body 403 and the holder 406A.

Furthermore, the left holder 406A has substantially a symmetrical shape with respect to the right holder 306A, but is configured in such a manner that at least the holes 406A31, 406A38, and cutaway 406A37 corresponding to the holes 306A31, 306A38, and cutaway 306A37 in the right holder 306A are rotated by 180 degrees, the rotation substantially centered on the optical axis.

FIGS. 37 through 41 show the left eyepiece 404. The left eyepiece is also generally configured to be symmetrical to the right moving body 303, but is configured in such a manner that the locations of through-hole 404H, 404I, and jig receptacles 404J and 404K that are formed on the rear wall 404D, that correspond to those (304H, 304I, 304J, 304K) on the rear wall 304D of the right eyepiece 304, are rotated by 180 degrees, the rotation substantially centered on the optical axis.

The relationships, relative location, and mounting among the left eyepiece cylinder 404, left moving body 403, holder 406A and thin plate 406D, as well as the adjustment operation using the jig 10, are substantially similar to the corresponding elements of the right lens barrel. The detailed explanation for "300" series elements should be considered to apply to symmetrically corresponding "400" series elements unless otherwise noted.

Accordingly, the binocular 100 includes a right telescope system 300 and a left telescope optical system 400. Each of the telescope optical systems includes an erecting prism (306E, 306F or 406E, 406F) that forms an erected image and an optical adjustment structure. The optical adjustment structure includes a base member (e.g., the moving body 303 or 403), and an intermediate member (e.g., the thin plate 306D or 406D). The intermediate member includes a first adjustment mechanism operably coupled to the base member (e.g., the structures permitting adjustment via the thin plate 306D such as holes 306D7, 303H, and/or banks 303B5, 303B6, and/or holes 303F, 303G, and similar structures on the left side) that adjusts the location of the erecting prism in a first direction perpendicular to the optical axis. The optical adjustment structure includes an erecting prism holder (e.g., the holders 306A or 406A) holding the erecting prism. The erecting prism holder includes a second adjustment mechanism (e.g., the structures permitting adjustment via the prism holder 30A such as holes 306A38, 306D8, and/or grooves and slots 306D3~D6, and/or holes 303F, 303G, 306D2, 303I, and similar structures on the left side) operably coupled to the intermediate member that adjusts the location of the erecting prism in a second direction perpendicular to the optical axis and to the first direction. The first and second adjustment mechanisms cooperate to adjust the location of the erecting prism relative to the base member in both the first direction and the second direction.

Further, the binocular can include a securing connection (such as that provided by screws 815 connecting to holder 303 via the thin plate 306D and moving unit 303, and similar structures on the left side) that affixes all of the base member, the intermediate member, and the erecting prism holder together in a desired adjusted location of the erecting prism relative to the base member in both the first direction and the second direction.

The invention may be alternatively expressed as a binocular having a right telescope system and a left telescope optical system (such as 300 and 400). Each of the telescope optical systems includes an objective lens (such as lens 305C or 405C) having an objective optical axis, an eyepiece lens (such as lens 309C or 409C) having an eyepiece optical axis, and an erecting prism (such as prisms 306E or 406E) including a first prism and a second prism (such as prisms 306F or 406F), that forms an erected image. The objective optical axis enters the first prism perpendicularly at an entry point of an incident surface (such as the surface facing hole 306C11 or 406C11) of the first prism, and the eyepiece optical axis exits the second prism perpendicularly at an exit point of an exit surface (such as the surface facing hole 306A32 or 406A32) of the second prism. All of the objective optical axis, the entry point, the exit point, and the eyepiece optical axis are arranged substantially along a same straight line. Each telescope optical system includes an optical adjustment structure including a base member (such as the moving body 303 or 403), and an intermediate adjusting mechanism (such as that provided by thin plate 306D and prism holder 306A). The intermediate member including a first adjustment mechanism (e.g., the structures permitting adjustment via the thin plate 306D such as holes 306D7, 303H, and/or banks 303B5, 303B6, and/or holes 303F, 303G, and similar structures on the left side) operably coupled to the base member that adjusts the location of the erecting prism in a first direction perpendicular to the optical axis, and a second adjustment mechanism (e.g., the structures permitting adjustment via the prism holder 30A such as holes 30GA38, 306D8, and/or grooves and slots 306D3~D6, and/or holes 303F, 303G, 306D2, 303I, and similar structures on the left side) that adjusts the location of the erecting prism in a second direction perpendicular to the optical axis and to the first direction.

The first and second adjustment mechanisms may operate independently or cooperate to adjust the location of the erecting prism relative to the base member in both the first direction and the second direction. Again, a securing connection (such as screws 815 affixed from the holder 306A through to the moving unit 303B, and similarly on the left side) may affix the base member and the first and second adjustment mechanisms together in a desired adjusted location of the erecting prism relative to the base member in both the first direction and the second direction.

The overall operation of the binocular 1000, configured such mentioned above, is described below.

Figure 1C:
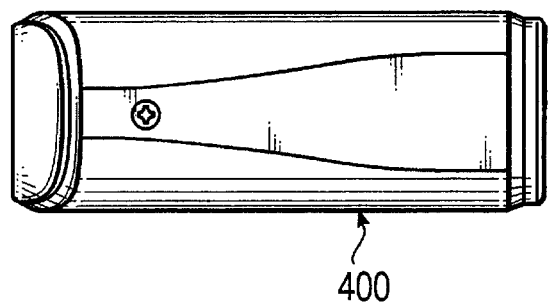
FIG. 1C shows a side view of the binocular of FIG. 1A seen from the direction of an arrow A2.

The binocular 1000 is, when stored or not used, as illustrated in FIGS. 1 and 2, that is, the right and left lens barrels 300 and 400 are closed and the right and left eyepiece cylinders 304 and 404 are accommodated in the body, or drawn in.

An operator holds the right and left lens barrel 300 and 400 respectively with right and left hands, the thumbs of the right and left hands supporting the right and left outer housing bottoms, and other fingers of right and left hands hold the upper surface of the upper wall of respective right and left outer housing, therefore, holding the outer housing between the fingers and thumbs.

The focus arrangement ring 202 and the zooming arrangement ring 204 are disposed on the main shaft 201, adjacent to each other on the center of the binocular 1000 in the lateral direction, so that any finger of the right and left hands can easily rotate the two rings 202 and 204 (without the use of the thumbs).

When the focus arrangement ring 202 is rotated by a finger, the arm 202A1 integrally formed on the body 202A (shown in FIG. 11), extending in the diameter direction, is also rotated, so that the balls 203 engaged in the engagement portion 202A11 on the arm 202A1 move along the two-stage (coarse and fine) guiding grooves 206A1.

The protrusions 206C4, 206C5 (shown in FIG. 11) formed on the right and left portion of the flange 206C of the moving shaft 206 moved along the guiding grooves 101C11 and 101D11 (shown in FIG. 9) extending along the right and left wall 101c and 101D.

Each protrusion 206C1 and 206C2 abuts the banks 101C12 and 101D12, restricting the range of motion of the moving shaft 206 toward the front, and each protrusion 206C4 and 206C5 abuts the rear wall 101G1 of the body 101, restricting the range of motion to the rear.

As shown in FIG. 11, when the balls 203 move, engaging the first groove 206A11 (wide pitch), the moving amount of the moving shaft 206 by a rotation of the focus rotation ring 202, is large than that when engaging the second groove 206A12 (narrow pitch).

The moving shaft 206, coupled with the cam frame 210, is integrally attached to the pressing plate 215 (shown in FIG. 9). The pressing plate 215 is further attached integrally with the cooperating shaft 216. Accordingly, cooperating with the movement of the moving shaft 206, the right and left moving units 306 (shown in FIGS. 5 and 13) and 406 (shown in FIG. 16) move rearward. Consequently, the right and left eyepiece cylinders 304 (shown in FIGS. 5 and 14) and 404 (shown in FIGS. 5 and 17) project out the binocular. In such a condition, an operator looks at an object of (effectively) infinite distance through the both eyepiece 309 and 409 and laterally extends the right and left lens barrels 300 and 400 to set an appropriate inter pupillary adjustment, such that the right and left images coincide for binocular vision.

As mentioned above, the right and left outer housing 310A (shown in FIGS. 5 and 12) are respectively fixed to the right and left slide plates 109 and 110 (shown in FIGS. 6 through 8). Therefore, the right and left lens barrels 300 and 400 move simultaneously and by the same distance in the lateral direction, approaching to and moving away from each other, providing the observer an easy operation for inter pupillary adjustment. Moreover, due to the protrusions 103D extending from bottom lid 103 the slide plate 110 moves laterally with a given frictional force, affording a more comfortable operation for the interpupillary adjustment.

Figures 3A, 3B:
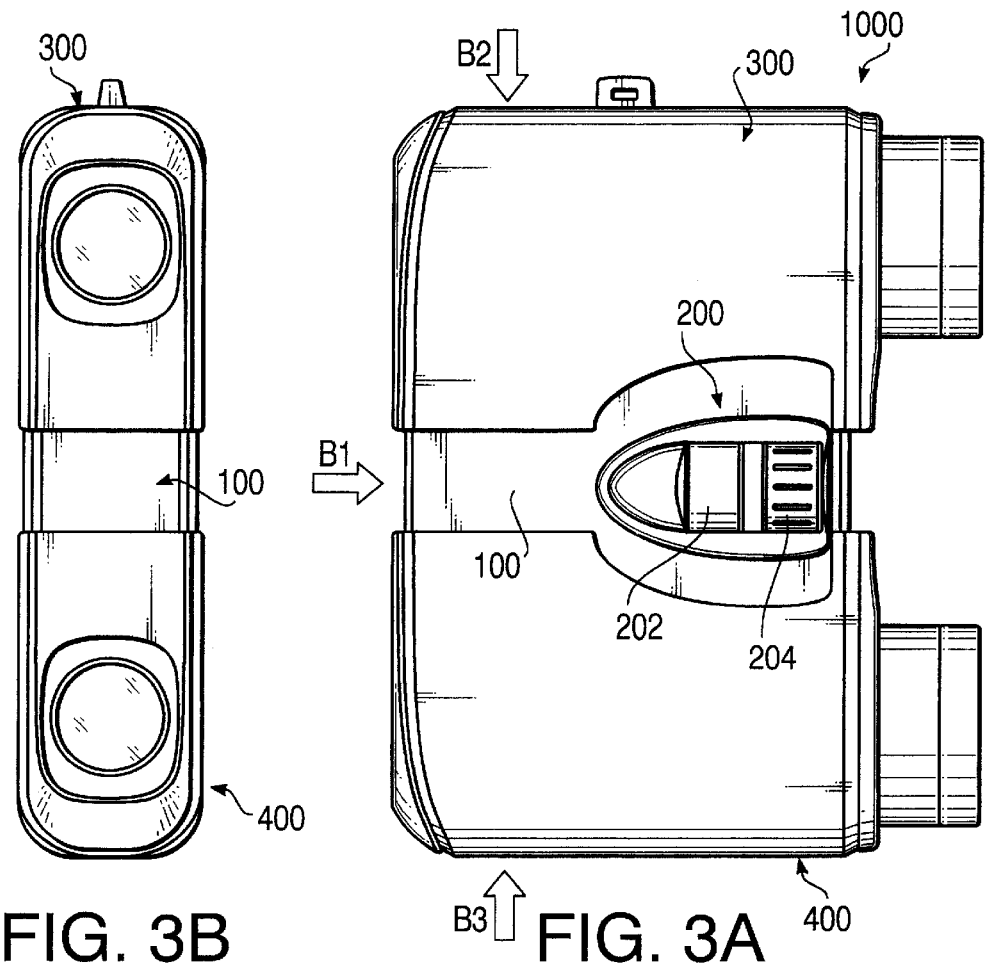
FIG. 3A shows an upper plan view of the binocular according to an embodiment of the invention, in which the right and left lens barrels are moved apart from each other as much as is permitted by the mechanisms described herein, and in which the right and left eyepiece lens barrels are drawn from the respective lens barrels by as much as is permitted by the mechanisms described herein.
FIG. 3B shows a front view of the configuration of FIG. 3A seen from the direction of arrow B1.
Figure 3C:
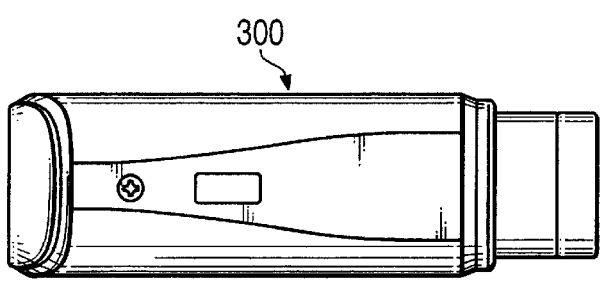
FIG. 3C shows a side view of the configuration of FIG. 3A seen from the direction of an arrow B2.
Figure 3D:
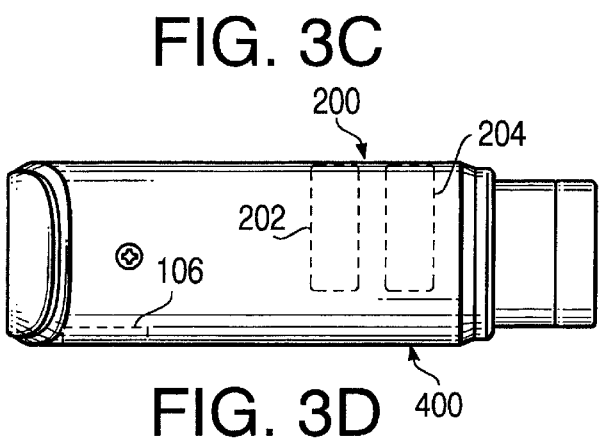
FIG. 3D shows a side view of the configuration of FIG. 3A seen from the direction of an arrow B3.

With reference to FIGS. 3, 5, and 6, as well as FIGS. 13 and 14, focus is arranged by rotating the focus arrangement ring 202. That is, the rotation of the focus arrangement ring 202 is converted into a linear movement of the right moving unit 303 (shown in FIG. 13), the right eyepiece cylinder 304 (shown in FIG. 14) and the eyepiece unit 309 (shown in FIG. 14) with respect to the right objective frame 305A (shown in FIG. 13).

The prism unit 306 (shown in FIG. 13), the first lens 307 (shown in FIG. 14), the second lens 308 (shown in FIG. 14) and the third lens 309 (shown in FIG. 14) move linearly with respect to the objective lens 305C (shown in FIG. 13), so that the focus is arranged or adjusted.

The left lens barrel 400 also has the same operation for focus adjustment, a description of which is accordingly omitted.

Again, with reference to FIGS. 3, 5, and 6, and in detail shown in FIGS. 9 through 11 and 14, magnifying-power is varied by rotating the zooming arrangement ring 204. That is, by the rotation of the zooming arrangement ring 204, the main shaft 201 (shown in FIG. 11) rotates, causing the rotation of the cam ring 207 with respect to the cam frame 210. The first lens guiding piece 208 and the second lens guiding piece 209, engaged respectively with the first cam groove 207D and the second cam groove 207E via balls 210B in the cam ring 207, are moved in the opposite direction with each other.

Consequently, the first and second lens frame 307A and 308A (both shown in FIG. 14), being respectively engaged with the first and second lens slide plates 213 and 214 (shown in FIGS. 9 and 10), are moved to approach/move away from each other (always moving in opposite directions) by the same movement of the first and second lens guiding pieces 208, 209. The first and second lens 307B and 308B approach and move away from each other so that the magnifying power of the telescope optical system is varied.

The left lens barrel 400 also has the same operation for zooming adjustment, a description of which is accordingly omitted to.

Next, the operation of the diopter correction system will described with reference to FIGS. 2A, 7, 8, 9, 13, and 14.

First, an observer observes a distant object by the left eye through the third (eyepiece) lens 409C (shown in FIG. 17) of the left lens barrel 400, focusing on the distant object so as to see the distant object most clearly, by rotating the focus arrangement ring 202. Next, observing by the right eye through the third (eyepiece) lens 309C (shown in FIG. 14) of the right lens barrel 300, the observer rotates the diopter decorative ring 106 to see the object most clearly (i.e., in the "+" direction or in the "−" direction as shown in FIG. 2A).

That is, rotating movement of the diopter correction decorative ring 106, causing rotation of the diopter eccentric seat 107 (see FIGS. 8 and 9), is converted to linear motion by engagement of the eccentrically seated (or mounted) disk-shaped body 107A (see FIGS. 8 and 9) and the channeled adjustment groove formed by the engaging walls 305A41, 305A41 (see FIG. 13), so that the location of the objective lens 305 is arranged with respect to the right frame 301 for diopter correction.

If the observer is the same upon subsequent uses of the binocular 1000, there is no need to change the diopter after the user's initial correction. However, each operator can adjust for variation between that operator's left and right eyes.

As shown in FIG. 2A, the diopter correction decorative ring 106 is disposed on the center in the width direction near to the front end of the supporting plate 102, so that the thumb of either the right and left hands can easily operate the diopter decorative ring 106 to rotate. Moreover, the thumb is already at, or is easily moved to, a sufficient distance, while the observer is focusing or zooming, from the diopter correction decorative ring 106, so that unintentional diopter operation by the thumb is prevented.

The binocular according to the present invention, with the structures detailed above, provides beneficial effects at least as follows.

In the embodiment according to the present invention, a guiding unit of the intermediate member 306D is formed by the cutaway portion 306D3, long grooves 306D4, 306D5 and 306D6 of the thin plate 306D, and a guided unit of the prism holder 306A is formed by the protrusions 306A33, 306A34 306A35 and 306A36 of the holder 306A, the guiding and guided units forming part of an adjustment mechanism. A guiding unit of the prism holder (member) is formed by the banks 303B5 and 303B6 of the right moving body 303, and a guided unit of the intermediate member 306D is formed by the upper edge 306D91 and the lower edge 306D92 of the thin plate 306D, the guiding and guided units forming part of an adjustment mechanism.

In the embodiment according to the present invention, a first plate member is formed by the thin plate 306D, a first hole is formed by the jig guiding hole 306D8 of the thin plate 306D, and a first long groove is formed by the jig engagement long groove 306A38 of the holder 306A. A second plate member is formed by the rear wall 303B of the right moving body 303, a second hole is formed by the jig guiding hole 303H of the right moving body 303, and a second long groove is formed by the jig engagement long groove 306D7 of the thin plate 306D.

In the embodiment according to the present invention, a prism holding structure is formed by the thin plate 306D, a first long grooves 306D4, 306D5 and 306D6 of the thin plate 306D, protrusions 306A33, 306A34, 306A35 and 306A36 of the holder 306A, banks 303B5 and 303B6 of the right moving body 303, the upper edge 306D91 and the lower edge 306D92 of the thin plate 306D and the jig 10.

Moreover, a prism location adjustment structure, in the embodiment, is formed by the jig engagement long groove 306A38 of the holder 306A, and a prism location adjustment structure according to the present invention is formed by the jig engagement long groove 306D7 of the thin plate 306D and the jig guiding hole 303H of the right moving body 303.

Optionally, in the embodiment of the present invention, the shaft receptacle 304K includes a jig insertion hole 304J1 and an arch portion 304J2 for rotatably supporting a jig 10, and the shaft receptacle 304K includes a jig insertion hole 304K1 and an arch portion 304K2.

The invention, however, is not restricted by the embodiments noted. Although the particular jig support structures noted have advantages as noted for supporting the jig 10, the invention does not require a particular jig support structure, and conventional structures may be adapted as set forth herein to rotatably support the jig 10.

For example, the prism location adjustment structure according to the present invention is not restricted to the embodiments mentioned above, but includes equivalent structures in which the erecting prism location is moved in the first and second directions. As noted, the adjustment may be facilitated by a jig operation such as jig rotation. Particularly advantageous effects are found for the Dach or roof prism, but the invention is not so restricted.

The arrangement jig, supported by the shaft receptacle, is operably rotated, so that the location of the erecting prism, (optionally supported in the first and second directions with respect to the telescope optical system axis) can be adjusted, cooperating with the movement of the prism location arrangement structure. Therefore, the location of the erecting prism is adjusted in the first and second directions easily, securely, precisely, and efficiently.

Additionally, first and second adjusting members may be formed by the jig 10, a first and third shaft portions may be formed by the first shaft portion 12 of the jig 10, and a second and fourth shaft portions maybe formed respectively by the second shaft portion 14.

Further, the optical adjustment structures may be formed by the cut portion 306D3, long grooves 306D4, 306D5 and 306D6 of the thin plate 306D, protrusions 306A33, 306A34, 306A35 and 306A36 of the holder 306A, banks 303B5 and 303B6 of the right moving body 303, the upper edge 306D91 and the lower edge 306D92 of the thin plate 306D and the jig 10.

Accordingly, the location of the erecting prism (e.g., Dach or roof prism) in the first and second directions with respect to the telescope optical system axis can be adjusted easily and securely without a high degree of skill (as needed in the conventional binocular), enabling the precise and efficient adjustment of the erecting prism (e.g., Dach roof prism) location.

Although the above description sets forth particular embodiments of the present invention, modifications of the invention will be readily apparent to those skilled in the art, and the inventors expressly intend that the scope of the invention, as well as elements necessary for the invention to function, be determined solely by the appended claims. Changes may be made, within the purview of the appended claims, as originally submitted and as amended, without departing from the scope and spirit of the invention in its aspects. No one or more of the preceding described elements is critical to the operation of the invention, except as explicitly described herein. Although the invention has been described with reference to particular means, materials and embodiments, the inventors do not intend that the invention is to be limited to the particulars disclosed; rather, the invention extends to all equivalent and/or in substantially different structures, methods and uses such as are within the scope of the appended claims, as originally submitted and as amended.

The present disclosure relates to subject matter contained in Japanese Patent Application Nos. 2000-133414, filed on May 2, 2000, and 2000-137015, filed on May 10, 2000, which are expressly incorporated herein by reference in their entireties.

What is claimed is:

1. A binocular, comprising:
   a right telescope optical system and a left telescope optical system, each of said telescope optical systems including:
      an objective lens,
      a roof prism that forms an erected image;
      an eyepiece lens for observing said erected image; and
      an optical adjustment structure that adjusts a location of said roof prism in a first direction and a second direction, the first direction and the second direction being perpendicular to optical axes of said telescope optical systems and perpendicular to one other,
      said optical arrangement structure including a prism holder, an intermediate member, and a holding member, said prism holder being configured to hold said roof prism,
      said intermediate member being configured to support swaid prism holder to be movable in the first direction but prevented from movement in the second direction, and said holding member being configured to suuport said intermediate member to be movable in the second direction but prevented from movement in the first direction.

2. The binocular according to claim 1,
   said intermediate member including a first guiding member and said prism holder including a first guided member,
   one of said first guiding member and said first guided member extending in the first direction, said first guided member of said prism holder being guided in the first direction by said first guiding member of said intermediate member.

3. The binocular according to claim 1,
   said holding member including a second guiding member and said intermediate member including a second guided member,
   one of said second guiding member and said second guided member extending in the second direction, said second guided member of said intermediate member being guided in the second direction by said second guiding member of said holding member.

4. The binocular according to claim 1, wherein
   said intermediate member including a first plate-like portion formed on a surface opposing said prism holder, said first plate-like portion being plate shaped and having a first substantially circular hole formed therein, and
   said prism holder including a first long groove elongated in the second direction and opposing said first substantially circular hole.

5. The binocular according to claim 4, wherein,
   said first hole and said first long groove being arranged with respect to each other in relative positions in which said first hole receives a cylindrical body of a first arrangement member and said first long groove receives an eccentric shaft portion of the first arrangement member that extends from an end of the cylindrical body of the first arrangement member and is eccentric with respect to an axis of rotation of the cylindrical body of the first arrangement member.

6. The binocular according to claim 5, wherein
   two side edges of the first long groove that oppose each other in an elongation direction of the first long groove abutting an outer circumferential surface of the eccentric shaft portion of the first arrangement member, when said prism holder is moved in the first direction with respect to said intermediate member upon rotation of said first arrangement member.

7. The binocular according to claim 5, wherein
   said holding member having a second plate-like portion formed on a surface opposing said intermediate member, said second plate-like portion being plate shaped and having a second substantially circular hole formed therein,
   said intermediate member including with a second long groove elongated in the first direction and opposing said substantially circular second hole.

8. The binocular according to claim 7,
   said second hole and said second long groove being arranged with respect to each other in relative positions in which said second hole receives a cylindrical body of a second arrangement member and said second long groove receives an eccentric shaft portion of the second arrangement member that extends from an end of the cylindrical body of the second arrangement member and is eccentric with respect to an axis of rotation of the cylindrical body of the second arrangement member, two side edges of the second long groove that oppose each other in an elongation direction of the second long groove abutting an outer circumferential surface of the eccentric shaft portion of the second arrangement member.

9. The binocular according to claim 8, wherein said intermediate member is moved in the second direction with respect to said holding member upon rotation of the second arrangement member.

10. A binocular, comprising:
right and left telescope optical systems, each of said right and left telescope optical systems including:
an objective lens;
an erecting prism that forms an erected image;
an eyepiece lens for imaging said erected image, an optical axis being defined by said objective lens, said erecting prism, and said eyepiece lens;
a prism holding structure for adjusting a location of said erecting prism in a first direction and a second direction, the first direction and the second direction being perpendicular to optical axes of said telescope optical system and perpendicular to one another;
a prism location arrangement structure for moving the location of said erecting prism within said prism holding structure, said prism location arrangement structure being adapted to receive an arrangement jig and moving the location of said erecting prism within said prism holding structure according to a rotational operation of the arrangement jig; and
a shaft reception member for rotatably supporting the arrangement jig while the arrangement jig is rotated.

11. The binocular according to claim 10,
said prism holding structure including a prism holder, an intermediate member, and a holding member,
said prism holder being configured to hold said erecting prism,
said intermediate member being configured to support said prism holder to be movable in the first direction but prevented from movement in the second direction, and
said holding member being configured to support said intermediate member to be movable in the second direction but prevented from movement in the first direction.

12. The binocular according to claim 11,
said intermediate member including a first guiding member and said prism holder including a first guided member,
one of said first guiding member and said first guided member extending in the first direction, said first guided member of said prism holder being guided in the first direction by said first guiding member of said intermediate member,
said holding member including a second guiding member and said intermediate member including a second guided member,
one of said second guiding member and said second guided member extending in the second direction, said second guided member of said intermediate member being guided in the second direction by said second guiding member of said holding member.

13. The binocular according to claim 11,
said intermediate member including a first plate-like portion formed on a surface opposing said prism holder, said first plate-like portion being plate shaped and having a first substantially circular hole formed therein, and
said prism holder including a first long groove elongated in the second direction and opposing said first substantially circular hole.

14. The binocular according to claim 13,
said holding member having a second plate-like portion formed on a surface opposing said intermediate member, said second plate-like portion being plate shaped and having a second substantially circular hole formed therein,
said intermediate member including with a second long groove elongated in the first direction and opposing said substantially circular second hole.

15. The binocular according to the claim 14,
said second hole and said second long groove being arranged with respect to each other in relative positions in which said second hole receives a cylindrical body of the arrangement jig and said second long groove receives an eccentric shaft portion of the arrangement jig that extends from an end of the cylindrical body and is eccentric with respect to an axis of rotation of the cylindrical body,
two side edges of the second long groove that oppose each other in an elongation direction of the second long groove abutting an outer circumferential surface of the eccentric shaft portion.

16. The binocular according to claim 13,
said first hole and said first long groove being arranged with respect to each other in relative positions in which said first hole receives a cylindrical body of the arrangement jig and said first long groove receives an eccentric shaft portion of the arrangement jig that extends from an end of the cylindrical body and is eccentric with respect to an axis of rotation of the cylindrical body, and
two side edges of the first long groove that oppose each other in an elongation direction of the first long groove abutting an outer circumferential surface of the eccentric shaft portion.

17. The binocular according to claim 10,
said shaft reception member including:
a plate-like portion,
a jig insertion hole formed in said plate-like portion for receiving the arrangement jig, and
an arch portion formed on a portion of a hole edge of said jig insertion hole, said arch portion forming an arched edge expanding outward from a center of said jig insertion hole, the diameter of said arch portion being less than the half of that of said jig insertion hole, said arrangement jig is being received and rotatably supported by said arch portion.

18. The binocular according to claim 10,
further comprising at least one outer housing member formed to house said binocular, wherein
said prism location arrangement structure engaging with said arrangement jig at an engaging interface, and
said engaging interface of said prism location arrangement structure being covered from an exterior of the binocular by said outer housing member.

19. The binocular according to claim 18,
said outer housing member comprising an eyepiece, said eyepiece being removably attached to said binocular at said eyepiece lens.

20. A binocular, comprising:

a right telescope system and a left telescope optical system, each of said telescope optical systems including:

an erecting prism that forms an erected image;

an optical adjustment structure including:

a base member, an intermediate member, said intermediate member including a first adjustment mechanism operably coupled to the base member that adjusts the location of the erecting prism in a first direction perpendicular to the optical axis, and an erecting prism holder holding said erecting prism, said erecting prism holder including a second adjustment mechanism operably coupled to the intermediate member that adjusts the location of the erecting prism in a second direction perpendicular to the optical axis and to the first direction, said first and second adjustment mechanisms cooperating to adjust the location of the erecting prism relative to the base member in both the first direction and the second direction.

21. The binocular according to claim 20, further comprising:

a securing connection that affixes all of said base member, said intermediate member, and said erecting prism holder together in a desired adjusted location of the erecting prism relative to the base member in both the first direction and the second direction.

22. A binocular, comprising:

a right telescope system and a left telescope optical system, each of said telescope optical systems including:

an objective lens having an objective optical axis;

an eyepiece lens having an eyepiece optical axis;

an erecting prism including a first prism and a second prism, that forms an erected image, the objective optical axis entering said first prism perpendicularly at an entry point of an incident surface of said first prism, and the eyepiece optical axis exiting the second prism perpendicularly at an exit point of an exit surface of the second prism, all of the objective optical axis, the entry point, the exit point, and the eyepiece optical axis being arranged substantially along a same straight line, an optical adjustment structure including:

a base member, and an intermediate adjusting mechanism, said intermediate adjusting mechanism including a first adjustment mechanism operably coupled to the base member that adjusts the location of the erecting prism in a first direction perpendicular to the optical axis, and a second adjustment mechanism that adjusts the location of the erecting prism in a second direction perpendicular to the optical axis and to the first direction.

23. The binocular according to claim 22, said first and second adjustment mechanisms cooperating to adjust the location of the erecting prism relative to the base member in both the first direction and the second direction.

24. The binocular according to claim 22, further comprising:

a securing connection that affixes said base member and said first and second adjustment mechanisms together in a desired adjusted location of the erecting prism relative to the base member in both the first direction and the second direction.

25. A method of adjusting an erecting prism location in a binocular, comprising:

engaging a jig with a first adjustment mechanism operably coupled between a prism holder and an intermediate member, the prism holder holding the erecting prism;

adjusting the location of the erecting prism in a first direction perpendicular to an optical axis of the binocular;

engaging a jig with a second adjustment mechanism operably coupled between the intermediate member and a base member;

adjusting the location of the erecting prism in a second direction perpendicular to the optical axis of the binocular and perpendicular to the first direction; and affixing all of said base member, said intermediate member, and said prism holder together in a desired adjusted location of the erecting prism relative to the base member.

26. The method according to claim 25, further comprising:

contacting the jig with a jig support adjacent the first adjustment mechanism that limits the movement of the jig in the first and second directions.

27. The method according to claim 25, further comprising:

contacting the jig with a jig support substantially aligned with the first adjustment mechanism that limits the movement of the jig in at least one of said first and second directions.

28. The method according to claim 27, wherein said jig support limits the movement of the jig in one of said first and second directions by two point contact to an outer circumference of a substantially circular shaft of the jig.

29. The method according to claim 27, wherein the jig support limits the movement of the jig in one of said first and second directions by arcuate chord contact of a arch portion having a predetermined inner diameter to an outer circumference of a substantially circular shaft of the jig having substantially a same outer diameter as the predetermined inner diameter.

30. The method according to claim 25, further comprising:

contacting the jig with a jig support adjacent the second adjustment mechanism that limits the movement of the jig in the first and second directions.

31. The method according to claim 30, wherein said jig support limits the movement of the jig in one of said first and second directions by two point contact to an outer circumference of a substantially circular shaft of the jig.

32. The method according to claim 31, wherein said jig support limits the movement of the jig in one of said first and second directions by two point contact to an outer circumference of a substantially circular shaft of the jig.

33. The method according to claim 31, wherein the jig support limits the movement of the jig in one of said first and second directions by arcuate chord contact of an arch portion having a predetermined inner diameter to an outer circumference of a substantially circular shaft of the jig having substantially a same outer diameter as the predetermined inner diameter.

* * * * *